United States Patent [19]

Check, Jr. et al.

[11] 4,306,299

[45] Dec. 15, 1981

[54] POSTAGE METER HAVING MEANS TRANSFERRING DATA FROM A WORKING MEMORY TO A NON-VOLATILE MEMORY UNDER LOW POWER CONDITIONS

[75] Inventors: Frank T. Check, Jr., Orange; Alton B. Eckert, Jr., Norwalk; Joseph R. Warren, Stamford, all of Conn.

[73] Assignee: Pitney-Bowes, Inc., Stamford, Conn.

[21] Appl. No.: 93,944

[22] Filed: Nov. 13, 1979

Related U.S. Application Data

[62] Division of Ser. No. 694,813, Jun. 10, 1976, which is a division of Ser. No. 536,248, Dec. 23, 1974, Pat. No. 3,978,457.

[51] Int. Cl.[3] .......... G06F 1/00

[52] U.S. Cl. .......... 364/900

[58] Field of Search ... 364/200 MS File, 900 MS File; 365/228; 371/4, 10, 66

[56] References Cited

U.S. PATENT DOCUMENTS

| | | | |
|---|---|---|---|
| 3,801,963 | 4/1974 | Chen | 364/200 |
| 3,810,116 | 5/1974 | Prohofsky | 364/200 |
| 3,859,638 | 1/1975 | Hume, Jr. | 365/228 X |
| 3,937,937 | 2/1976 | McVey | 371/66 |
| 3,959,778 | 5/1976 | Brette | 364/200 |
| 3,978,457 | 8/1976 | Check, Jr. et al. | 364/200 |
| 3,980,935 | 9/1976 | Worst | 365/228 X |
| 4,097,923 | 6/1978 | Eckert, Jr. et al. | 364/900 |

*Primary Examiner*—Raulfe B. Zache
*Attorney, Agent, or Firm*—David E. Pitchenik; William D. Soltow, Jr.; Albert W. Scribner

[57] ABSTRACT

An electronic postage has a working memory and a non-volatile memory. A voltage sensing circuit senses low power conditions, and, in response thereto, controls a data transfer circuit to transfer data from the working memory to the non-volatile memory.

26 Claims, 60 Drawing Figures

FIG. 5
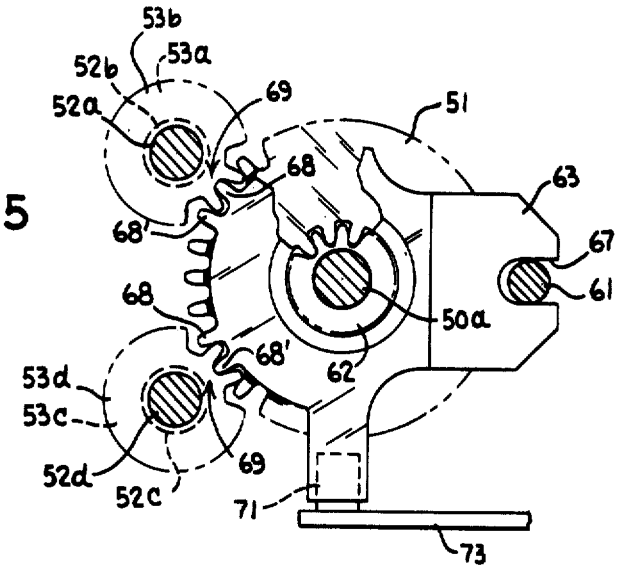
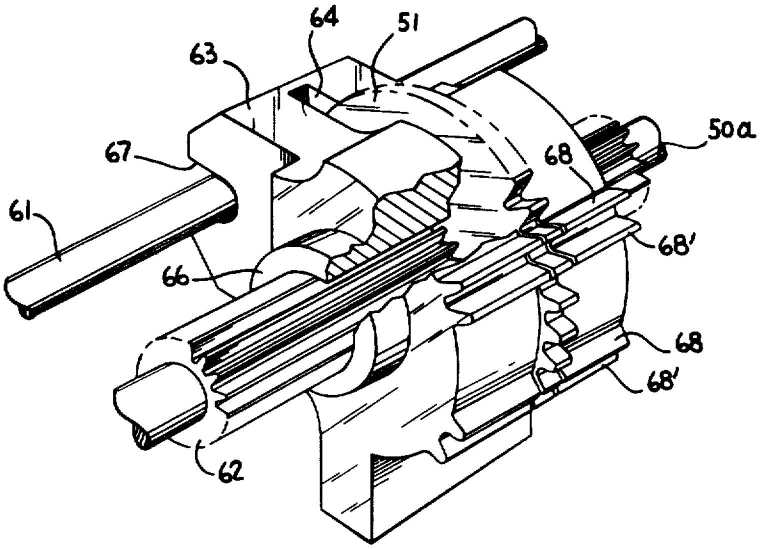
FIG. 4b

POWER SUPPLY TURN-ON / SHUT DOWN SIGNAL

CHART FOR POSTAGE METER PROGRAM

INITIALIZATION

CHCK

INRAM

DOWN

FIG. 25. SCAN
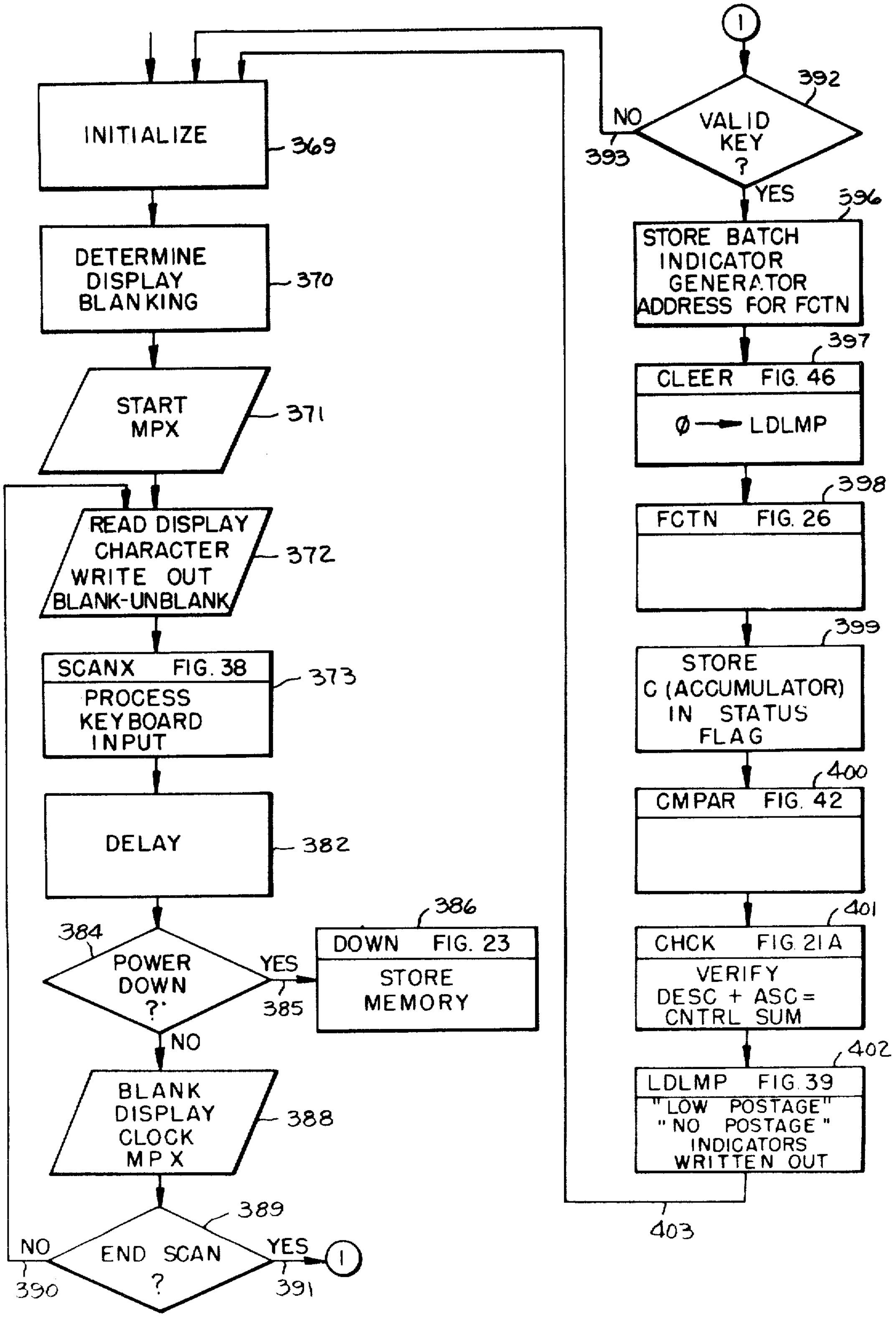

FIG. 26.

FCTN

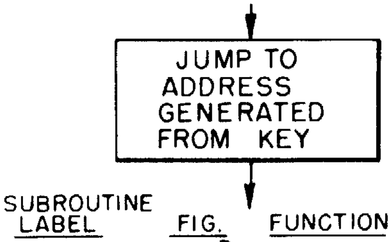

| KEY | SUBROUTINE LABEL | FIG. | FUNCTION |
|---|---|---|---|
| 0 | ZERO | 27 | NUMERICAL KEYBOARD ENTRY |
| 1 | ONE | 27 | |
| 2 | TWO | 27 | |
| 3 | THREE | 27 | |
| 4 | FOUR | 27 | |
| 5 | FIVE | 27 | |
| 6 | SIX | 27 | |
| 7 | SEVEN | 27 | |
| 8 | EIGHT | 27 | |
| 9 | NINE | 27 | |
| SET | SET | 28 | SET METER OR RECALL PREVIOUS SETTING |
| $ UNLOCK | UNLCK | 29 | $ UNLOCK FLAG |
| PRINT PHOTOCELL INPUT | POST | 30 | UPDATE REGISTERS AFTER PRINTING POSTAGE |
| + | ADD | 31 | ADD FUNDS INTO METER |
| − | SUBD | 32 | SUBTRACT FUNDS FROM METER |
| CLEAR | CLEAR | 34 | CLEAR FUNCTION |
| ± | PLUS | 33 | ADDITION FUNCTION |
| DESC. REG. | DESC | 35 | PUT CONTENTS OF SELECTED REGISTER INTO DISPLAY |
| ASC. REG. | ASC | 35 | |
| PIECE COUNT | PIECE | 35 | |
| CONT. SUM | CNTRL | 35 | |
| BATCH AMOUNT | BSUM | 35 | |
| BATCH COUNT | BCNT | 35 | |

FIG. 27.

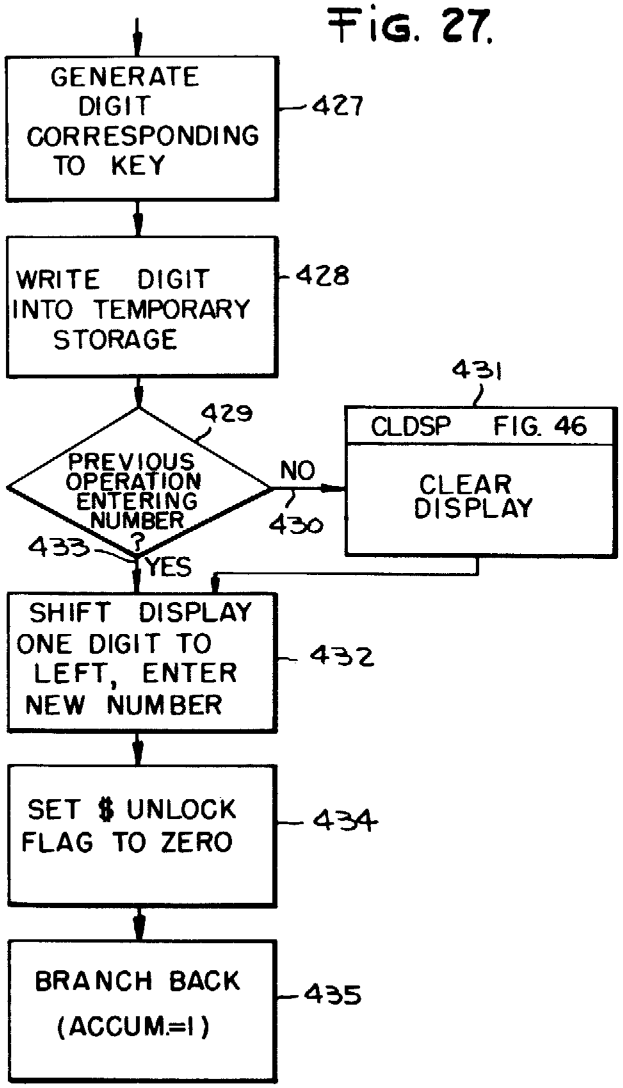

SET

ADD

POST

UNLCK

FIG. 36. ENBLE
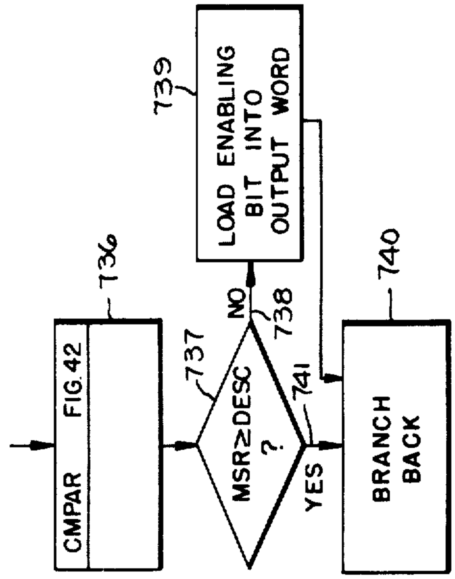
FIG. 35. DESC ASC PIECE CNTRL BCNT BSUM
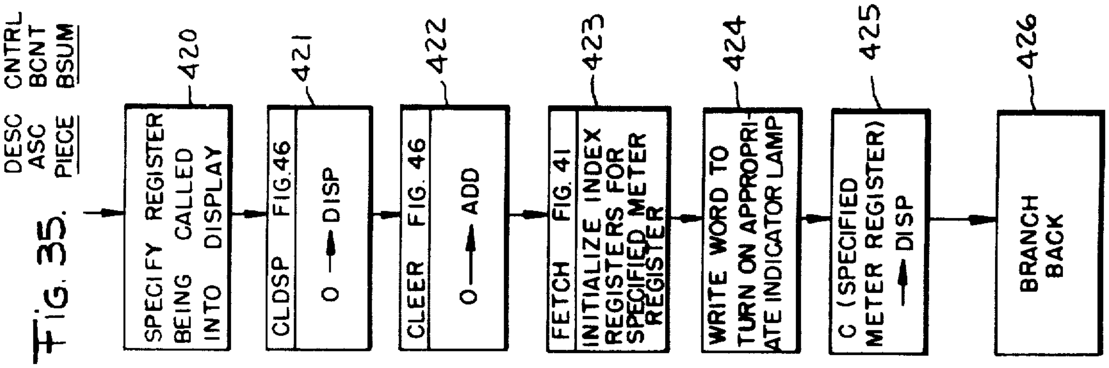
FIG. 34. CLEAR
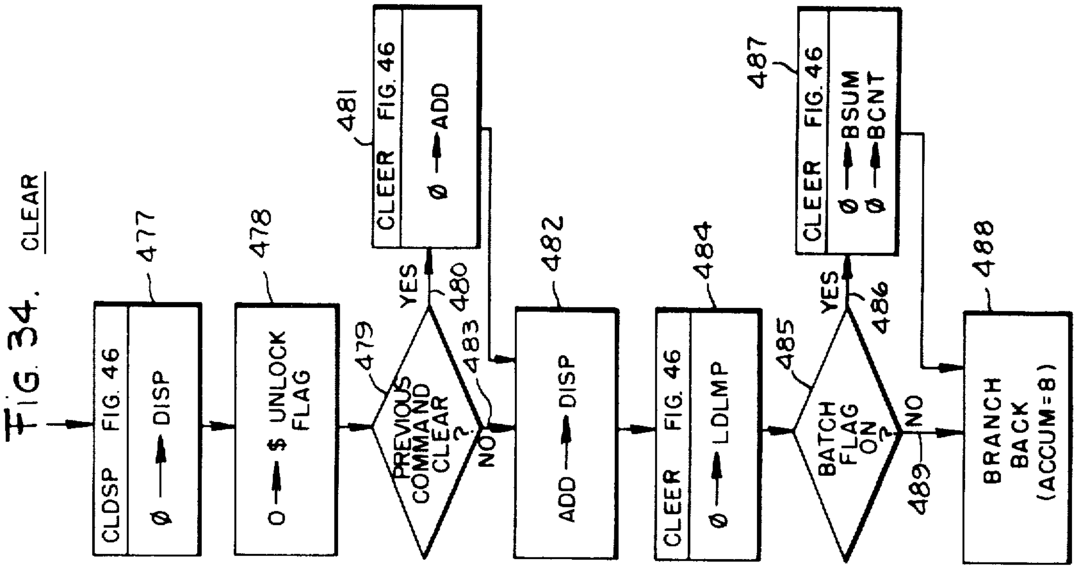

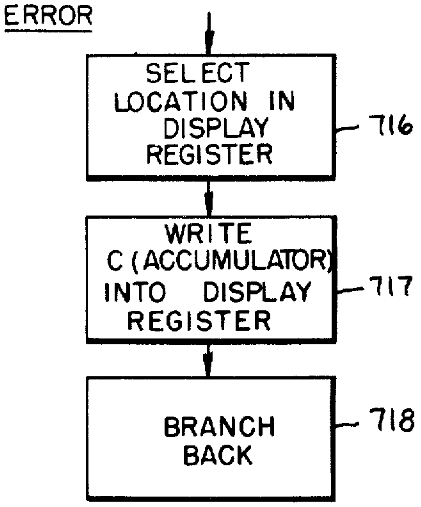
FIG. 37.
ERROR
SELECT LOCATION IN DISPLAY REGISTER
716
WRITE C (ACCUMULATOR) INTO DISPLAY REGISTER
717
BRANCH BACK
718

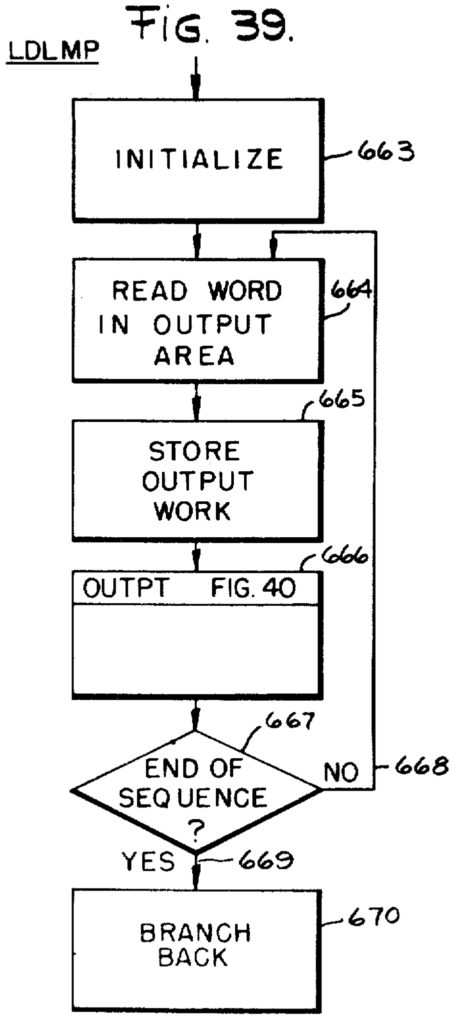
FIG. 39.
LDLMP
INITIALIZE
663
READ WORD IN OUTPUT AREA
664
665
STORE OUTPUT WORK
666
OUTPT FIG. 40
667
END OF SEQUENCE ?
NO
668
YES
669
BRANCH BACK
670

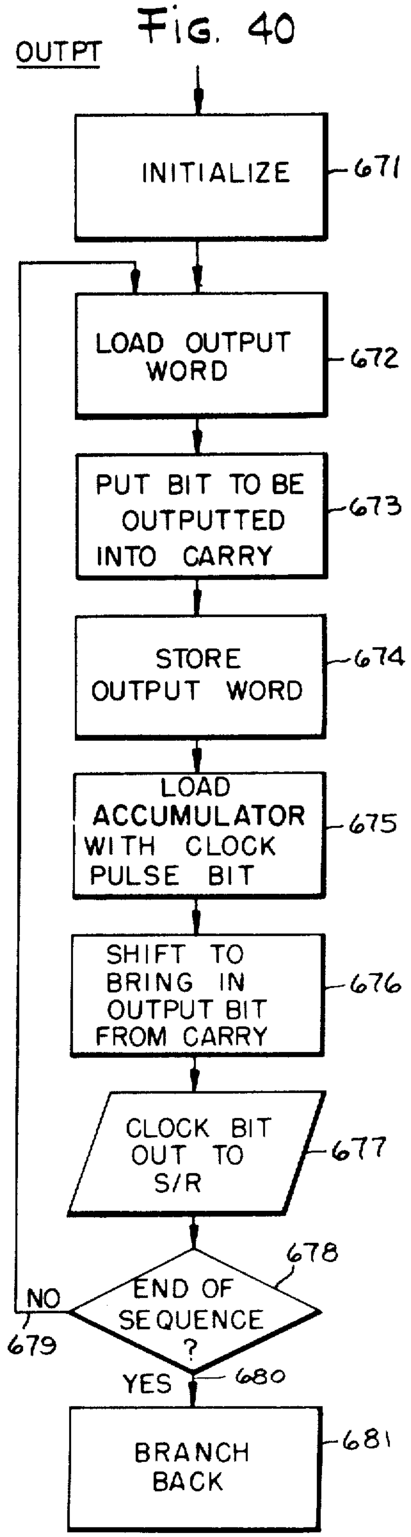
FIG. 40
OUTPT
INITIALIZE
671
LOAD OUTPUT WORD
672
PUT BIT TO BE OUTPUTTED INTO CARRY
673
STORE OUTPUT WORD
674
LOAD ACCUMULATOR WITH CLOCK PULSE BIT
675
SHIFT TO BRING IN OUTPUT BIT FROM CARRY
676
CLOCK BIT OUT TO S/R
677
678
END OF SEQUENCE ?
NO
679
YES
680
BRANCH BACK
681

FIG. 38. SCANX
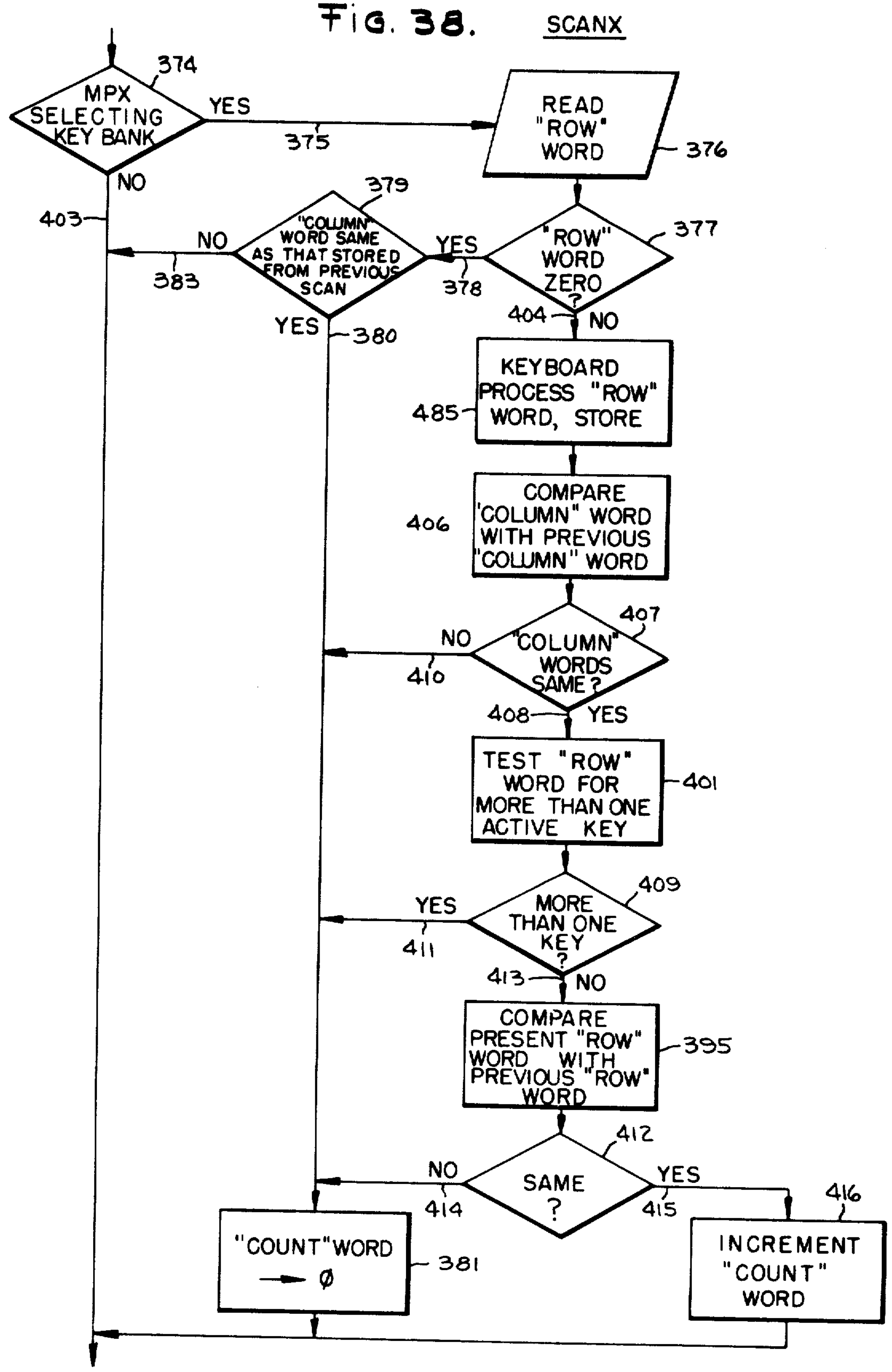

STEP

POSTAGE METER HAVING MEANS TRANSFERRING DATA FROM A WORKING MEMORY TO A NON-VOLATILE MEMORY UNDER LOW POWER CONDITIONS

This application is a division of application Ser. No. 694,813, filed June 10, 1976, which, in turn, is a division of application Ser. No. 536,248, filed Dec. 23, 1974, and now U.S. Pat. No. 3,978,457.

The invention relates to an electronic postage meter system, and more particularly pertains to an electronic postage meter system built upon a micro computer system.

BACKGROUND OF THE INVENTION AND RELATED APPLICATIONS

The present electronic postage meter system is a second generation, stand-alone postage system superseding the predecessor system generally shown in copending application, Ser. No. 406,898 filed Oct. 16, 1973; application Ser. No. 195,729 filed Nov. 4, 1971, now U.S. Pat. No. 3,832,946; and copending application, Ser. No. 337,234 filed July 9, 1973.

The prior postage meter system was one of the first of its kind using electronic accounting and control techniques to record and keep track of postage operations. The present inventive posttage meter system follows in the steps of the previous system, but adds versatility, compactness, and flexibility to the electronic metering concept. The TTL logic of the prior system has now been replaced by a totally self-contained postage system built around an LSI micro computer set. The micro computer set provides flexibility by affording easy system changes by the addition of peripheral equipment and associated programming. The entire personality of the postage system is determined by the instructions in ROM. The inventive micro computer postage system can have the programmed capability of a more intricate system built into it, and when there is a need to expand the system, it can be accomplished without having to make intricate wiring changes as was required with the prior TTL logic system. Each micro computer postage system may thus be specifically fashioned to the needs of the individual user without difficulty.

SUMMARY OF THE INVENTION

The invention relates to a computerized postage meter system employing a central processing unit, a plurality of memory units, a multiplex input and output, and postage setting means responsive to the controlled interactions between the CPU, memories, input and outputs, for setting predetermined postage and printing the postage as desired. The system is built up about a plurality of LSI components and employs LSI technology to provide a functional relationship enabling the electronic postage meter system to accomplish its predetermined functions.

In general configuration, a central processing unit for providing the data flow control and for providing calculation of postage in accordance with input supply thereto, is the essential element of this system. Coupled to the CPU is a permanent memory for storing a postal data program and is a non-alterable storage medium. A temporary memory is also provided for storing and forwarding working data in accordance with the operation of CPU. A non-volatile memory is intercoupled with the CPU and provides a permanent or nondestructive storage location for postal funding data in accordance with the transfer routine previously established and activated in accordance with a shut-down or start-up sequence of the system. The use of a nonvolatile memory is important in that data which is significant in the system, such as the contents of descending registers which keep track of the remaining balance in the postal meter or ascending registers which keep track of the continuous accumulation of charges thereto, is permanently stored in the nonvolatile memory when the system is de-energized. As a corollary, when the system starts up, the data from the nonvolatile memory is transferred back into the temporary memory.

Further interaction with the CPU is provided by means of an appropriate input device such as a keyboard which provides the appropriate postal data to the CPU for the calculations to be performed. An output or display which is multiplexed with the input also interfaces with the CPU for recalling data from the temporary storage in accordance with the commands. The ultimate output of the CPU is coupled to a postage setting mechanism which sets the amount of postage to be printed into a postal printing unit for printing the postage as desired.

More specifically, the micro computerized postage meter system is built upon the MCS-4[R] micro computer set; a product of Intel Corporation, Santa Clara, Calif. It will be understood that other manufacturers and equivalent components may be employed and that Intel components are used for purposes of example. The micro computer set is of LSI design, and comprises a central processor unit (CPU-4004) which performs all control and data processing functions, and contains the control unit and arithmetic unit of a general purpose micro programmable computer. The computer system comprises a plurality of ROM's (Read Only Memory Chips-4001) and a plurality of RAM's (Read Access Memory Chips-4002) which are interconnected to the CPU. The ROM's contain the postage system program. One four-bit input-output port is provided on each ROM package. The RAM's provide the system with a working memory and each RAM package provides one four-bit output port. A permanent (nonvolatile) memory is provided for accounting purposes, and comprises a $4 \times 128$ bit COS/MOS shift register with hold-up battery. The computer system also contains shift registers (Intel number 4003) for port expansion and multiplexing capability, and associated circuitry including clocks, power supplies, and interfacing circuits to connect with the outside world.

The postage setting mechanism, although an indispensable part of this system, is itself one of several components including a keyboard for instructing the system, a display for visually monitoring the system's functions, and the aforementioned non-volatile shift register memory.

The postage printer of the inventive system is a modified Model 5300 postage meter manufactured by Pitney-Bowes, Inc., Stamford, Connecticut. The mechanical accounting means (ascending and descending registers) have been removed from the meter along with the actuator assemblies and setting levers. The remaining printer is set by a pair of solenoids and a stepping motor. The mechanical operation of the printer is monitored by a plurality of photocells strategically placed within the printer housing. When a particular function of the printer fails to be performed, a photocell monitoring that appropriate function will provide an error input to the system via an input port.

The micro computer system also receives inputs from the keyboard and non-volatile memory through an input port.

Outputs from the system are generally handled via the shaft registers and output ports. These outputs include: (1) data to the display; (2) data to the non-volatile memory; and (3) control signals to the stepper motor and solenoids setting the postage printer.

Peripheral devices may easily be added to the system such as a large external display, a receipt printer, or a listing printer, etc.

The non-volatile memory of the present system is similarly protected as in the prior system, because the meter registers must always be maintained. A shut-down circuit is again provided to protect the memory during a shut-down sequence. An enable solenoid is also provided which inhibits the printer operation when the meter is not ready or when sufficient postage is not available for the printing of postage.

Upon application of power to the system, voltage sensing circuits generate a reset pulse which initializes the micro computer system and starts executing the program from address$\phi$. The non-volatile memory is loaded into working storage in RAM, the postage meter printer is set to zero ($\phi$), the descending register is loaded into the display to inform the operator how much funds are available, and a "check date" reminder is turned on. As with conventional meters the user is responsible for mechanically setting the correct data. The system then goes into a scan routine searching for inputs.

The inventive micro computer postage system has the following advantages:

(a) This postage meter provides the capability of monitoring its own registers for errors. This feature is unique to postage metering, and results in greater accounting accuracies as well as improved security.

(b) The present system offers two new registers, a batch amount register, and a batch count register. These registers provide a record of the total number of meter printings, and the total amount of postage printed. These registers are resettable to zero by the operator. These extra registers are useful to the user as a means to gage his mailing expenses.

(c) The postage system of this invention allows for easier recharging of the registers with additional funds. Funds can be added without having to do any mathematical computations, or any of the mechanical operations required to recharge the mechanical postage meter. Funds are entered into the appropriate registers of the system by (1) entering the amount via keyboard and operating a switch accessable only to Postal Authorities, or (2) by means of a remote resetting method similar to that shown in U.S. Pat. No. 3,792,446, issued Feb. 12, 1974.

(d) Setting the postage meter is faster in this inventive system, since the printer is set by electrical signals instead of mechanical levers. Stepping motor and solenoids set the individual banks. Photocells monitor and sense proper printer operation. The solenoid position a driving gear from the stepping motor into engagement with a particular bank of the meter, one bank at a time. Each step of the motor is monitored by a slotted disc and photocells. Every fifth step is checked by a second photocell detecting a slot on the disc which is extra deep. This provides an additional check on the system. Absolute position of each bank is not sensed except at the zero position. Thus, upon initialization of the system, each bank of the printer has to be set to zero in order to establish a reference. Once the reference position has been established, the position of the printer is controlled by the micro computer.

(e) The inventive postage system has means for adding in special charges to the basic postage rate, such as special delivery, certification, and insurance charges.

(f) The funding registers of the invention may be run (but not necessarily so) to a zero balance. All registers (funding or otherwise) are variable in size by means of programming.

(g) As previously mentioned, peripheral equipment can be easily added to this inventive system to expand and amplify its usefulness. The system can be redesigned to the individual needs of the user without having to make costly and intricate changes in the basic equipment, wiring, or circuitry.

It is an object of this invention to provide an improved electronic postage meter system;

It is another object of the invention to provide a postage meter system built around a micro computer set; and It is a further object of the invention to provide an electronic postage meter system which is compact, and which can be easily modified to the individual needs of the user.

These and other objects of the invention will become more apparent and will be better understood with reference to the following detailed description taken in conjunction with the attached drawings, in which:

FIG. 1b is a perspective view of the housing for the computerized postage meter of FIG. 1a;

Figure 1A:
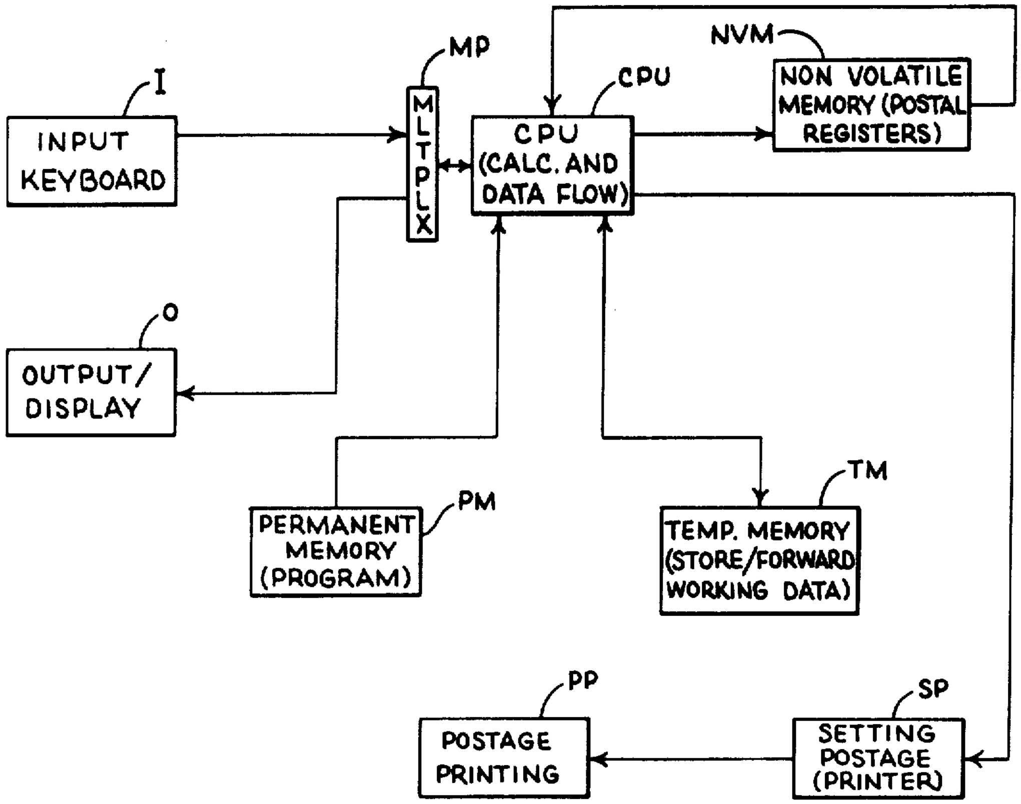
FIG. 1a is a functional block diagram of a micro computerized postage meter system of the present invention.
Figure 1B:
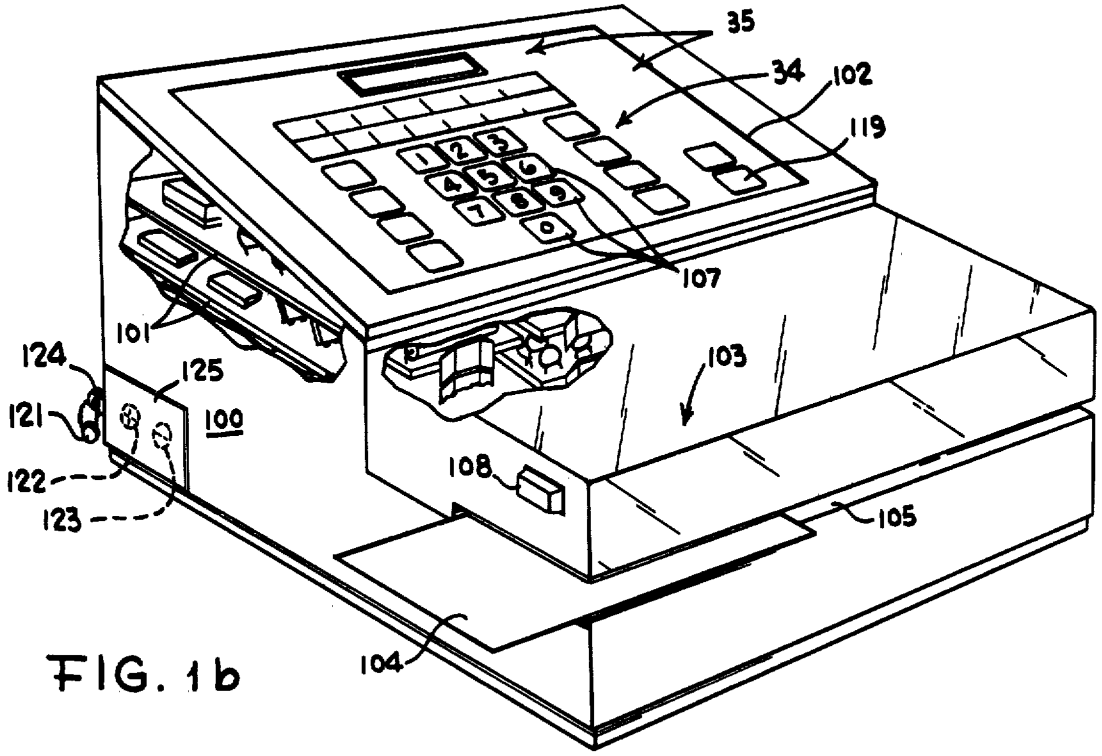
Figure 1C:
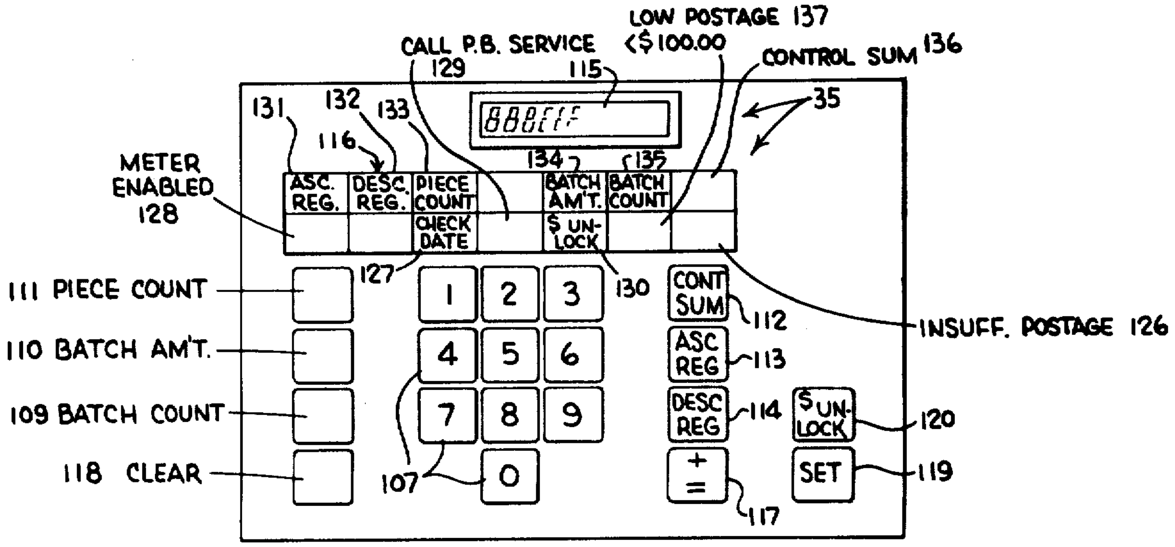
Figure 1D:
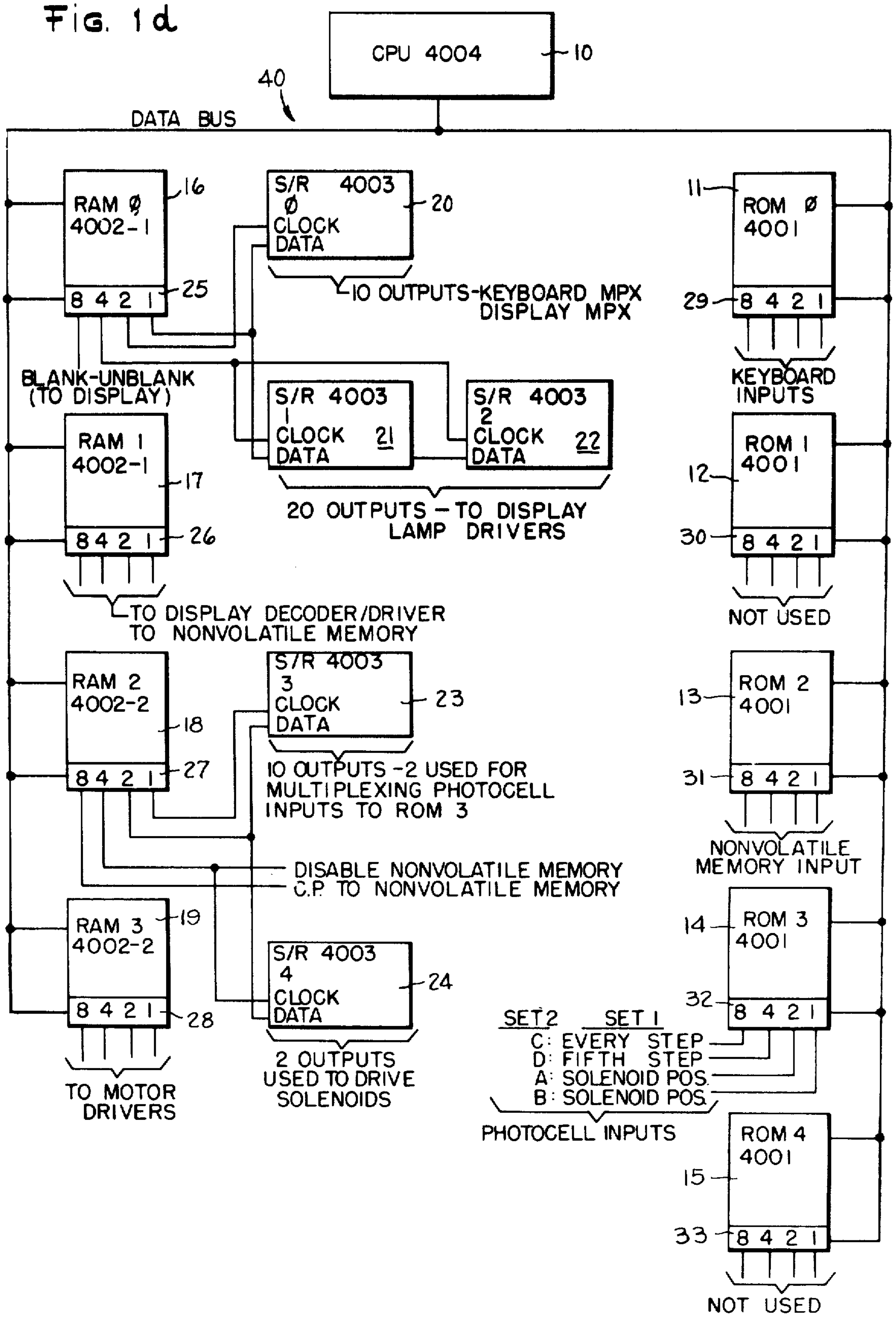
Figure 2:
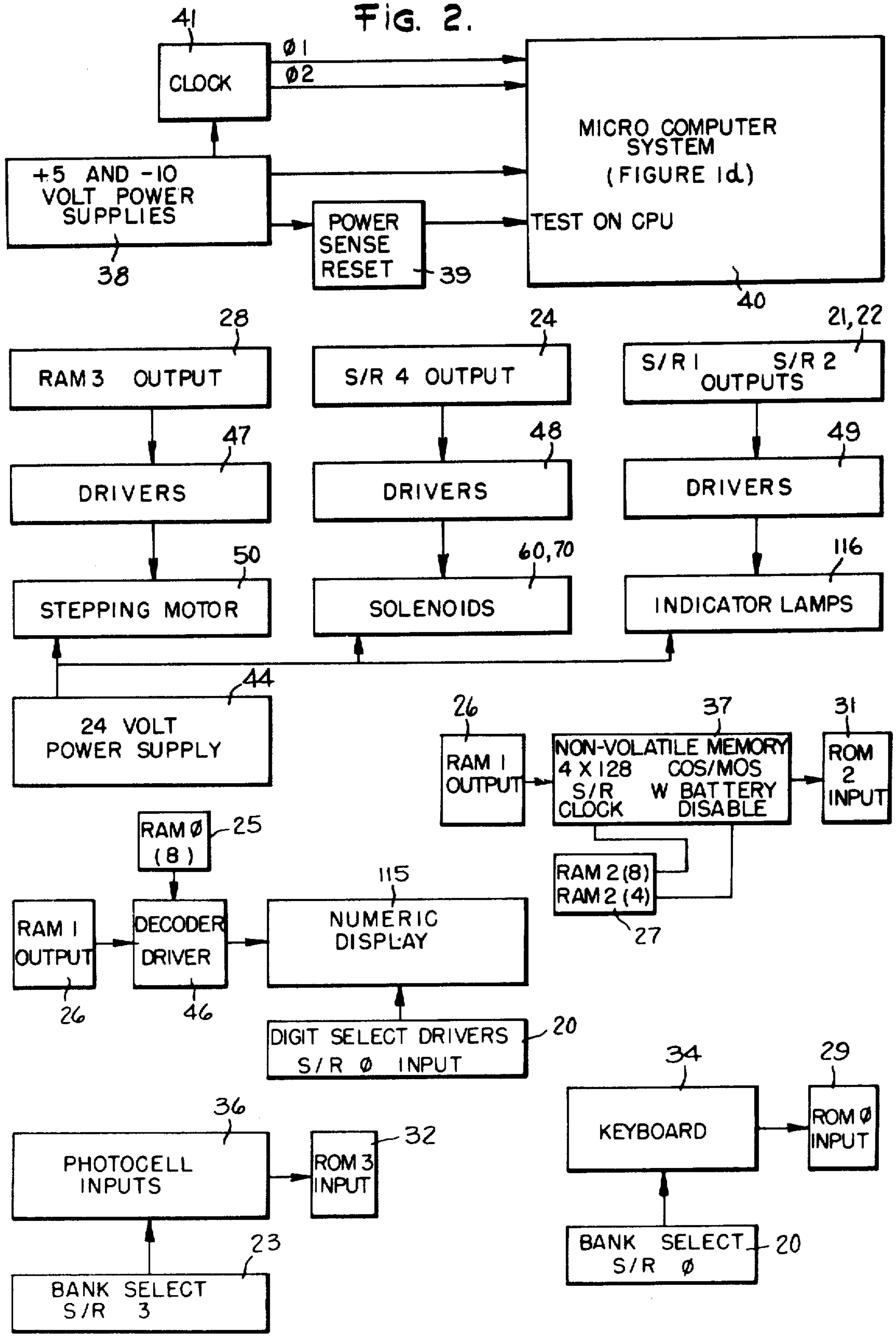
Figure 3:
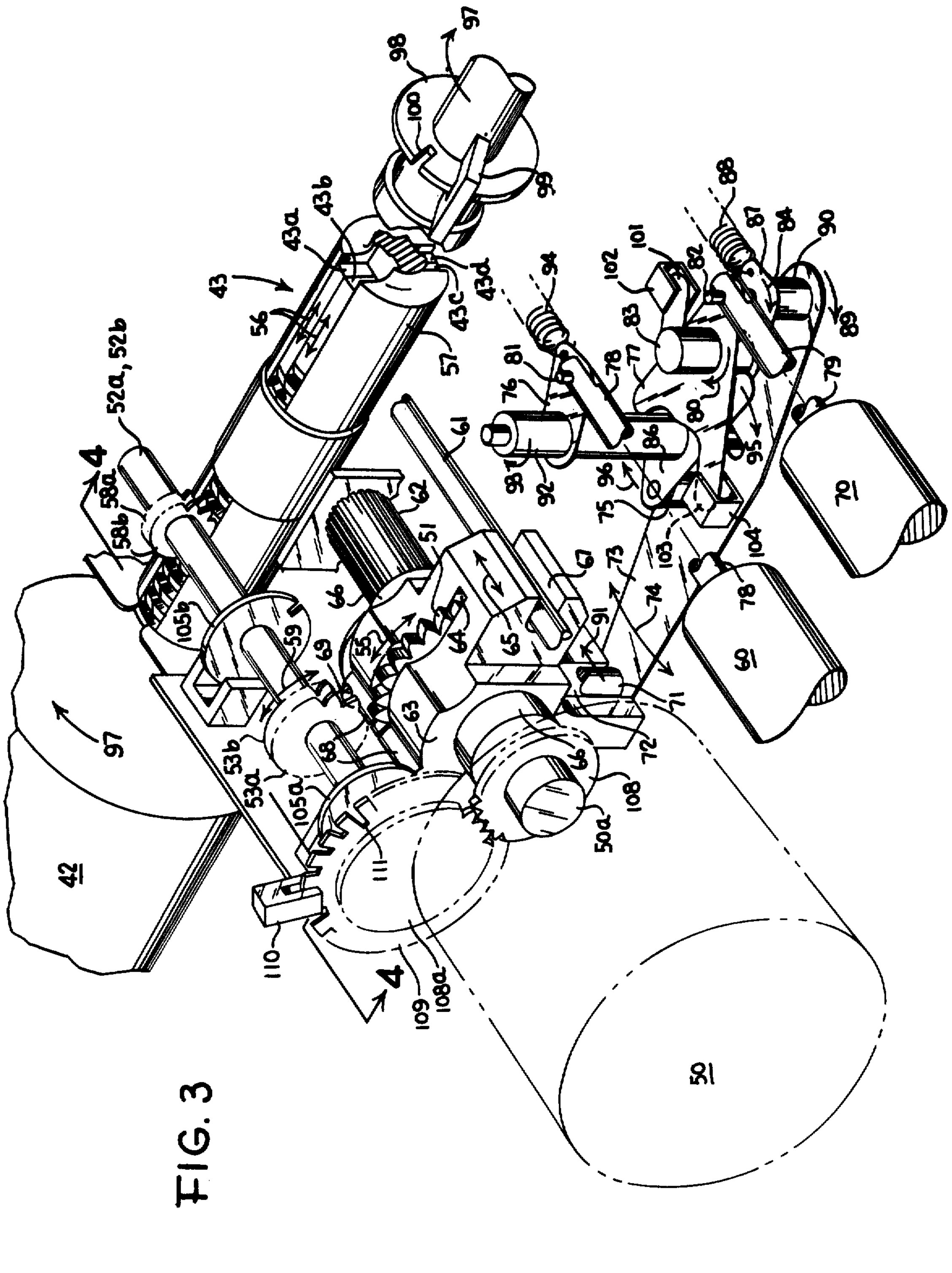
Figure 4A:
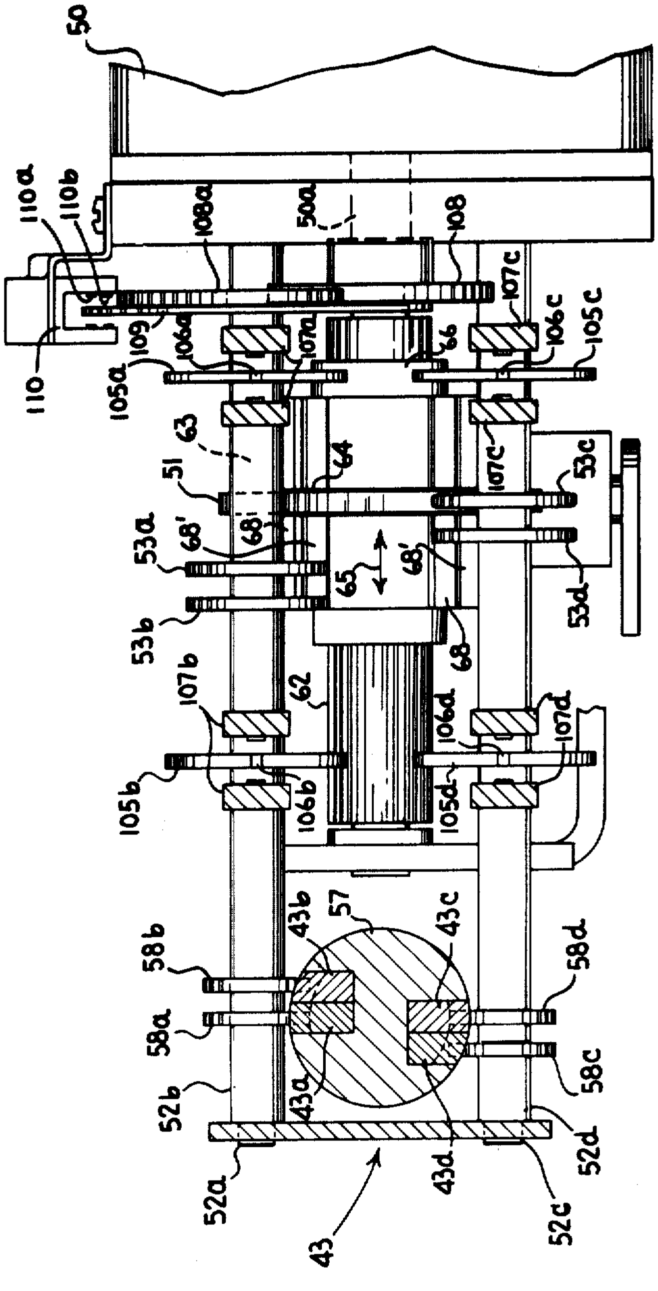
Figure 8A:
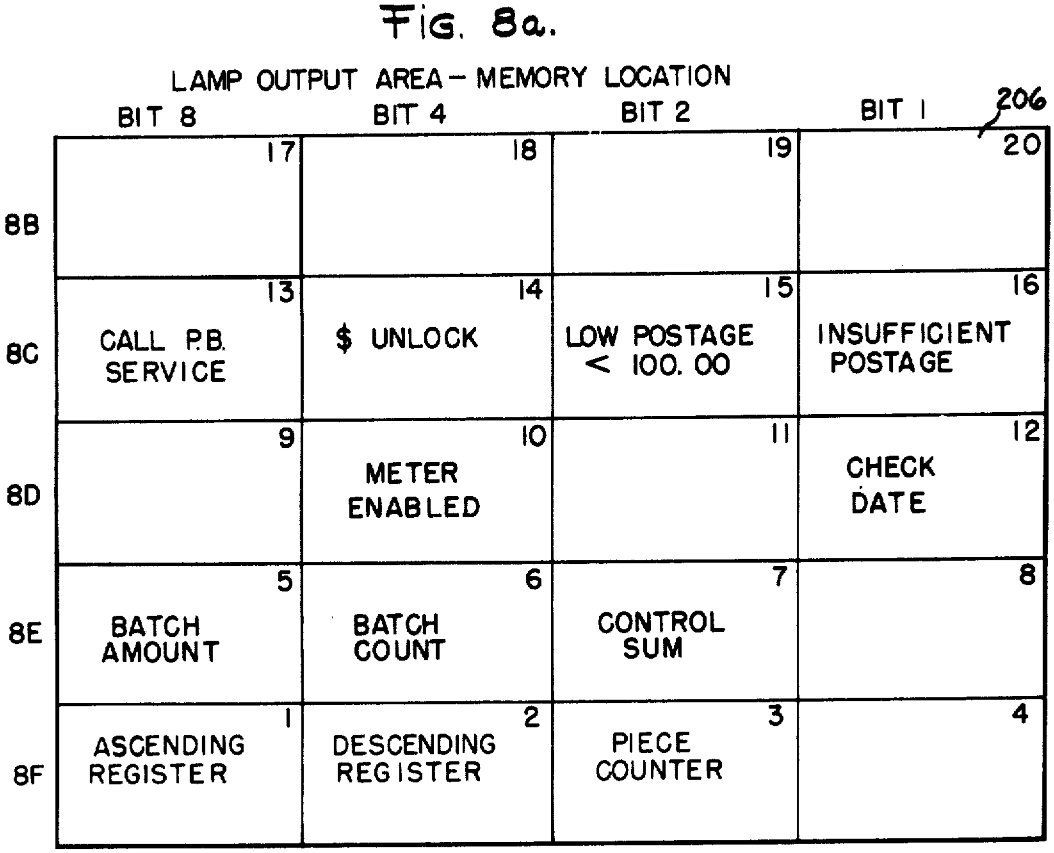
Figure 6:
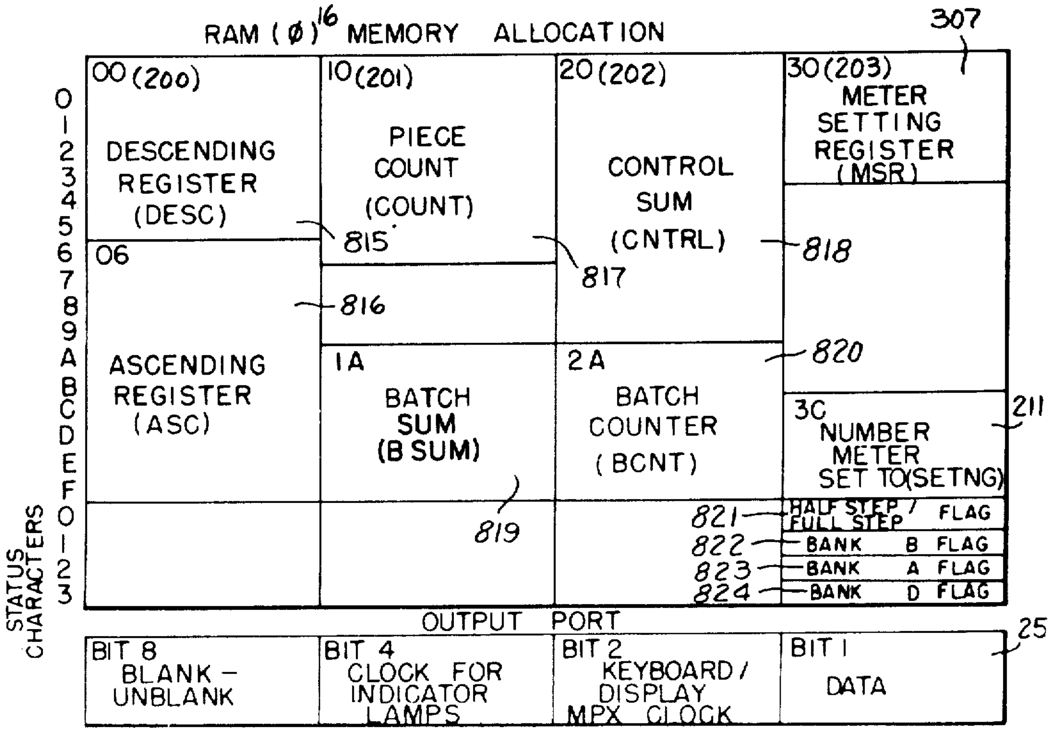
Figure 7:
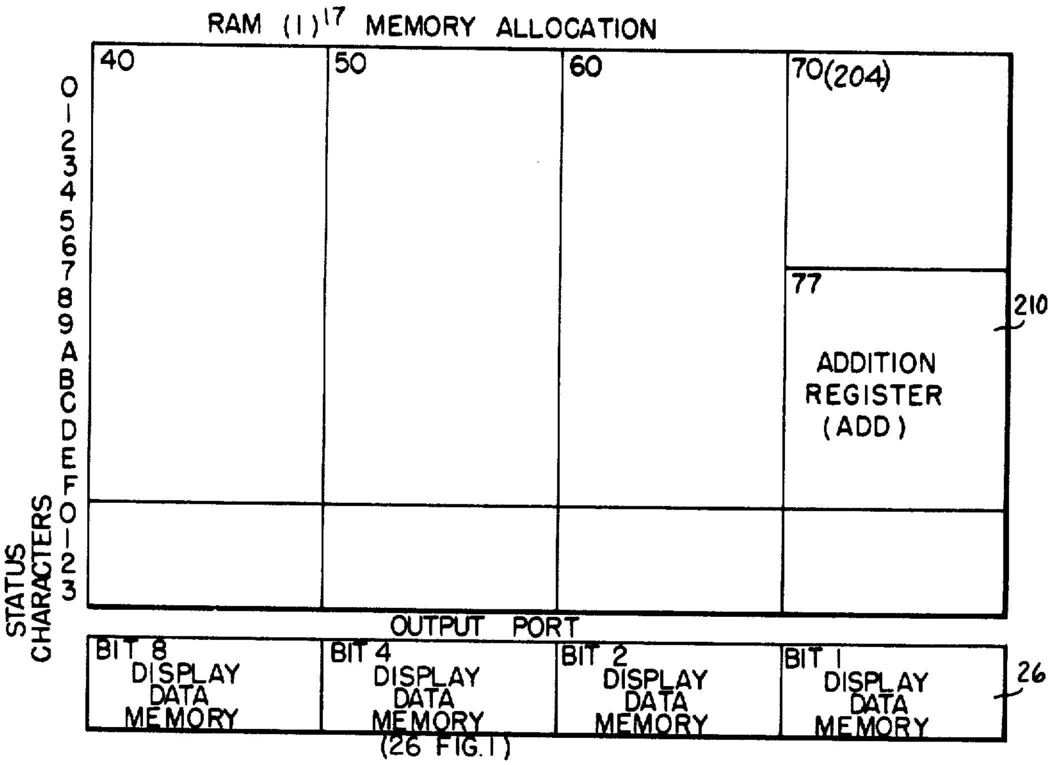
Figure 8:
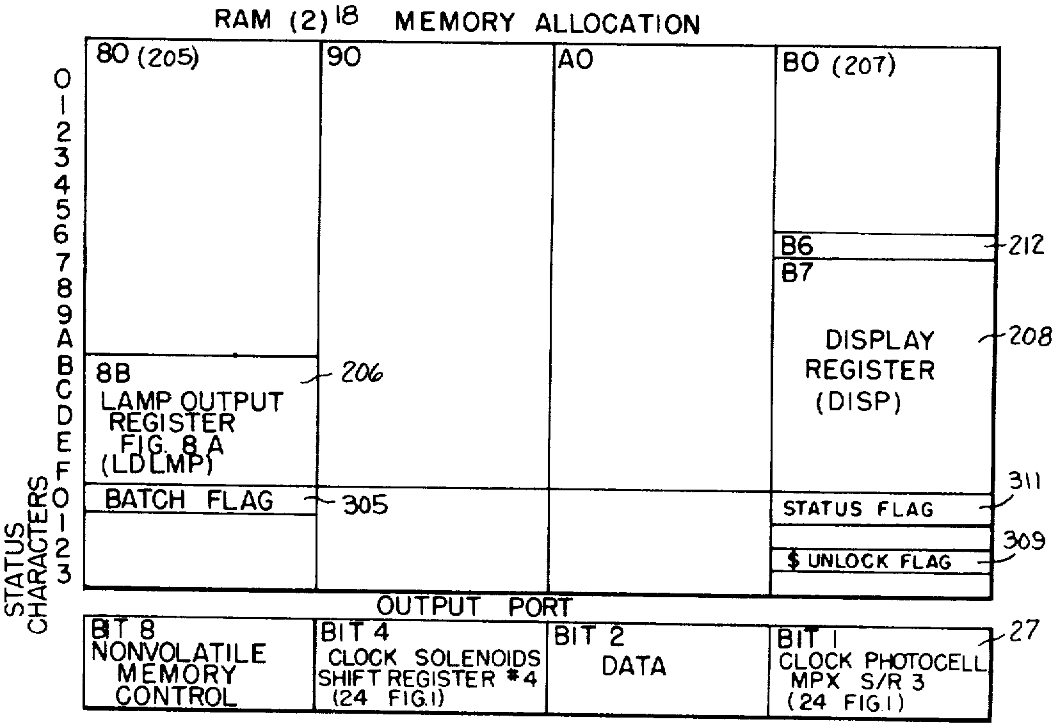
Figure 9:
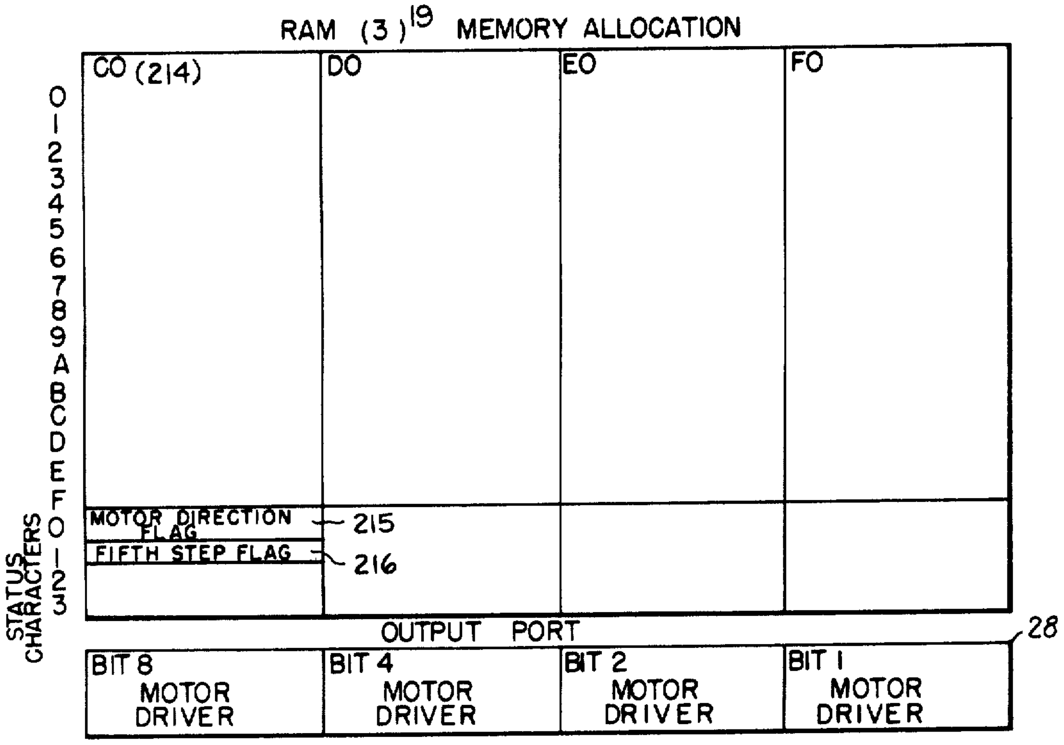
Figure 10:
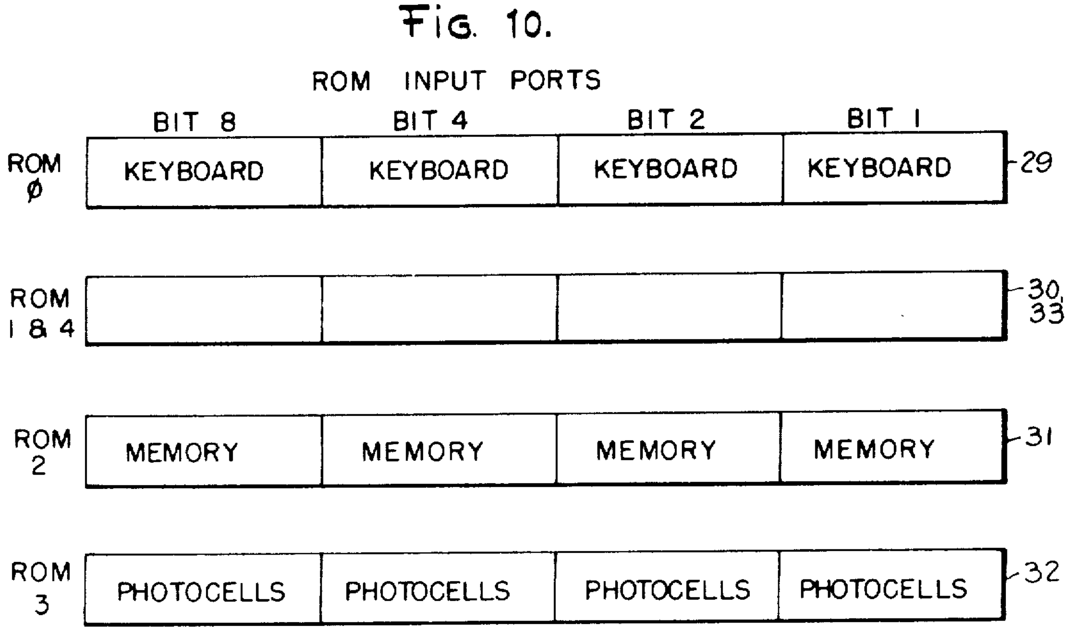

FIG. 1c i an enlarged plan view of the keyboard display shown in FIG. 1b;

FIG. 1d is a block diagram of the micro computerized LSI components making up the postage meter system of the invention;

FIG. 2 is a block diagram of the peripheral components for the computer system of FIG. 1d;

FIG. 3 is a perspective view of the postage setting and printing apparatus for the computerized postage meter system of FIG. 1d;

FIG. 4a is a side view of the setting and printing apparatus of FIG. 3 as taken along lines 4—4;

FIG. 4b is an enlarged partially cutaway perspective view of the yoke, main gear, and splined shaft of the setting mechanism of FIG. 3;

FIG. 5 is a front view of FIG. 4a with a section cutaway to show the intermeshing relationships between various geared parts;

FIG. 6 is a schematic view of the memory allocation shown for RAM($\phi$) 16 of FIG. 1d and its associated output port;

FIG. 7 is a schematic view of the memory allocation depicted for RAM(1)17 of FIG. 1d and its associated output port;

FIG. 8 is a schematic view of the memory allocation illustrated for RAM (2)18 of FIG. 1d and its associated output port;

FIG. 8a is a more detailed schematic view of a portion of the memory allocation shown in FIG. 8;

FIG. 9 is a schematic view of the memory allocation shown for RAM(3)19 of FIG. 1*d* and its associated output port;

FIG. 10 is a schematic view of the ROM input ports of FIG. 1*d;*

Figure 11:
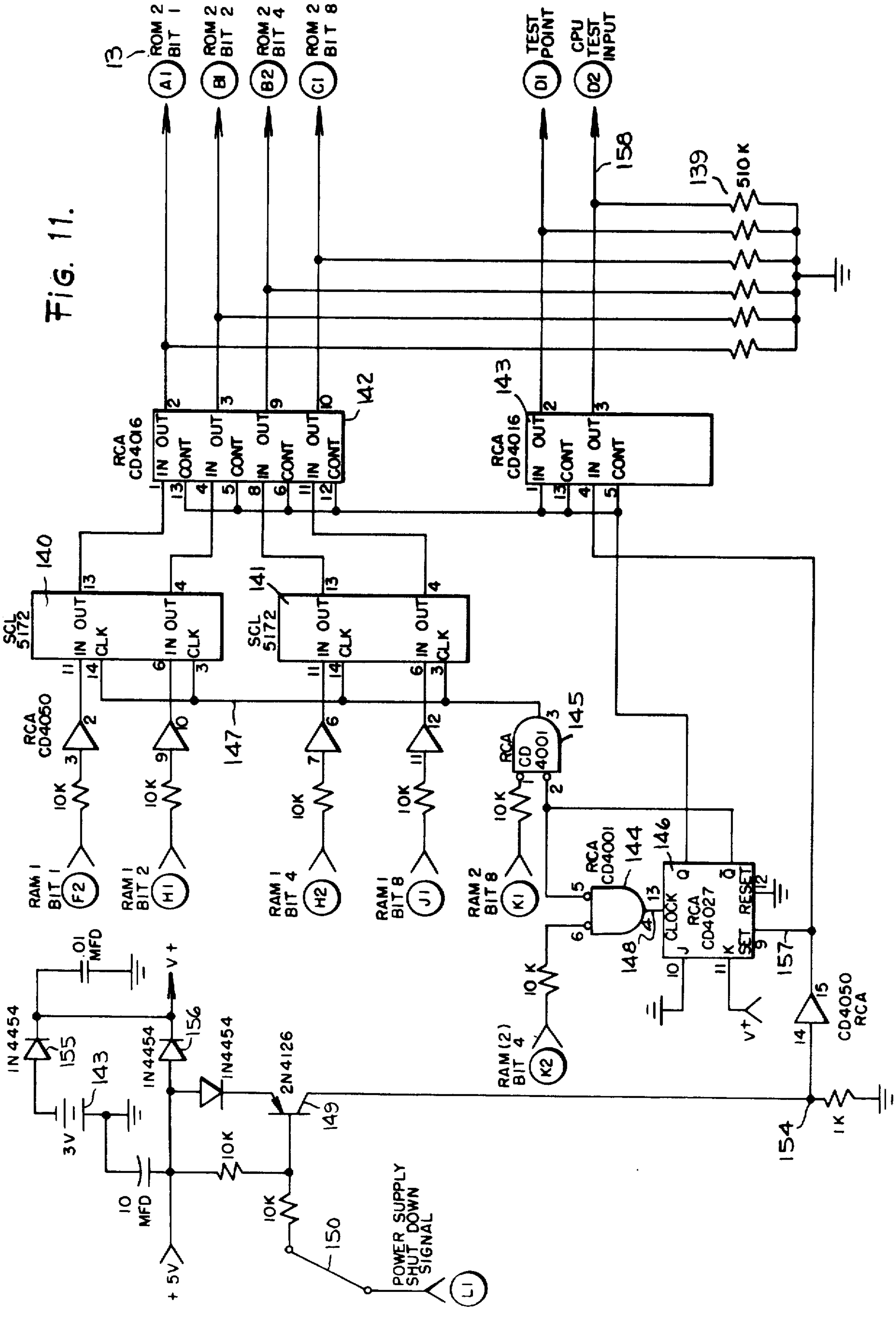
Figure 12A:
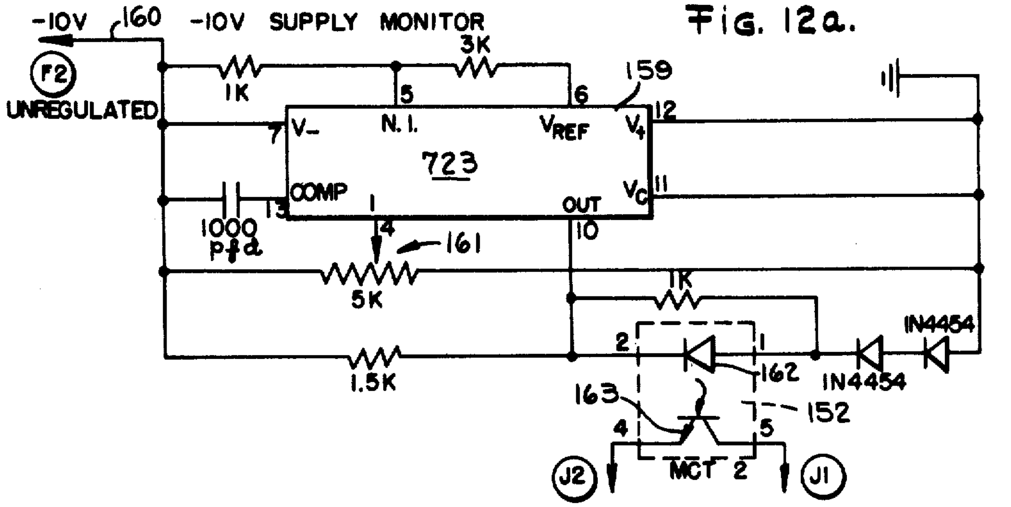

FIG. 11 is an electrical schematic for the non-volatile memory circuitry of FIG. 2;

FIG. 12*a* is an electrical schematic of the monitoring circuit for the −10 volt power supply for the system of FIG. 1*d;*

Figure 12B:
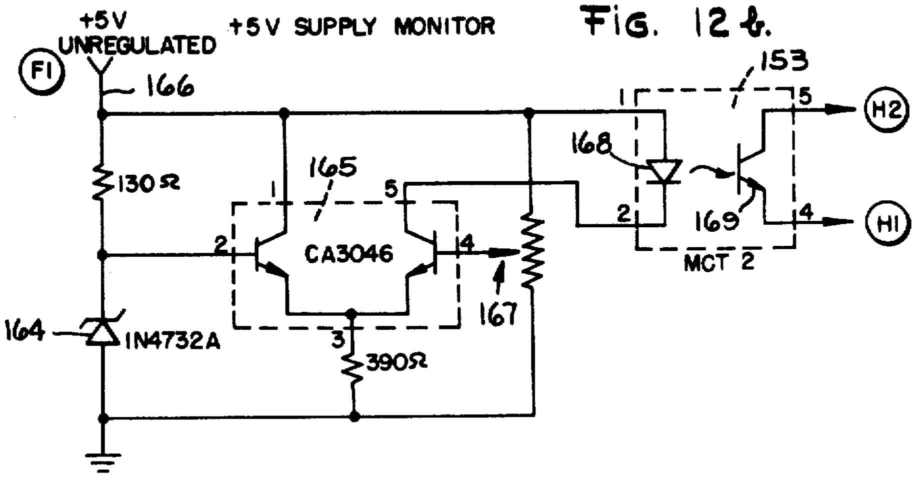

FIG. 12*b* is an electrical schematic of the monitoring circuit for the +5 volt power supply for the system of FIG. 1*d;*

Figure 13:
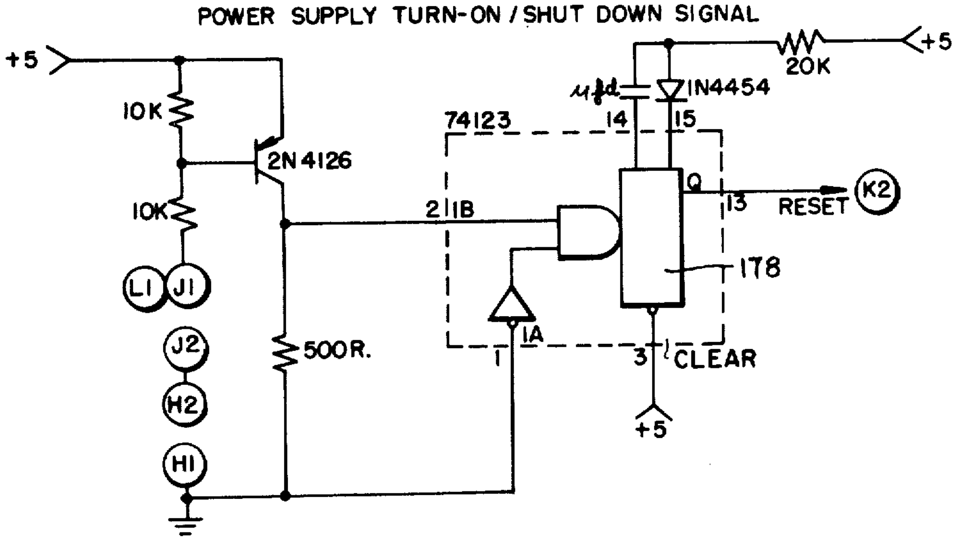

FIG. 13 is an electrical schematic of the reset circuitry for the system of FIG. 1*d;*

Figure 14B:
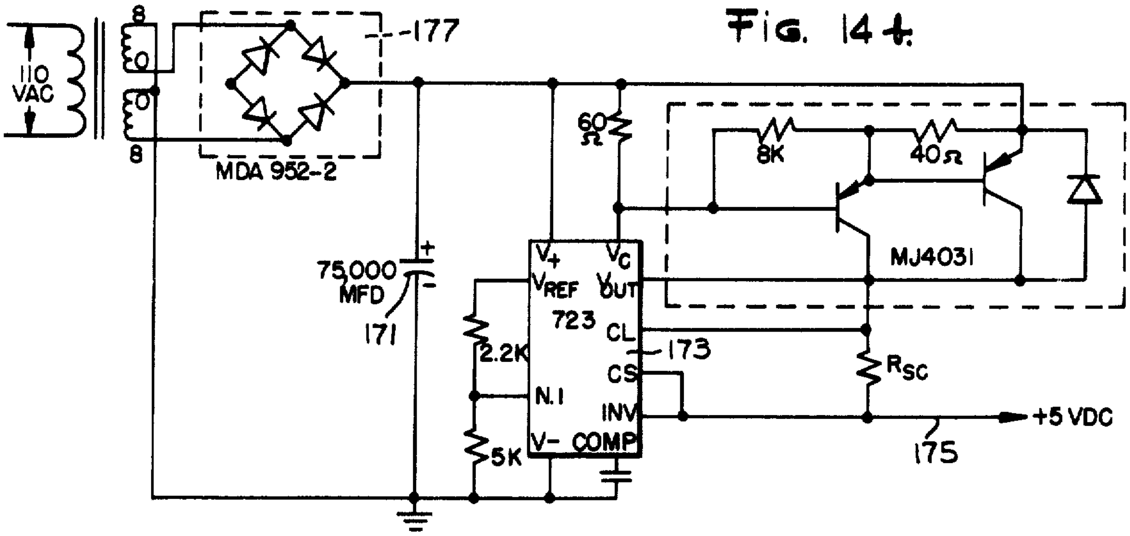
Figure 14A:
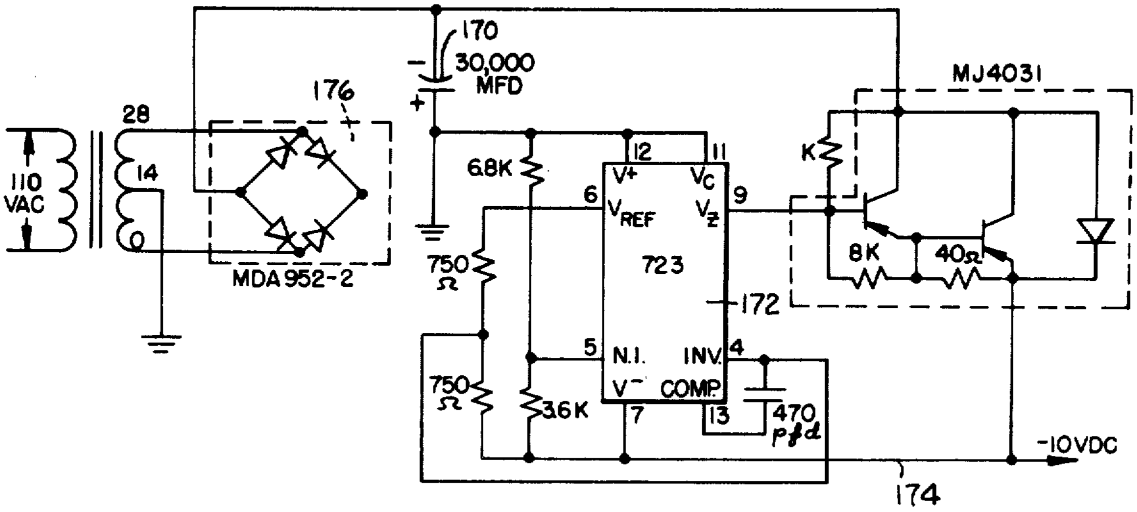

FIG. 14*a* is an electrical schematic for the −10 volt power supply for the system of FIG. 1*d;*

FIG. 14*b* is an electrical schematic for the +5 volt power supply for the system of FIG. 1*d;*

Figure 14C:
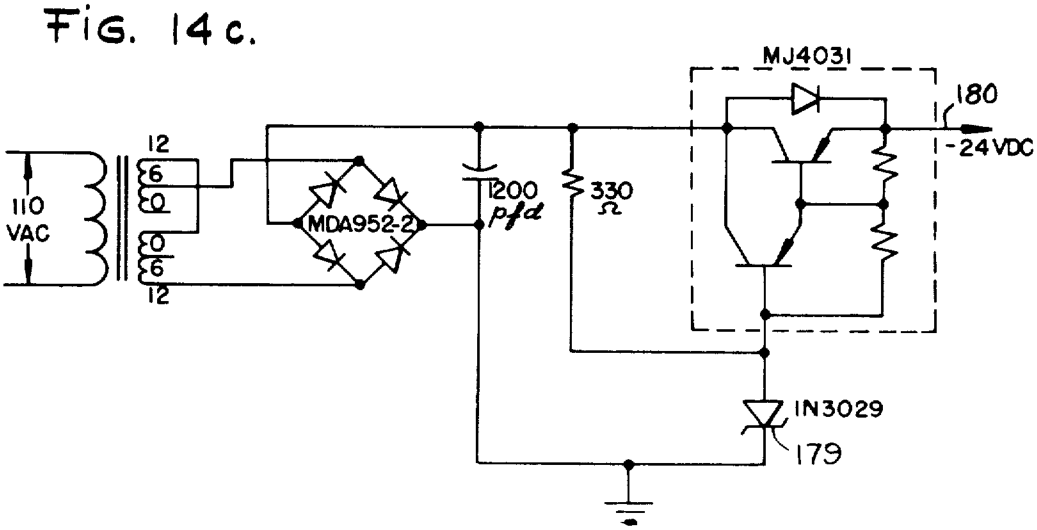
Figure 15:
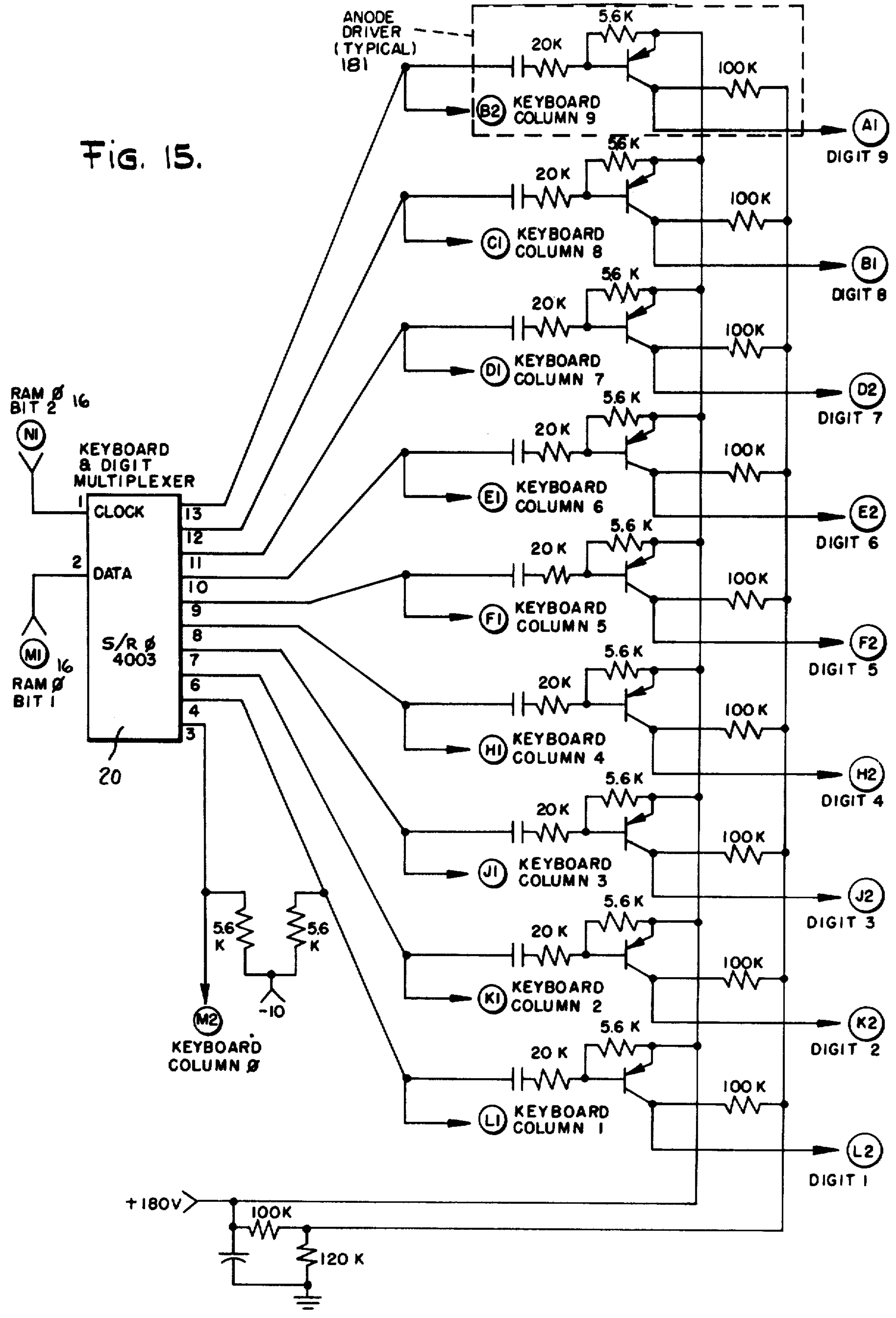

FIG. 14*c* is an electrical schematic for the −24 volt power supply for powering some of the peripheral components shown in FIG. 2;

FIG. 15 is an electrical schematic of the circuitry associated with the shift register (φ) 20 of FIG. 1*d* for multiplexing the keyboard and the display of FIGS. 1*b* and 1*c;*

Figure 16:
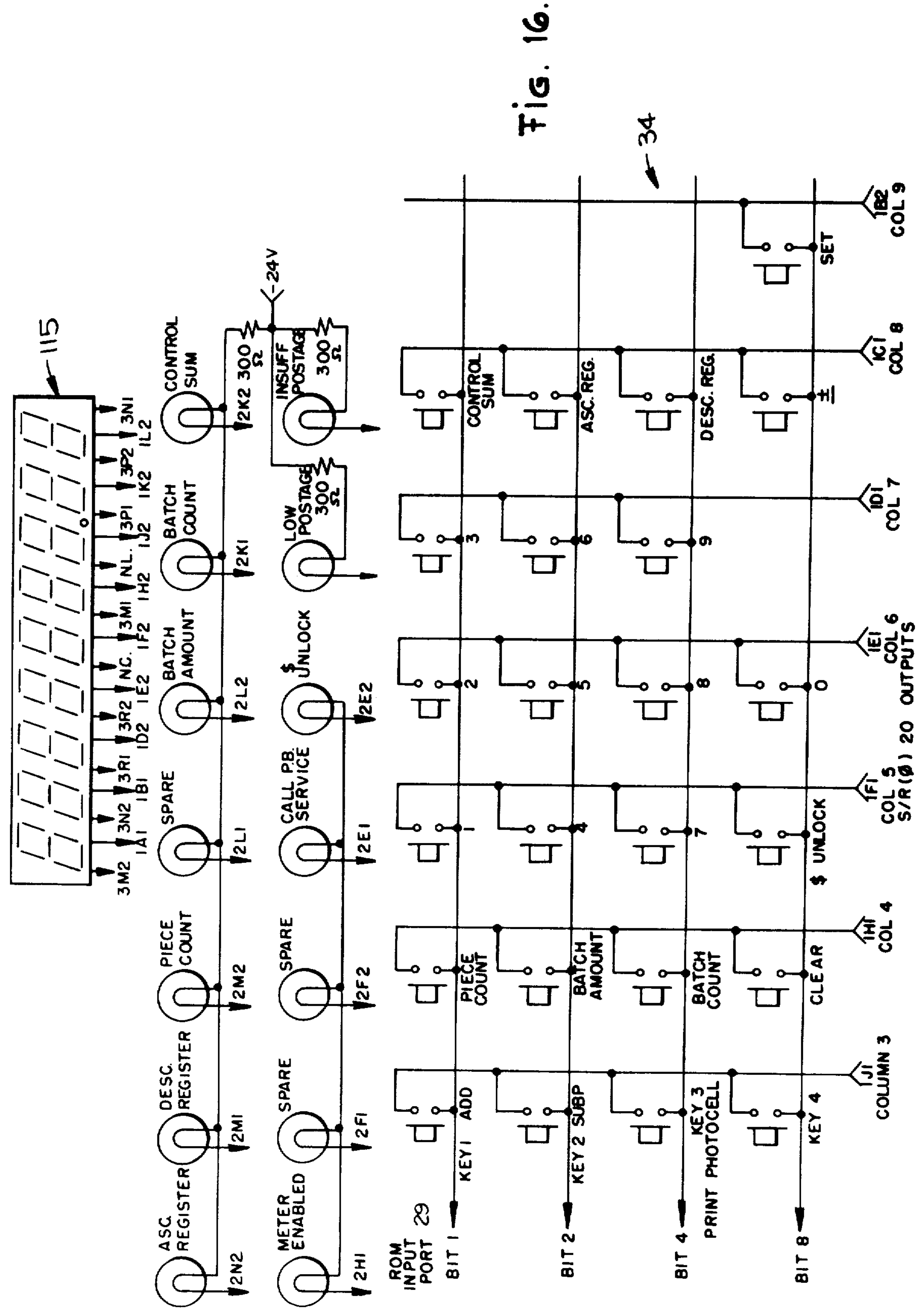

FIG. 16 is an electrical schematic of the keyboard and the display shown in FIGS. 1*b* and 1*c;*

Figure 17:
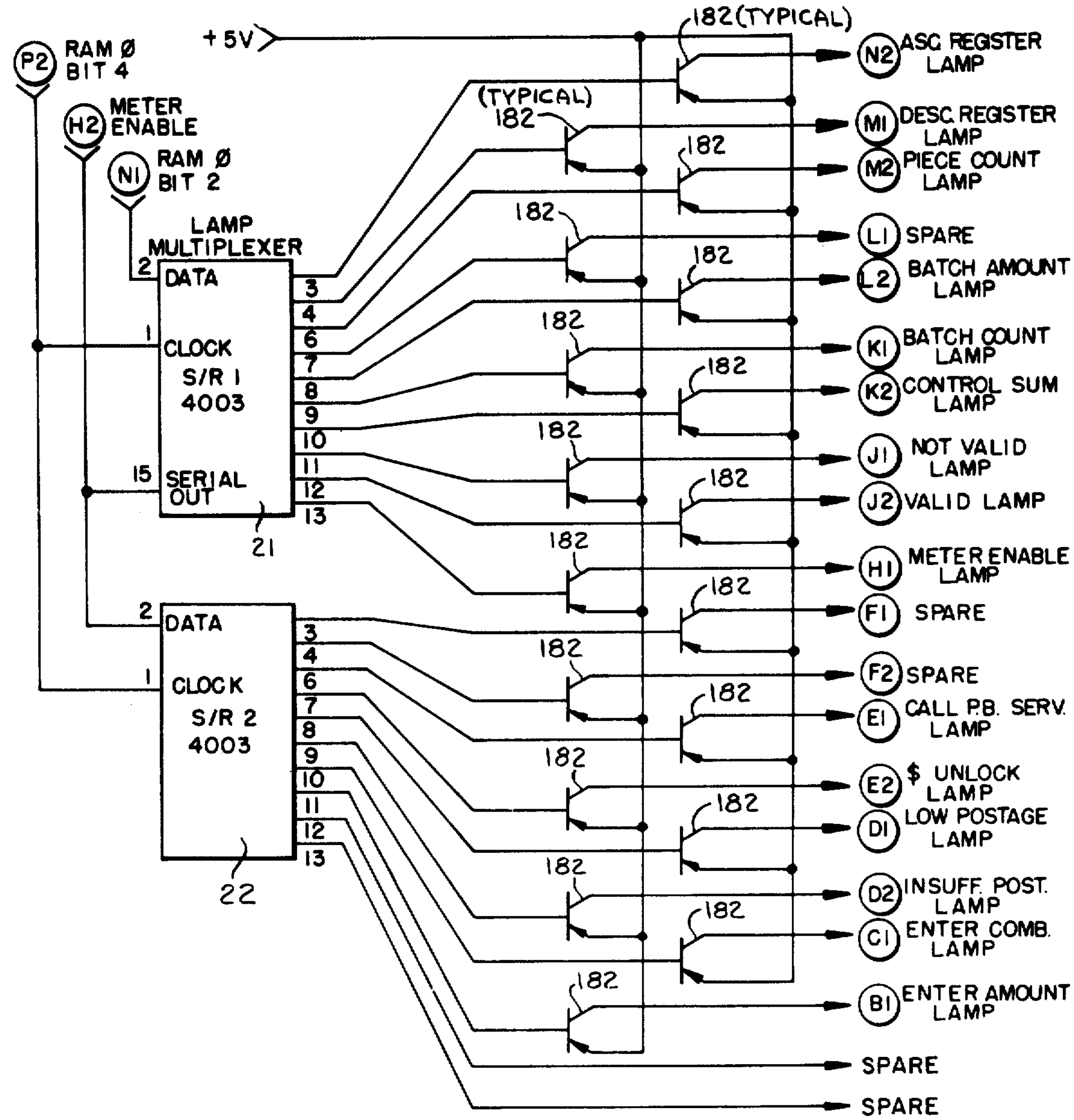
Figure 18:
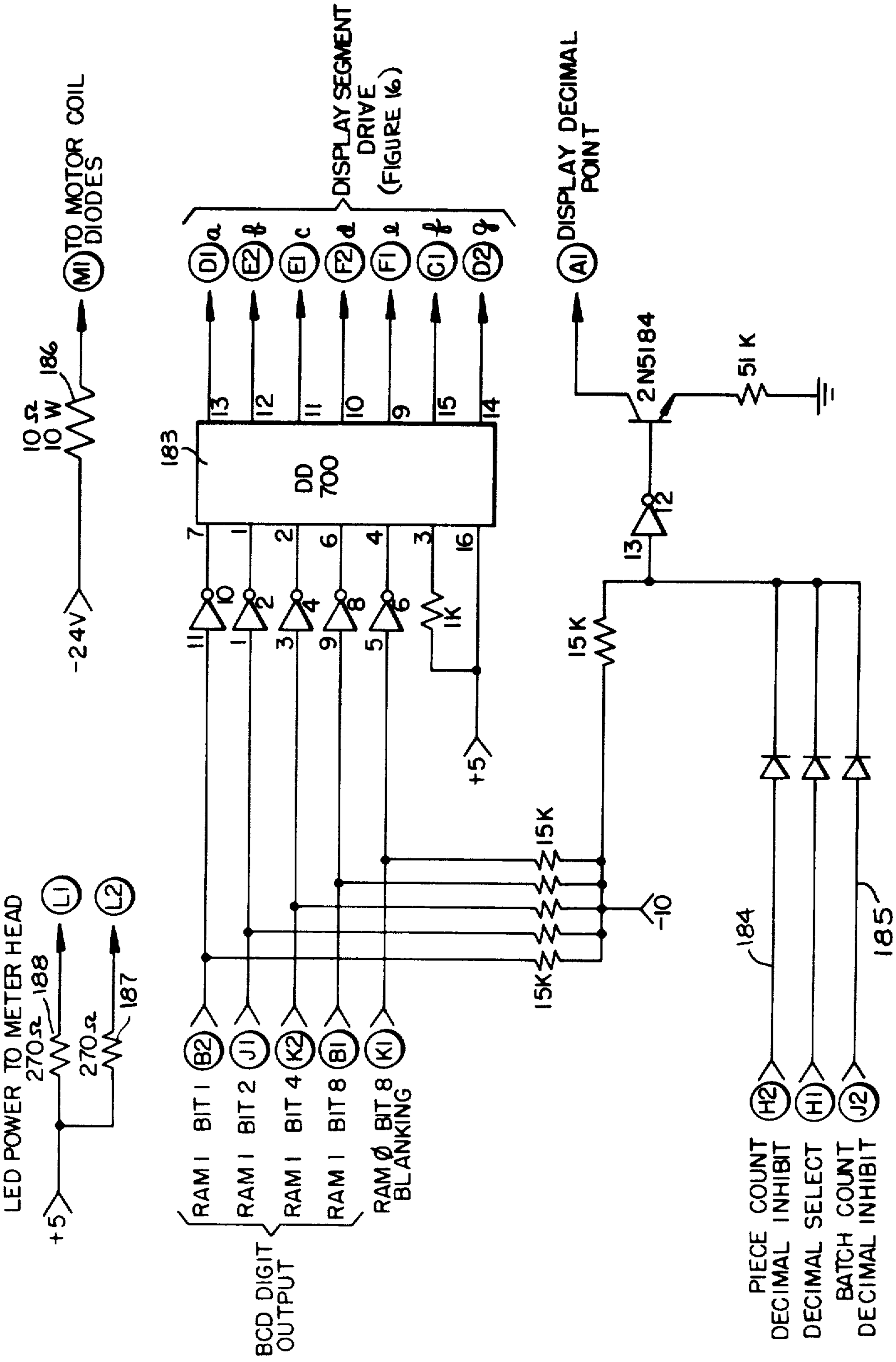
Figure 19:
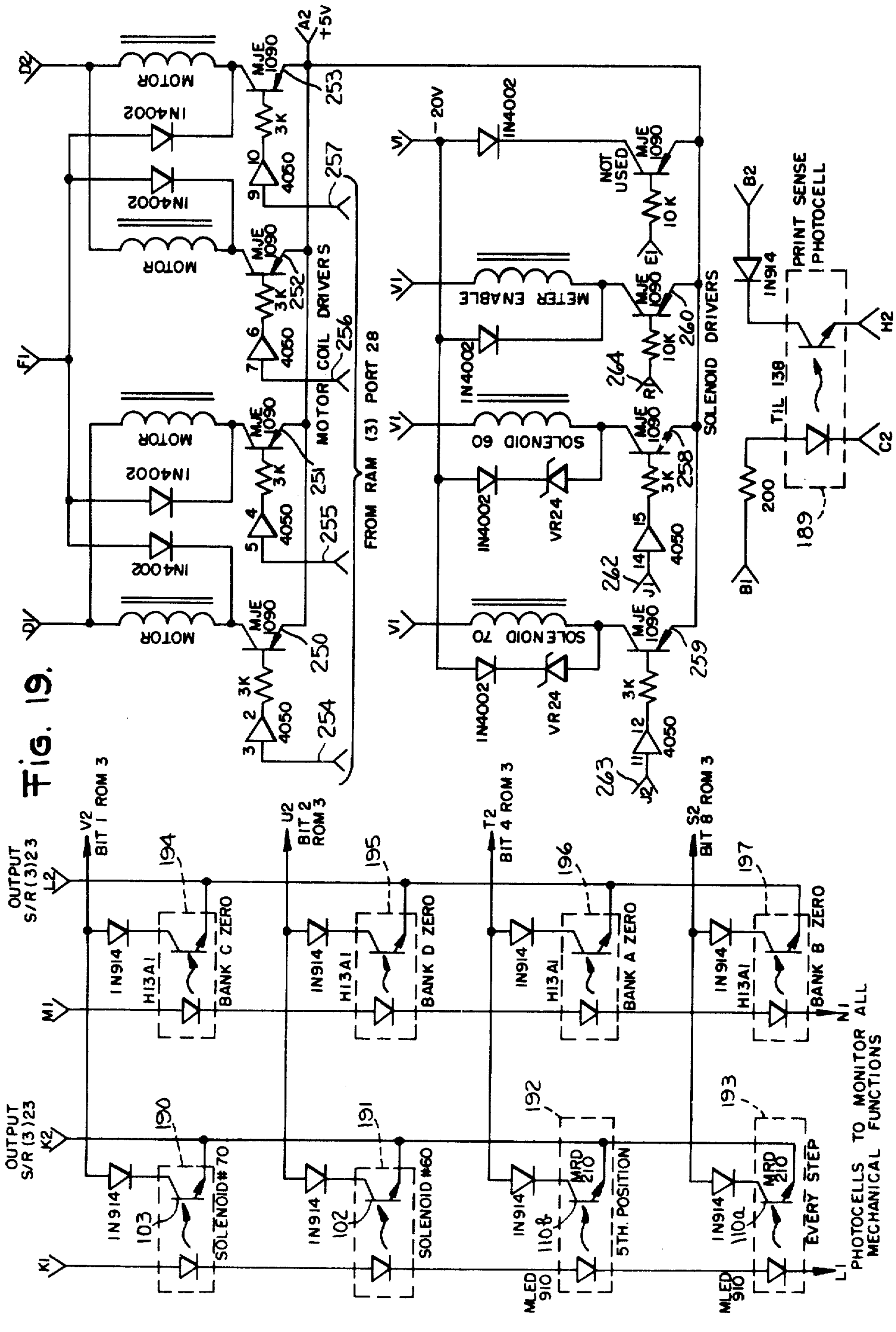
Figure 20:
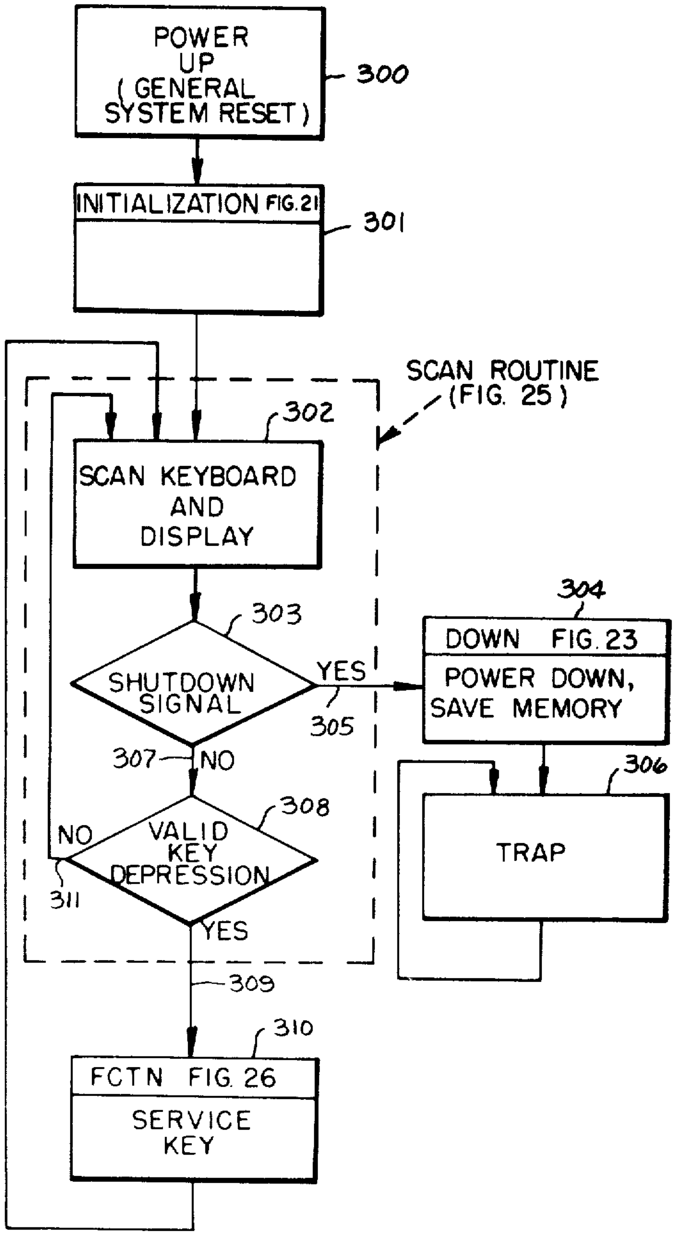
Figure 21:
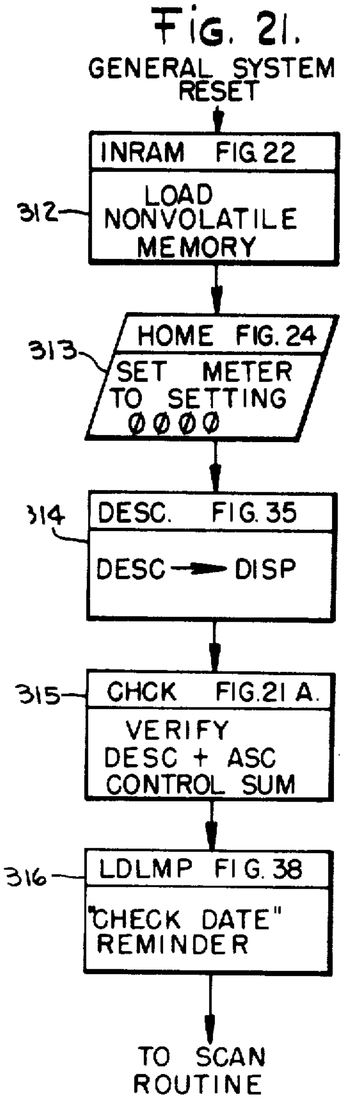
Figure 21A:
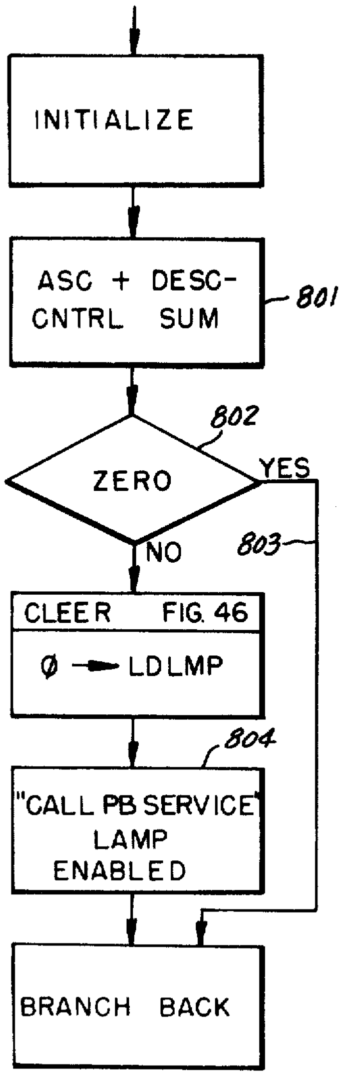
Figure 22:
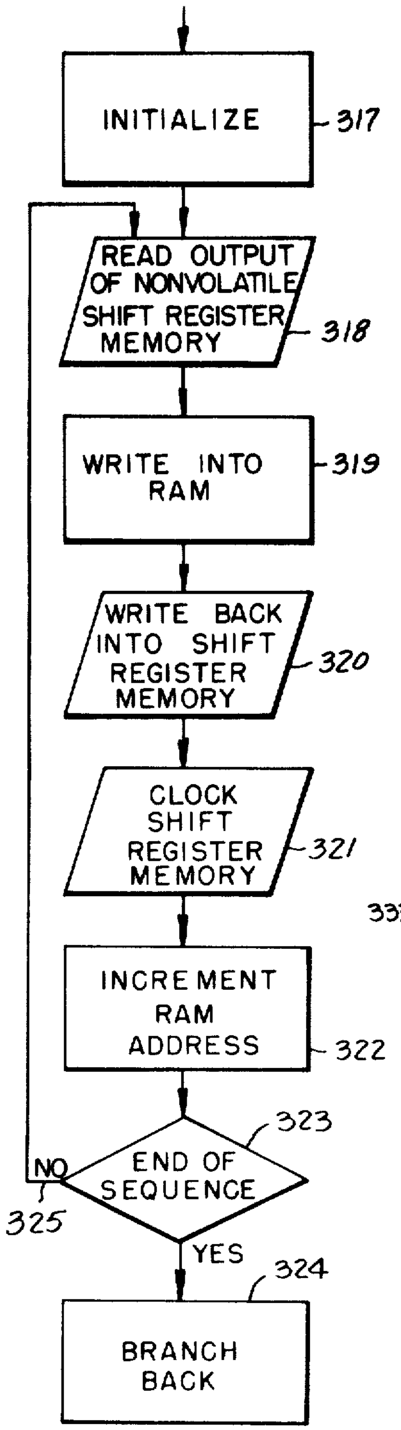
Figure 23:
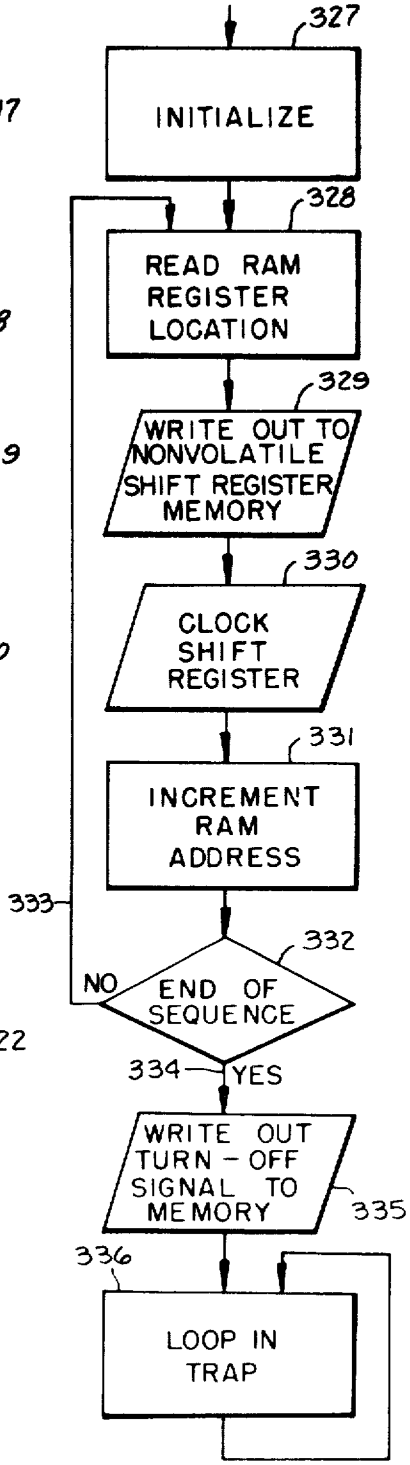
Figure 24:
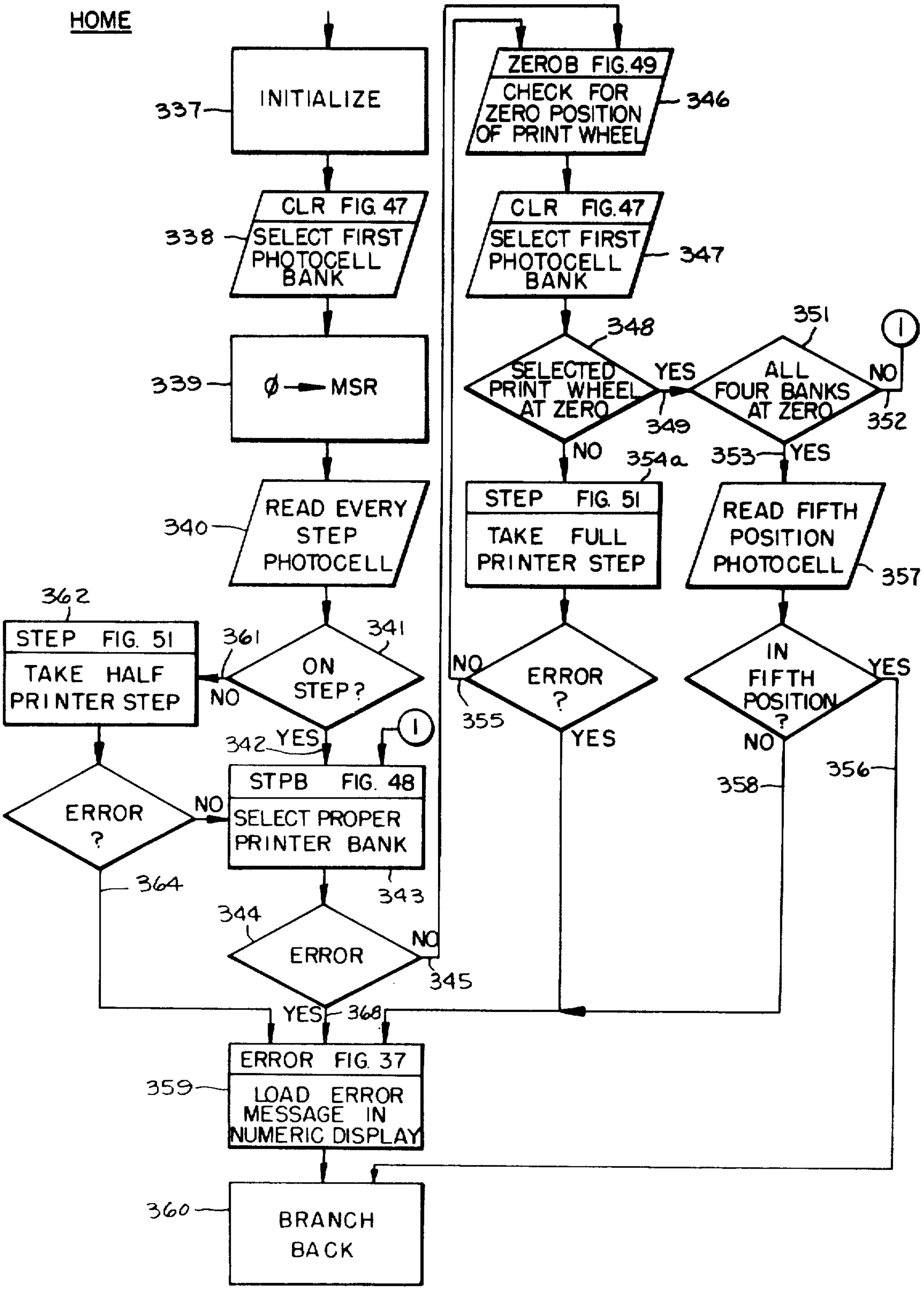
Figure 28:
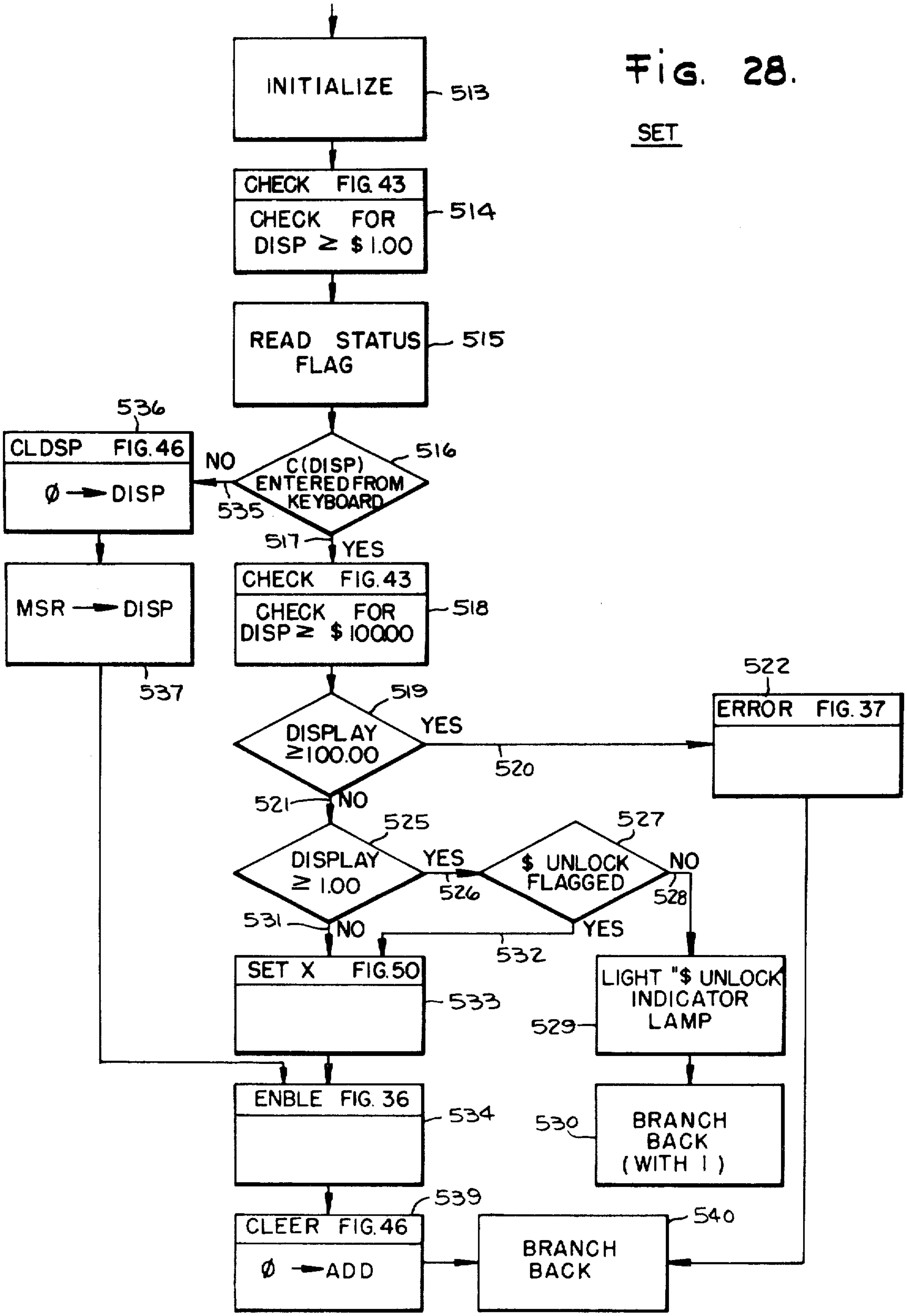
Figure 31:
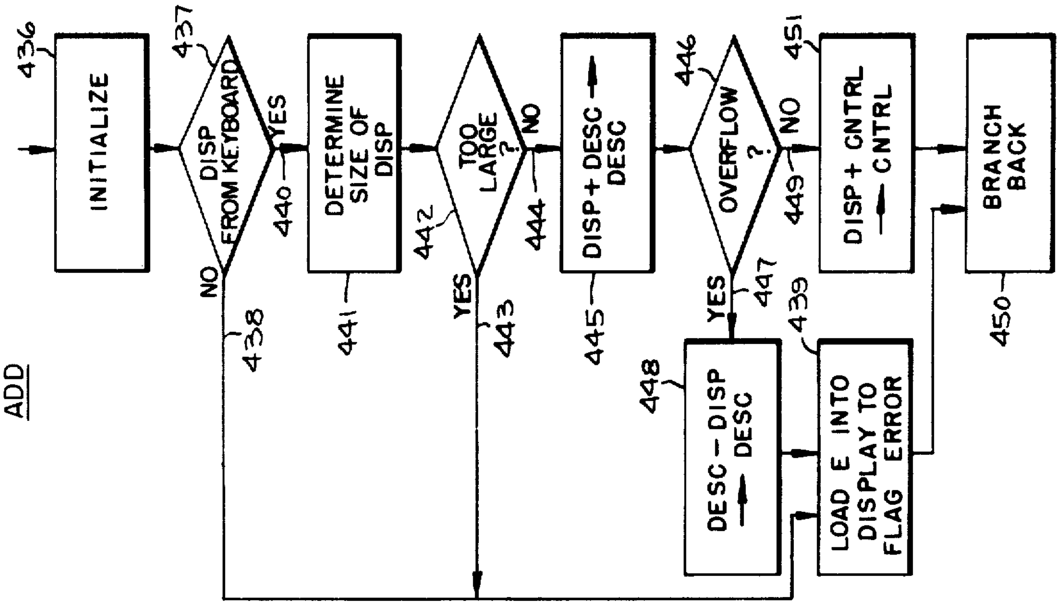
Figure 30:
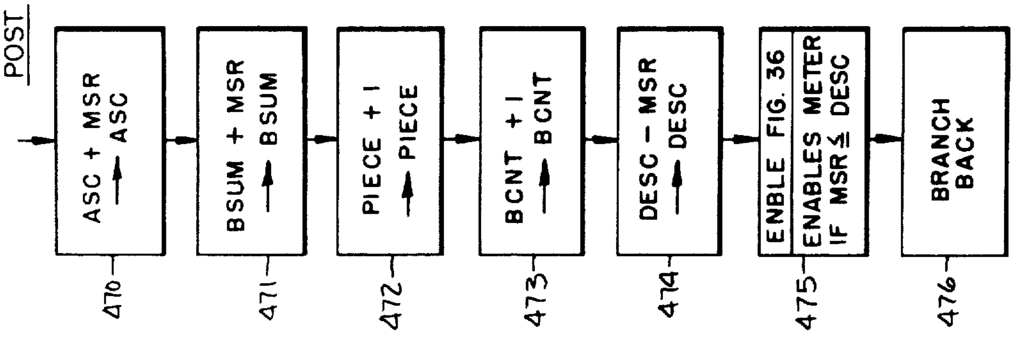
Figure 29:
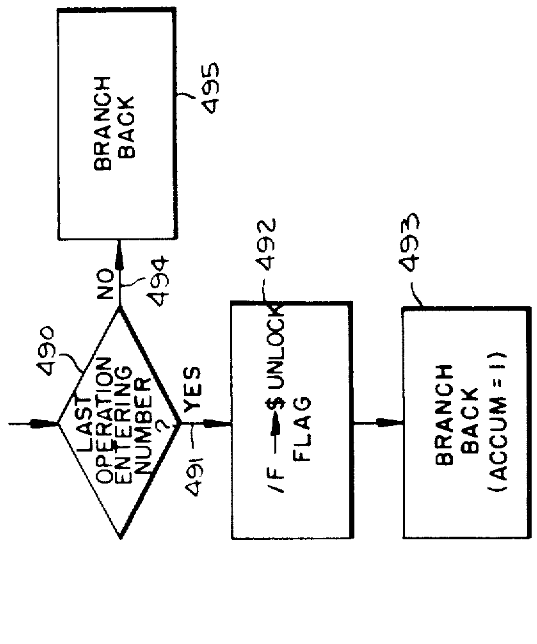
Figure 32:
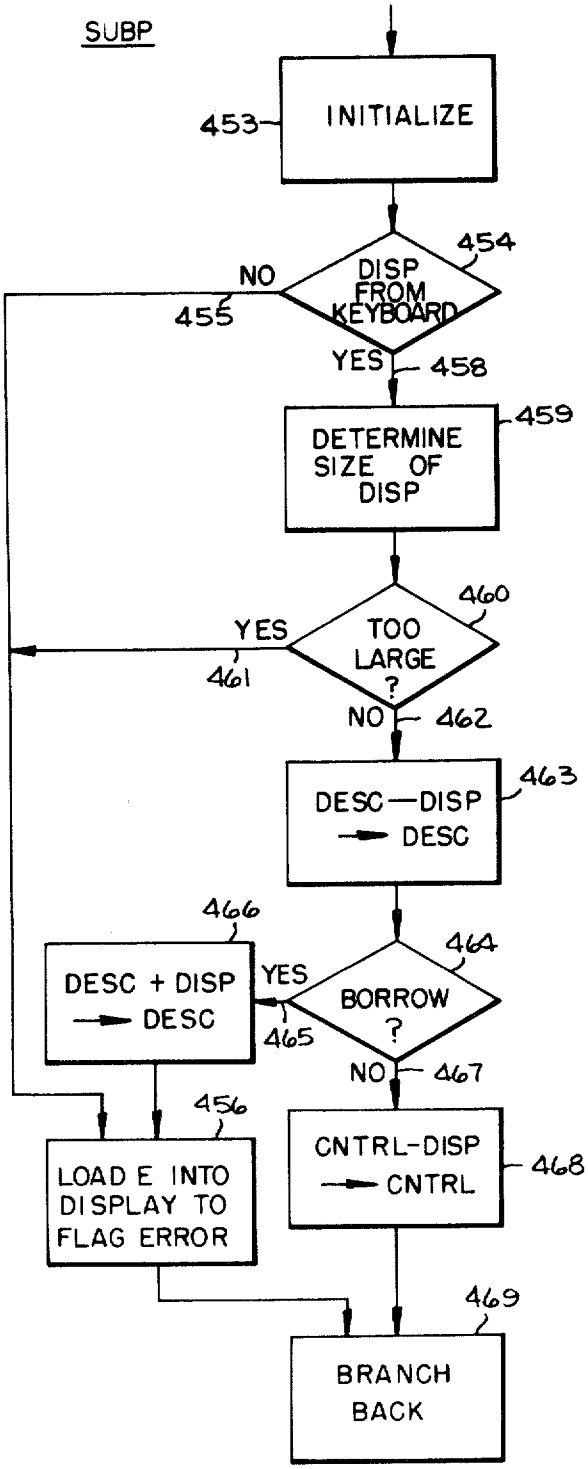
Figure 33:
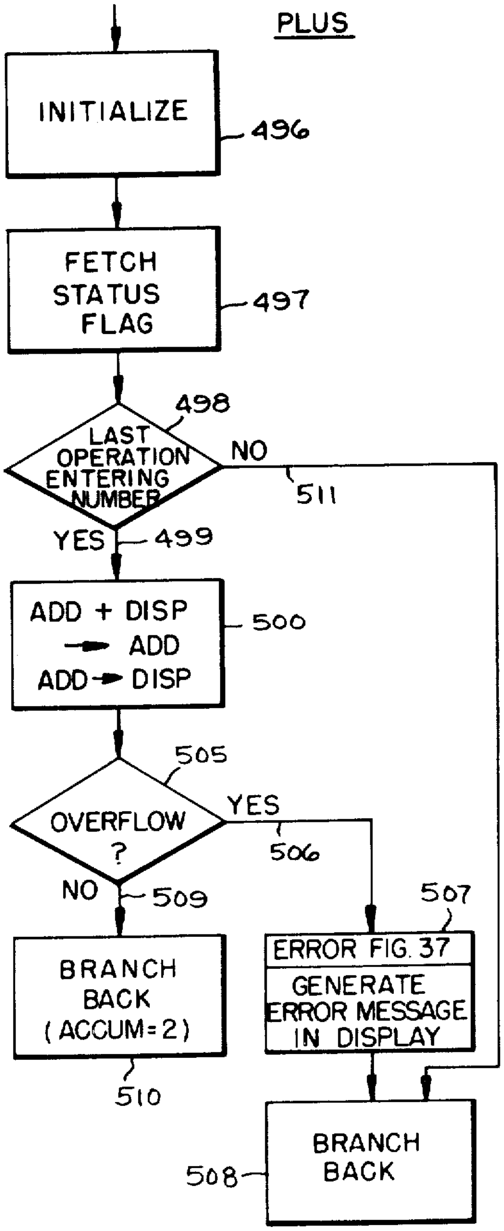
Figure 43:
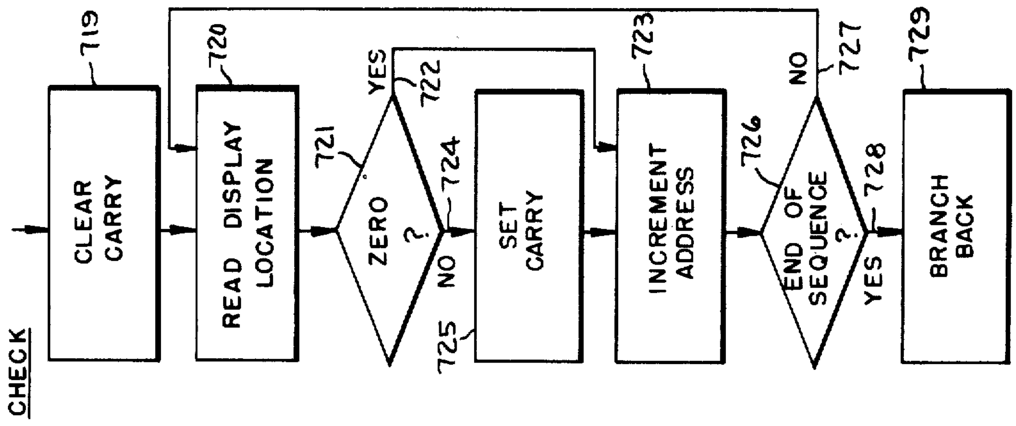
Figure 42:
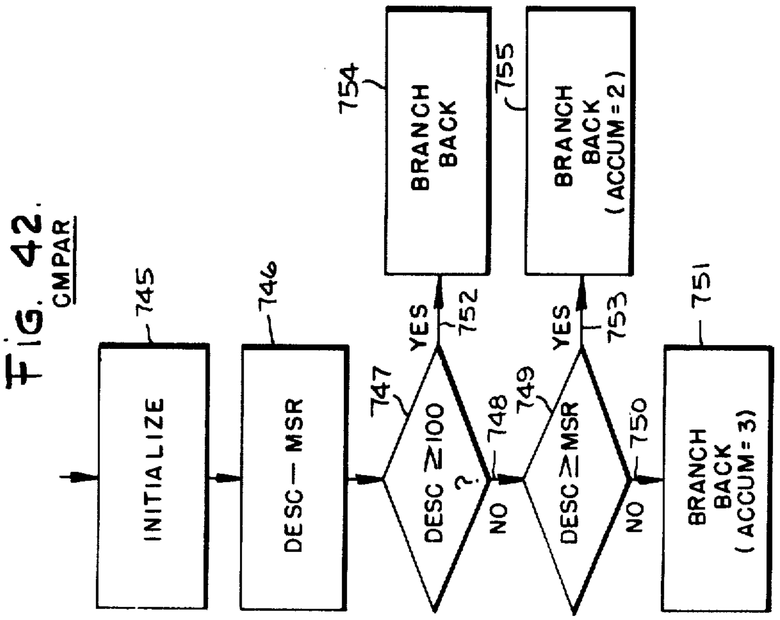
Figure 41:
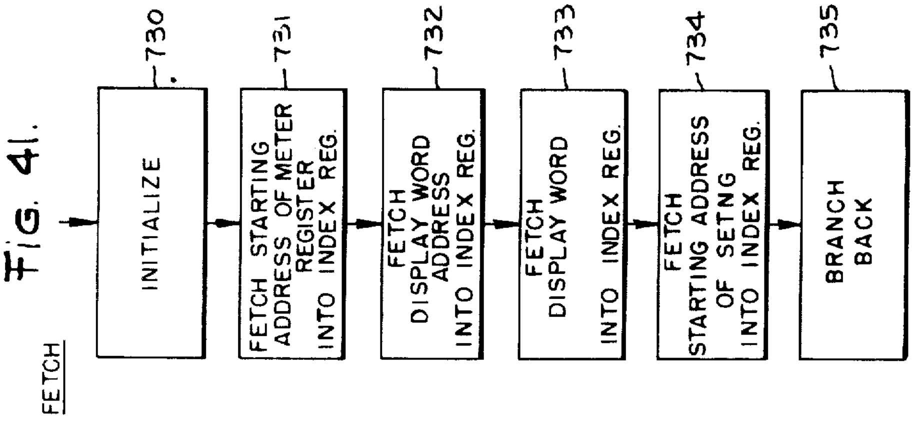
Figure 46:
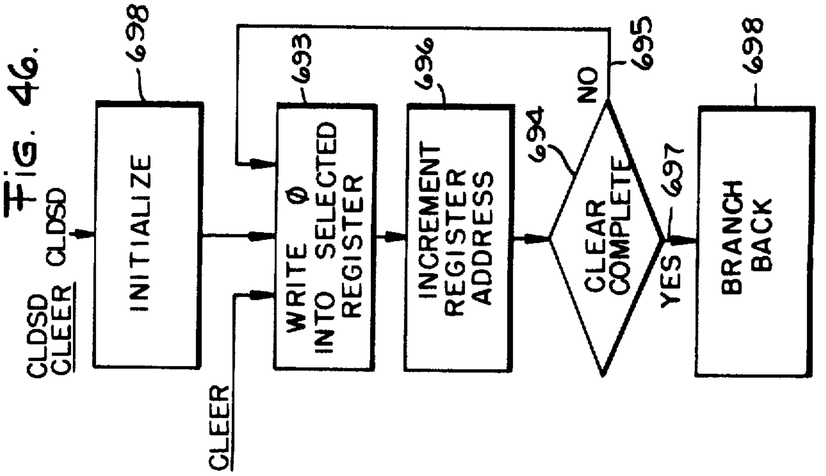
Figure 45:
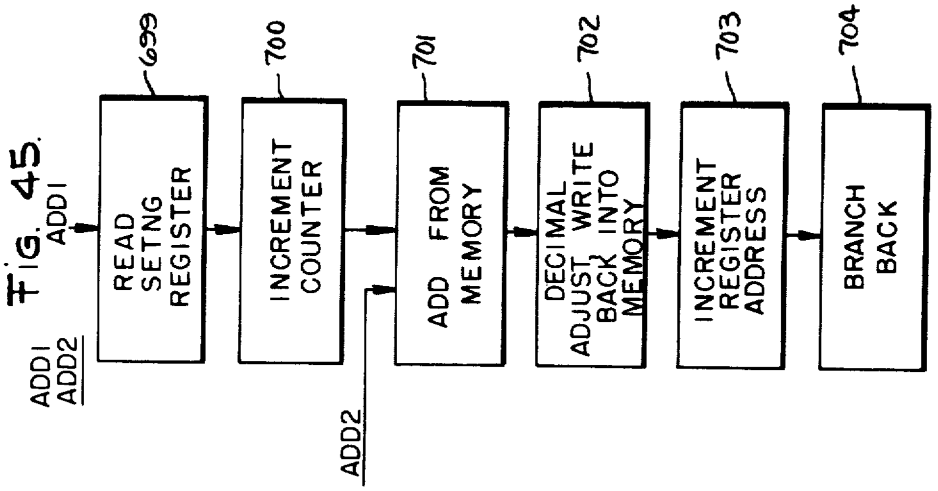
Figure 44:
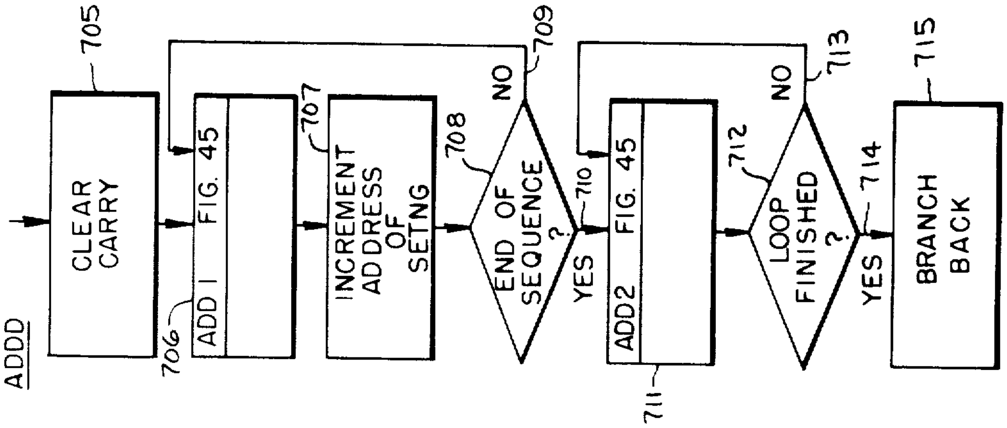
Figure 47:
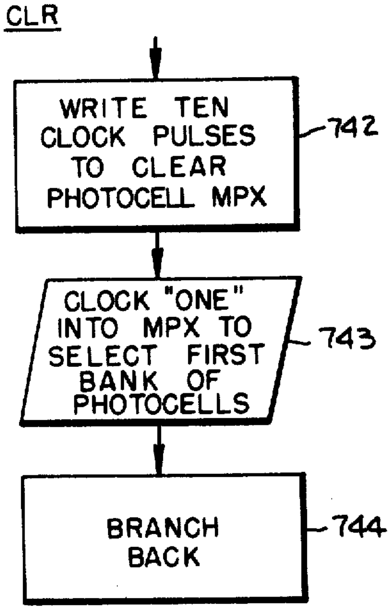
Figure 48:
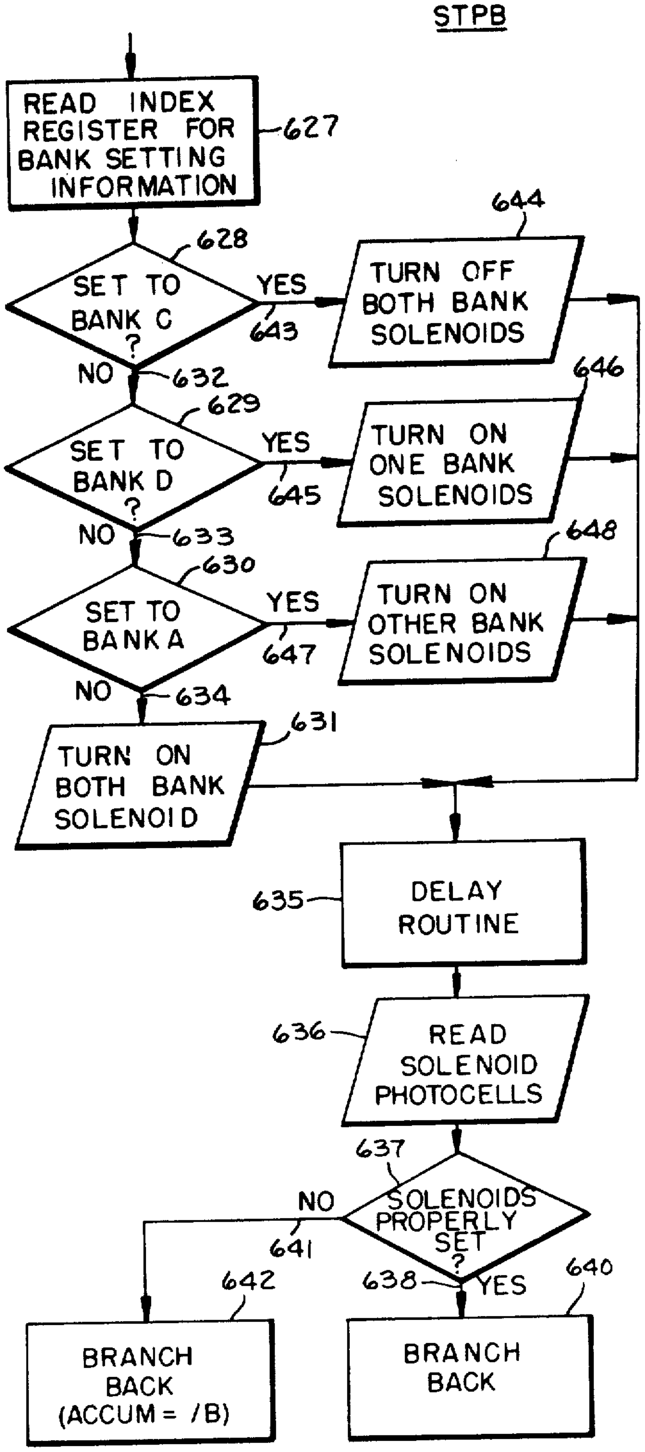
Figure 49:
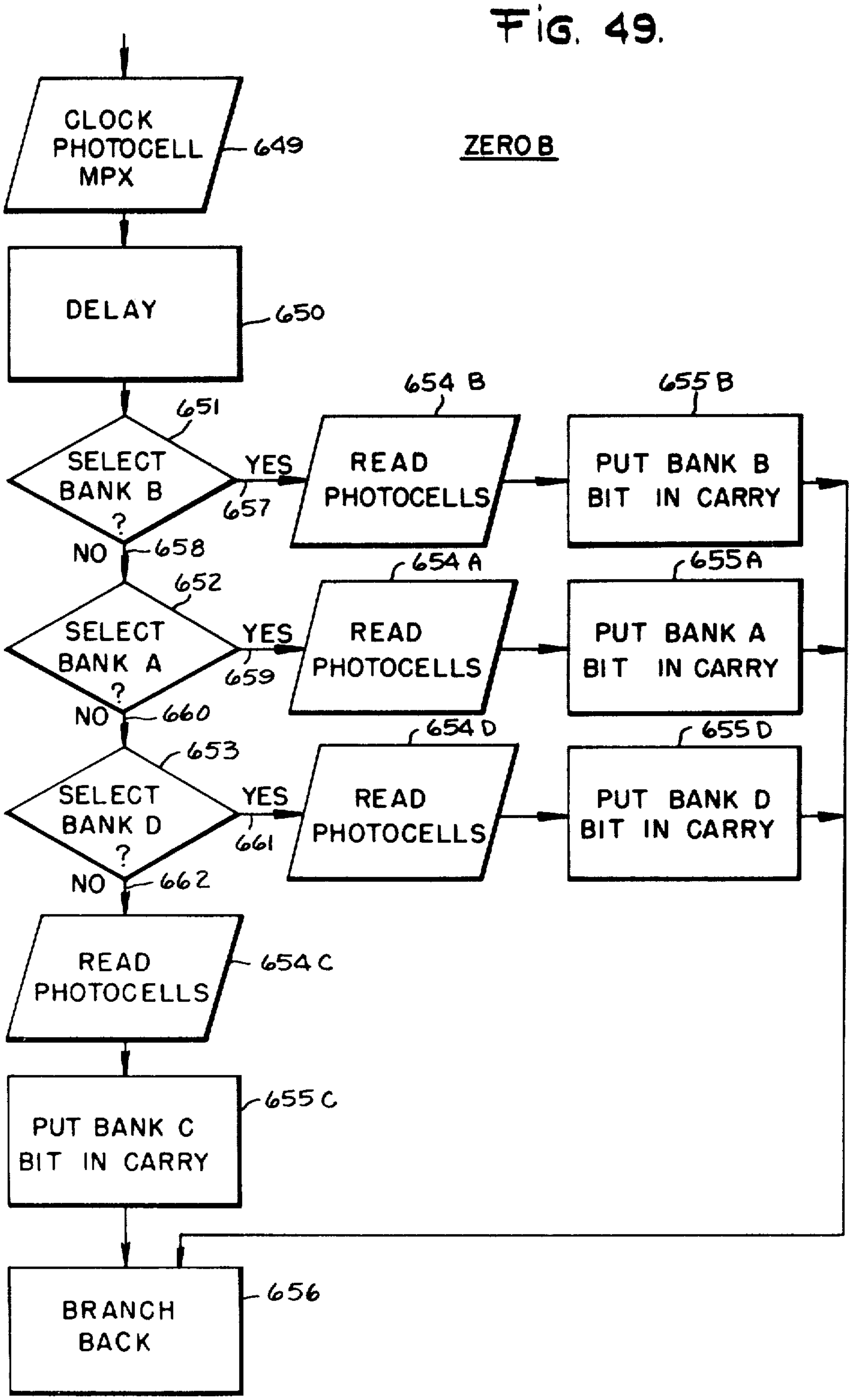
Figure 50:
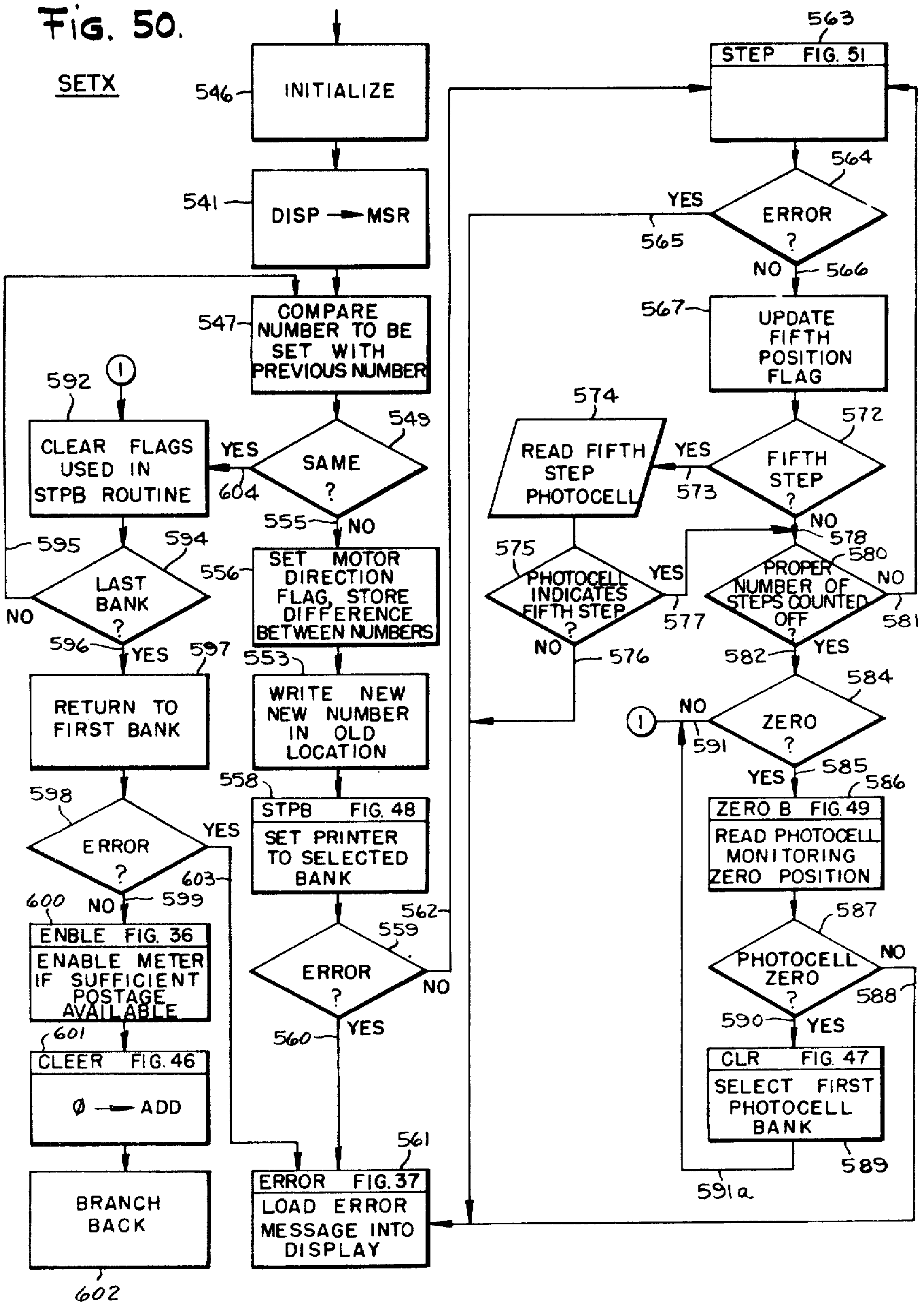
Figure 51:
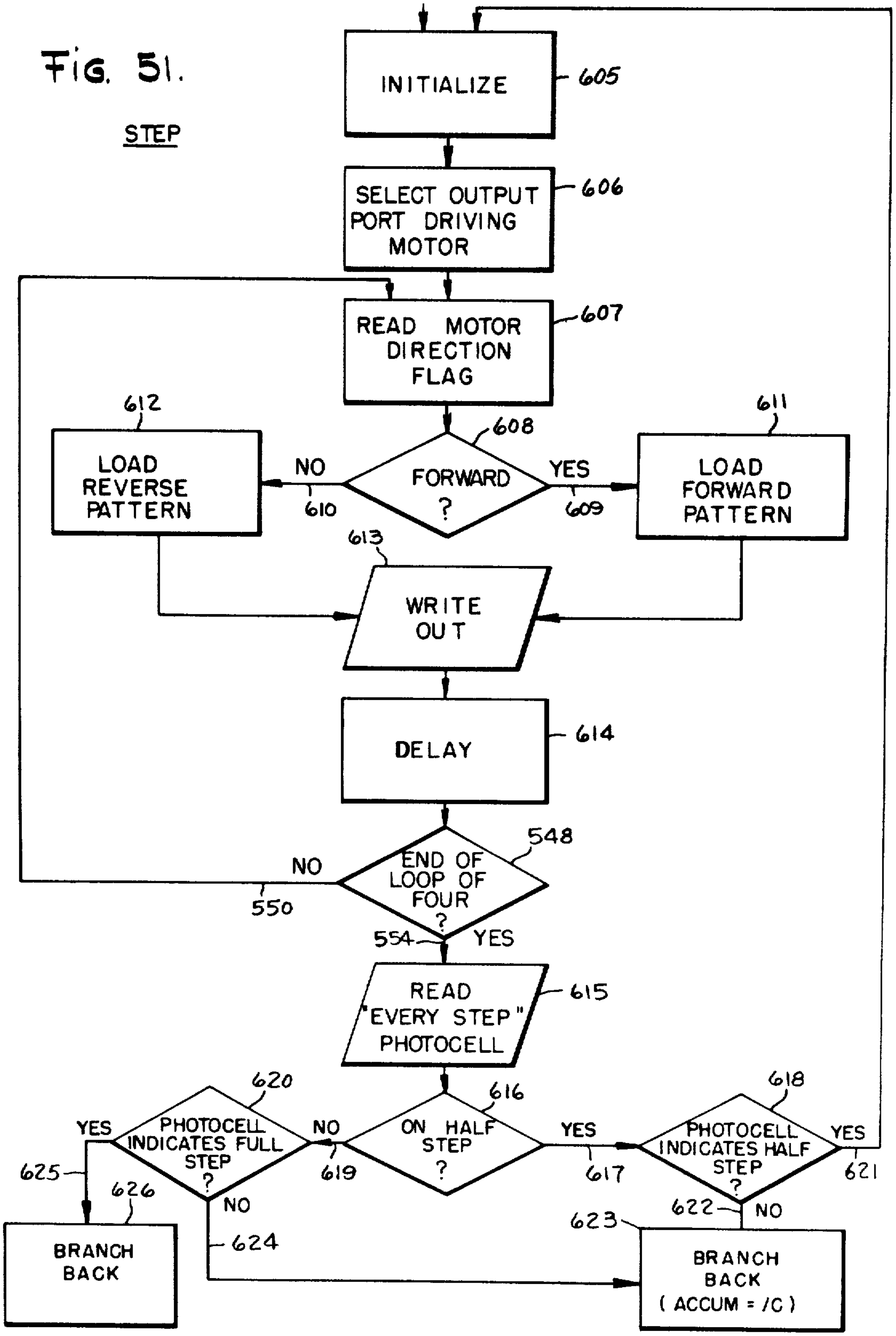

FIG. 17 is an electrical schematic of the circuitry associated with shift registers (1)21 and (2)22 of FIG. 1*d*, for controlling the indicator lamps of FIG. 16;

FIG. 18 is an electrical schematic of the decimal point circuitry and the decoder driver circuitry for the display of FIGS. 1*b*, 1*c* and 16;

FIG. 19 is an electrical schematic for the meter monitoring photocells, the stepper motor coil drivers, and the print sensing photocell of the setting and printing mechanism of FIG. 3;

FIGS. 20 and 21 show a generalized overall operation for the system of FIGS. 1*d* and 2, in a flow chart form;

FIG. 21*a* shows a flow chart for the subroutine CHCK for the system of FIGS. 1*d* and 2;

FIG. 22 depicts a flow chart for the subroutine INRAM for the system of FIGS. 1*d* and 2;

FIG. 23 illustrates a flow chart for the subroutine DOWN for the system of FIGS. 1*d* and 2;

FIG. 24 shows a flow chart for the HOME subroutine for the system of FIGS. 1*d* and 2;

FIG. 25 shows a flow chart for the SCAN subroutine for the system of FIGS. 1*d* and 2;

FIG. 26 depicts the chart for the subroutine FCTN for the system of FIGS. 1*d* and 2;

FIG. 27 illustrates the flow chart for the digits subroutine for entering numbers into the display for the system of FIGS. 1*d* and 2;

FIG. 28 shows the flow chart for the subroutine SET for the system of FIGS. 1*d* and 2;

FIG. 29 depicts the flow chart for the subroutine UNLCK for the system of FIGS. 1*d* and 2;

FIG. 30 illustrates the flow chart for the subroutine POST for the system of FIGS. 1*d* and 2;

FIG. 31 shows the flow chart for the subroutine ADP for the system of FIGS. 1*d* and 2;

FIG. 32 depicts the flow chart for the subroutine SUBP for the system of FIGS. 1*d* and 2;

FIG. 33 illustrates the flow chart for the subroutine PLUS for the system of FIGS. 1*d* and 2;

FIG. 34 shows the flow chart for the subroutine CLEAR for the system of FIGS. 1*d* and 2;

FIG. 35 depicts a flow chart for a subroutine for calling register contents into the display for the system of FIGS. 1*d* and 2;

FIG. 36 illustrates a flow chart for the subroutine ENBLE for the system of FIGS. 1*d* and 2;

FIG. 37 illustrates a flow chart for the subroutine ERROR for the system of FIGS. 1*d* and 2;

FIG. 38 shows a flow chart for the portion of the subroutine SCAN of FIG. 25 referred to as SCANX for the system of FIGS. 1*d* and 2;

FIG. 39 depicts a flow chart for the subroutine LDLMP for the system of FIGS. 1*d* and 2;

FIG. 40 illustrates a flow chart for the subroutine OUTPT for the system of FIGS. 1*d* and 2;

FIG. 41 shows a flow chart for the subroutine FETCH for the system of FIGS. 1*d* and 2;

FIG. 42 depicts a flow chart for the subroutine CMPAR for the system of FIGS. 1*d* and 2;

FIG. 43 illustrates a flow chart for the subroutine CHECK for the system of FIGS. 1*d* and 2;

FIG. 44 shows a flow chart for the subroutine ADDD for the system of FIGS. 1*d* and 2;

FIG. 45 depicts a flow chart for the subroutine ADD1; ADD2 for the system of FIGS. 1*d* and 2;

FIG. 46 illustrates a flow chart for the subroutine CLDSP;CLEER for the system of FIGS. 1*d* and 2;

FIG. 47 shows a flow chart for the subroutine CLR for the system of FIGS. 1*d* and 2;

FIG. 48 depicts a flow chart for the subroutine STPB for the system of FIGS. 1*d* and 2;

FIG. 49 illustrates a flow chart for the subroutine ZERO B for the system of FIGS. 1*d* and 2;

FIG. 50 shows a flow chart for the subroutine SETX for the system of FIGS. 1*d* and 2; and FIG. 51 depicts a flow chart for the subroutine STEP for the system of FIGS. 1*d* and 2.

Referring now to FIG. 1*a*, the general functional arrangement of the computerized postal meter system of the present invention is shown. The heart of the system is the CPU and it performs two basic functions: performance of calculations based on input data and controlling the flow of data between various memory units. Two basic memory units are employed with the CPU. The first is the permanent memory PM which is a non-alterable memory storing a specific sequence of operations for performing postal data calculations in accordance with certain predetermined inputs as well as performing other routines for operating the system. The second memory unit is a temporary memory TM which interacts with the CPU for forming a temporary storage, holding and forwarding working data in accordance with the calculations being performed by the CPU. An additional memory component NVM is also coupled to the CPU and performs a storage function which is very significant in the system operation of a postal data system. The NVM is a nonvolatile memory which acts to store certain critical information employed in the postal system as part of a predetermined routine activated either upon shut-down or start-up. This routine may be located in the permanent memory and is accessed by appropriate sensing device sensing either of the two stated conditions, shut-down or start-up, for operating the CPU in accordance with that routine. The function of this routine is to take information stored in the temporary memory TM which represents crucial accounting functions such as descending balances or ascending credits and the like and store them in the NVM (nonvolatile memory) wherein they may be held while the machine is de-energized and recalled upon a subsequent start-up. In this manner, the computer system may continually act upon these balances in the temporary memory without fear of loss of this information upon shut-down. Further, the information may be recalled on reactivation by start-up by retrieving it from the nonvolatile memory NVM and feeding it back into the TM via the CPU. The nonvolatile memory is shown as coupled to the CPU and deriving an output therefrom in accordance with the transfer of information from the temporary storage TM under the control of the permanent memory PM through the CPU in accordance with the shut-down routine. The NVM unit is also shown as providing an output line coupled back into the CPU for transferring the data back into and through the CPU and into the temporary memory TM in accordance with the start-up routine under the control of the permanent memory PM.

The system operates in accordance with data applied from an appropriate input means I. This data is fed into the CPU under control of the program in the permanent memory. At any time during the operation of the system, should the contents of the temporary memory storing the appropriate credit debit balances or other accumulations in accordance with the various features of the system be desired to be displayed, an appropriate instruction provided by the input means I causes the CPU to access the desired location TM storing the information requested. The information is is provided through the PCU into the output display unit O. The input and output units may be multiplexed by a multiplex unit MP to and from the CPU.

Under control of the CPU when appropriate postal data information is provided from the input I, and all of the conditions such as limits and the like which may be preset in accordance with the entered data in storage in the temporary memory TM, are satisfied, a postage setting device SP will respond to an appropriate output signal from the CPU enabling a postal printing unit PP. At this point, the system has now accomplished its immediate function of setting the postage printer and enabling the printer to print postage.

The foregoing functional description of the present invention in its embodiment in an LSI micro integrated form will be described in greater detail with reference to FIGS. **1*d* and 2**. Before going to this explanation, however, a generalized view of the specific features and operations of the postal system operating in accordance with the present invention will be described.

Referring to FIGS. **1*b* and 1*c***, there is shown a general housing arrangement for the micro computer postage system.

FIG. **1*b* shows a general housing arrangement for the micro computer postage system. A housing 100 contains modular plug-in circuit panels 101 containing the circuitry and the CPU, ROM's, RAM's and shift registers of the system. The keyboard 34 and display 35 are mounted on the common top panel 102 of the housing 100. The setting and printing mechanism (FIG. 3) is contained in a forward section generally shown by arrow 103. An envelope 104 which is to be imprinted with postage is introduced in the slotted portion 105 of meter section 103 after the system is initialized. The amount of postage to be imprinted is then keyed into the keyboard 34 via push buttons 107, the set button 119 is pushed to set the postage into the drum, and the imprint button 108 is depressed. The imprint button 108 may be replaced by a limit switch or optical sensor located in slot 105, which would automatically provide a print signal when an envelope enters slot 105**.

FIG. **1*c* is an enlarged view of panel 102 of FIG. 1*b*, which contains the keyboard 34 and display 35 of the postage meter system. The keyboard 34 comprises push buttons 107, as aforementioned, to enter the numerical amount of postage into the system. Push buttons 109, 110, 111, 112, 113 and 114 refer to the electronic registers for batch count, batch amount, piece count, control sum, ascending register, and descending register, respectively. When any one of these buttons are depressed, the numerical section 115 of the display 35 is cleared; the appropriate register is loaded into the display, and the appropriate indicator lamp section 116** of the display is lighted.

The keyboard and display of this invention provides two new registers (more can be added without too much difficulty). Batch count and batch amount registers supply a running account of the total number of pieces of mail processed during any one run or time period, and the total postage expended for this mail. They can be reset to zero by the user. The control sum register is extremely useful in that it provides a check upon the descending and ascending registers. The control sum is a running account of the total funds being added into the meter. The control sum must always correspond with the summed readings of the ascending and descending registers. The control sum is the total amount of postage ever put into the machine, and is alterable only when adding funds to the meter. Generally mechanical meters are not resettable by the user, but only by Postal authorities. However, with electronic postage systems, a remote resetting capability may be programmed into the meter. One such remote resetting scheme which can be programmed into this system is shown in U.S. Pat. No. 3,792,446 filed Feb. 12, 1974.

The piece count register differs from the batch count in that it is not resettable by the user, and is used to indicate the total number of postage printing (pieces of mail) the machine has experienced. This information is useful to ascertain the life of the machine, and to gage when the system may require servicing and maintenance. The ascending and descending registers operate in normal fashion as might be expected from a standard postage meter. The ascending register giving a running total of the printed postage, and the descending register informing the operator of the amount of postage funds still remaining in the postage system.

The ± key (push button 117) provides the function of addition for adding in special charges to the postage such as special delivery, certification, etc.

The clear key 118 clears the numeric display 115, and also sets the batch registers to zero if displayed at the time the clear key is actuated.

The set button 119 is depressed after the postage required to mail a letter is keyed in by buttons 107. The set button 119 causes the print wheels in the printing drum 42 of FIG. 3 to set to the desired postage.

The $ unlock key 120 is a precautionary button which must be depressed by the operator in order to set postage equal to, or in excess of, a dollar. This extra physical step acts to prevent costly postage printing mistakes.

At the rear of the postage meter housing 120 (FIG. 16) is a hinged security door or plate 125 having a latch 124. This latch secures the door 125 to the housing 120 by means of a wired lead seal 121. Postal authorities are the only ones empowered to open the seal 121, and access the contents behind door 125. The door 125 protects two switches 122 and 123, respectively (shown in phantom). Switch 122 empowers the microprocessor to call into operation the ADP routine of FIG. 31. The ADP subroutine is that part of the computer program which provides for the entering of postage funds into the system. Postage funds are entered into the system by first keying-in the amount of postage using the keyboard buttons 107. This amount of postage is displayed, and then added to the descending and control sum registers of the postage meter system by opening the security door 125 and pressing button 122. This button initiates a jump in the postage meter program to the ADP subroutine as aforementioned. After the ADP routine is executed, the door 125 is again secured by seal 121.

Switch 123 is provided for removing funds from the descending and control sum registers in the event a mistake in adding funds has occurred. Switch 123 initiates a jump to the subroutine SUBP of FIG. 32.

The need to add funds to the meter system is signalled by indicator lamp 126.

A check date reminder is provided by indicator 127, each time the postage meter system is turned on.

A meter enabled indicator 128 lights when (a) the printing drum 42 (FIG. 3) is properly set with postage; (b) the postage to be imprinted is displayed; and (c) sufficient funds are available to imprint the postage desired.

Indicator lamp 129 signals the operator to call the Pitney Bowes Service Department. This indicator lights when there is something wrong in the system, e.g., the sum of the ascending and descending registers do not check with the control sum.

Indicator lamp 130 signals the operator that the postage to be set is over or equal to $1.00, and in order for the postage to be set, the $ unlock button 120 must be pressed prior to the set button 119.

The indicator light 131 shows that the ascending register contents are being displayed in display section 115.

The indicator lamp 132 lights when the contents of the descending register are being displayed in display section 115.

The piece count indicator lamp 133 lights when the piece count is being displayed in display section 115.

The batch amount 134 and the batch count 135 indicators light when the batch registers are being displayed. The batch registers are newly added registers to the normal postage meter. The data shown in the display 115 for the batch count is a whole number (no decimal point) since the information is not dollars and cents data. The piece count information is similarly displayed without the decimal point. The control sum indicator 136 lights when the control sum register is being displayed in display section 115.

The low postage <$100.00 indicator 137 lights to tell the operator that the remaining funds in the descending register are currently below a hundred dollars. This alerts the operator that some time soon, he will be required to recharge the "meter".

In several places throughout this description, components have been written with a dual numbered designation, such as RAM (2) 18. The number in parenthesis designates the order in the component series, i.e., using the above example, RAM 18 is the second RAM in the series of RAMS.

Now referring to FIGS. **1*d* and 2, a block diagram of the LSI integrated form of the micro computerized postage meter of this invention is shown. The system comprises a MCS-4 micro computer set, which is a product of Intel Corporation, Santa Clara, Calif. The micro computerized set comprises a central processor unit (CPU), 10 which is connected to a number of read only memory (ROM) components 11, 12, 13, 14 and 15, respectively, and a number of random access memory (RAM) components 16, 17, 18 and 19, respectively. A plurality of shift registers (S/R's) 20, 21, 22, 23 and 24 are respectively connected into the system through output ports 25 and 27 located on the RAM chips 16 and 18, respectively. The output ports on the RAMs have four output lines [8 4 2 1] as shown. The ROMs 11, 12, 13, 14 and 15 have input-output ports (I/O's) 29, 30, 31, 32 and 33 respectively, of four-bit capacity [8 4 2 1] as shown. It should be noted that although the input-/output ports are physically located on these chips, they electrically communicate separately with the CPU 10**.

The shift registers 20, 21, 22, 23 and 24 respectively, provide port expansion for the postage meter system. In addition, shift registers 20 provides a multiplexing capability for operating a keyboard 34, and a numeric display 115. Shift register 23 multiplex the inputs of the meter setting feed-back photocells 36 to input port 32. A shift register 37 (4×128 COS/MOS S/R) with a hold-up battery provides permanent register information to the working memory which is allocated to RAM 16. The input port 31 receives the register information from the non-volatile memory 37 and channels this information to RAM 16 via the CPU 10. Each 4-bit memory word is clocked in sequence from the non-volatile shift register 37 to the working memory in RAM 16 via the CPU, until the shift register memory 37 has been completely shifted.

The numeric display 115 (FIG. 2) is controlled by the decoder/driver 46, which is connected into the system via output port 26. Output line 8 (output port 25) on RAM chip 16 provides a blank-unblank control over the decoder/driver 46 to eliminate leading zeros in the display 35, and to provide a blanking control signal for the particular display of this system (Burroughs Panaplex).

The inputs from the keyboard 34 are fed to the system via port 29. As aforementioned, the inputs from photocells 36 are directed to port 32. The photocells 36 provide feed-back information from the postage meter setting mechanism shown in FIG. 3.

The micro computer system 40 of this invention is powered from two (+5 and −10 volt) power supplies 38 as shown in FIG. 2. A power sensing circuit 39 is interconnected into the micro computer system in such fashion, so as to allow the microprocessor system to detect a power failure. In such a case, the microprocessor calls a routine which transfers working memory to non-volatile memory, and protects it by disabling the memory via bit 8, port 27. A clock 41 serves to correctly phase the operations of the micro computer system 40. The non-overlapping clock phases $\phi_1$ and $\phi_2$ are supplied to the central processor unit and random access and read only memory chips.

The central processor generates a SYNC signal every eight clock periods as shown in the Intel Users Manual for the MCS-4[R] micro computer set, copyright 1972, FIG. 2 on page 6 thereof. The SYNC signal marks the beginning of each instruction cycle. The RAM's and the ROM's will generate internal timing using SYNC, and $\phi_1$ and $\phi_2$. The shift registers (S/R's) are static shift register and do not use these clock pulses for their operation.

The heart of any postage meter system is of course the printing means. With the use of electronics, accounting and mechanical registers and setting actuators become superfluous, since all the register information is electronically stored, and the setting of the meter banks is electromechanically controlled.

One of the ways the present micro computer system can print postage is by using a modified Model 5300 postage meter, manufactured by the assignee of this invention, Pitney-Bowes, Incorporated, Stamford, Conn. The modified meter only contains the previous printing drum 42 and the print wheel driving racks 43 as shown in FIG. 3; the mechanical registers and actuator assemblies having been removed. The print wheels within drum 42 (not shown) of the modified meter are set by a mechanism driven by a stepper motor 50 and a pair of solenoids 60 and 70 (FIGS. 2 and 3). The motor and solenoids are powered by a −24 volt power supply 44 shown in block diagram in FIG. 2. The indicator lamps 116 light up various display messages shown in FIG. 1*b*. These indicator lamps are likewise powered by the power supply 44.

Output port 28 channels control signals to the drivers 47 of stepper motor 50. The output lines 0, 1 of the shift register 24 channel control signals to the setting mechanism solenoids 60 and 70, respectively via drivers 48. The twenty output lines of shift registers 21 and 22 operate indicator lamps 116 via lamp drivers 49.

The meter setting and printing mychansim of this postage system will be described with reference to FIGS. 3, 4*a*, 4*b* and 5. A stepper motor 50 drives an upper and lower set of postage wheel driving racks 43 (four in all) via a pair of upper and lower nested shafts (four shafts in all) **52*a*, 52*b*, 52*c* and 52*d*** respectively (FIG. 4*a*). Upper shafts **52*a*, 52*b* and lower shafts 52*c*, 52*d* are driven by a master drive gear 51, which is operatively rotatable in a clockwise and counterclockwise direction (arrows 55) by means of a stepper motor 50**.

The printing drum 42 has four print wheels (not shown) to provide a postage impression to the maximum sum of $99.99. Each print wheel provides a separate digit of this sum, and is settable from "0" through "9". The print wheels are sequentially set by means of one of the four driving racks **43*a*, 43*b*, 43*c* and 43*d*, respectively. The driving racks are slidably movable (arrows 56 of FIG. 3) within the drum shaft 57**.

The upper racks **43*a* and 43*b* are controlled by pinion gears 58*a* and 58*b*, respectively, and the lower racks 43*c* and 43*d* are controlled by pinion gears 58*c* and 58*d***, respectively (FIG. 4*a*). The pinion gear **58*a* is affixed to shaft 52*a*; the pinion gear 58*b* is affixed to shaft 52*b*; the pinion gear 58*c* is affixed to shaft 52*c*; and pinion gear 58*d* is affixed to shaft 52*d*. Nested shafts 52*a*, 52*b* and 52*c*, 52*d*, are respectively rotated (arrows 59) by means of respective spur gears 53*a*, 53*b*** (FIGS. 3, 4*a*, 4*b* and 5) and respective spur gears **53*c*, 53*d*** (FIG. 4*a*) affixed to the shafts at the stepper motor end thereof.

The master driving gear 51 engages each of the gears **53*a*, 53*b*, 53*c*, and 53*d* in the sequential order: 53*b*, 53*a*, 53*d*, 53*c*; with "53*b*" corresponding to the "tens of dollars" print wheel, and "53*c*" corresponding to the "unit cents" print wheel. The master gear 51 is sequentially slidably positioned (arrows 65) in rotational contact opposite each of the spur gears 53*a*–53*d* by sliding the yoke 63 over shaft 62. The master gear 51 is rotatably mounted within slot 64 in yoke 63, and is rotatably driven (arrows 55) by the stepper motor 50 via the motor shaft 50*a* and splined shaft 62. The yoke 63 is not rotatably engaged by the splined shaft 62 due to the sleeve bushing 66 which separates the yoke 63 from the shaft 62. The yoke 63 and master gear 51 are guided and supported by an additional smooth shaft 61, which nests within slot 67 of yoke 63**.

In order that the teeth of the master gear 51 properly align with the teeth of the several spur gears **53*a*, 53*b*, 53*c* and 53*d*, a toothed section 69 of each spur gear is locked into place by a pair of upper and lower tooth profiles 68 and 68', respectively located on upper and lower surfaces of the yoke 63** as shown in FIG. 4*b* and 5.

As the yoke 63 and the gear 51 slide (arrow 65) over the splined shaft 62, the upper and lower laterally extending tooth projections 68 and 68' hold the spur gears **53*a*, 53*b*, 53*c* and 53*d* in place against rotational misalignment. Each of the gears 53*a*, 53*b*, 53*c* and 53*d*, respectively are only free to turn, when the master gear 51** is directly intermeshed therewith.

The sliding movement (arrows 65) of the gear 51 and yoke 63 is controlled by toggle pin 71, which nests within groove 72 of the yoke. The toggle pin 71 pushes against the yoke 63, when the pivotable link 73 to which it is attached, is made to pivot (arrows 74) about a center shaft 75. The link 73 is controlled by two solenoids 60 and 70, respectively, acting through pivot arms 76, 86 and 77, 87 respectively. The solenoids 60 and 70 pull upon their respective pivot arms 76 and 77 via pull rods 78 and 79, which are movably pinned to these arms by pins 81 and 82, respectively. When the pull rod 79 pulls upon arm 77, it is caused to pivot (arrows 80) about shaft 83, which is rotatably affixed to arm 77. When this occurs, arm 87 is caused to be pivoted (arrow 84) against the biasing action of spring 88. This in turn, results in pulling pivot arm 73 forward (arrow 89) via shaft 90. This causes the pivot arm 73 to pivot about center shaft 75, resulting in moving toggle pin rearwardly (arrow 91).

Likewise, when solenoid 60 pulls upon arm 76 via rod 78, arm 76 causes shaft 92 to turn (arrow 93) against the biasing of spring 94. This in turn, causes arm 86 to pivot (arrow 95) about shaft 92. In pivoting, the arm 86 causes the center shaft 95 to move rearwardly (arrow 96). This in turn, forces the toggle pin 71 to move rearwardly (arrow 91).

There are four combined solenoid pull positions corresponding to the four separate mating positions between main gear 51 and each respective spur gear **53*a*, 53*b*, 53*c* and 53*d*; (a) both solenoids are not pulled-position 53*c*; (b) both solenoids are pulled-position 53*b*; (c) solenoid 70 is pulled and solenoid 60 is not pulled-position 53*a*; and (d) solenoid 70 is not pulled and solenoid 60 is pulled-position 53*d***.

The setting mechanism operation is as follows: (1) both solenoids 60 and 70 are pulled; (2) setting spur gear **53*b* via main gear 51 and stepper motor 50; (3) de-energizing solenoid 60 allowing pivot arm 76 to spring back under the action of spring 94; (4) setting spur gear 53*a* via main gear 51; (5) energizing solenoid 60 and de-energizing solenoid 70, allowing pivot arm 87 to spring back under the action of spring 88, and pivot arm 86 to pivot against spring 94; (6) setting spur gear 53*d* via main gear 51; (7) de-energizing solenoid 60 allowing pivot arm 76 to spring back under the biasing of spring 94; and (8) setting spur gear 53*c* via main gear 51**.

After the spur gears are set to individual postage value positions, causing the racks 43 and the print wheels (not shown) to assume postage value positions, the drum 42 is rotated via shaft 57 (arrow 97) to imprint the set postage.

The home position of the drum 42 is monitored by a slotted disc 98 affixed to shaft 57. When slot 100 of disc 98 moves through the optical read-out well 99, the print cycle is detected.

All optical read-out wells of the setting mechanism as will be hereinafter described, comprise a light emitting diode (LED) and a phototransistor for receiving the light emitted by the LED.

The slide positions of gear 51 and yoke 63 (arrows 65) are monitored by determining the pivot position of pivot arms 86 and 77, respectively. Pivot arm 86 has a finger 101 which will pivot in and out of well 102, when solenoid 60 is actuated and de-actuated. Pivot arm 77 has a finger 103 which pivots in and out of well 104 when solenoid 70 is actuated and de-actuated.

The home positions of shafts 52*a* and 52*b* are monitored by slotted discs 105*a* and 105*b*, respectively (FIGS. 3 and 4*a*). When slot 106*a* of disc 105*a* is in well 107*a*, shaft 52*a* is at zero. Similarly, when slot 106*b* of disc 105*b* is in well 107*b*, shaft 52*b* is at zero. Shafts 52*c* and 52*d* are respectively "zero" monitored via respective discs 105*c* and 105*d*, slots 106*c* and 106*d*, and wells 107*c* and 107*d* (FIG. 4*a*).

Rotation of the stepper motor shaft 50*a*, splined shaft 62 and gear 51 is monitored via gears 108 and 108*a*, slotted monitoring wheel 109 and monitoring well 110. When stepper motor shaft 50*a* turns splined shaft 62 and main gear 51, a gear 108 attached to shaft 50*a* is also made in turn. Gear 108 intermeshes with gear 108*a* carried by the slotted monitoring wheel 109, causing wheel 109 to turn in correspondence with shaft 50*a*. Every fifth slot 111 on the monitoring wheel 109 is extra long to provide a standard for synchronization. Each slot on wheel 109 corresponds to a change of one unit of postage value. The slotted wheel 109 is optically monitored by well 110. Well 110 has two photosensors, 110*a* and 110*b*, respectively, as shown in FIG. 4*a*. Photosensor 110*a* monitors every step of the stepper wheel 109 and sensor 110*b* monitors every fifth step.

In summary, the setting of the postage printer is done by selecting the desired bank with the solenoids and driving the stepper motor in the proper sequence under program control. The results of each step is verified by the micro computer via the monitoring photosensors.

Brief Summary of the Operation of the Postage Meter

The operation of the postage meter can be briefly summarized as follows: With no power applied to the microprocessor, a de-energized "enable" solenoid (not shown) mechanically locks up the printing mechanism of FIGS. 3–5. When power is applied to the system, (turning on the meter), voltage sensing circuits monitoring logic supply voltage (FIGS. 12*a* and 12*b*) generate a general system reset pulse, when the logic supplies reach operating levels. This pulse initializes the microprocessor system, which then starts executing the program shown on page 66 from address φφφ. The nonvolatile memory 37 of FIG. 2, is loaded into working storage in RAM, the printing mechanism is set to zero, the descending register is loaded into the numeric display 115 of FIGS. 1*b* and 1*c* to inform the operator how much funds are available, and a "check date" reminder 127 is turned on. The system then loops in a SCAN routine (FIGS. 25 and 25*a*) which multiplexes the display and searches for keyboard 34 inputs. The meter remains in this routine until a keyboard input is detected at which time the program branches to execute the routine called for by the key. The program then returns to the SCAN routine.

The postage amount to be printed is set by entering the number into the display via keyboard 34 and operating the SET button 119 (amounts $1.00 or more require the pressing of the $ UNLOCK button 120 before pressing SET). If sufficient funds are available in the descending register to print the amount of postage the meter is set to, the "enable" solenoid is set (enables printing mechanism). There are two ways of tripping the print mechanism: (1) feeding a letter into the meter (2) operating the postage request lever 108. When tripped, the amount of postage shown in the display is printed. The operation of the print mechanism generates a signal to the SCAN routine which branches to a routine which updates the meter registers and checks to see if sufficient postage is available for again printing the postage amount the meter is set to. If available, the print mechanism remains enabled, if not, it is disabled.

If in the course of running postage through the meter, the sequence is interrupted, as by calling register contents into the display, the printing mechanism is disabled until a postage amount is again put back into the display. This can be done by depressing the SET button 119, which recalls the postage amount the meter is set to into the display, when operated after a non-numeric (not 0–9) key or by entering a new number and depressing the SET button which sets the meter printing mechanism to the new number.

Provision is made for entering funds into the meter (incrementing descending register and control sum) by means of two switches (+) 122 and (−) 123 located in an area protected by a sealed access door 125 (FIG. 16). The appropriate postal authorities can enter or deduct any amount of postage (limited only by the size of the registers) by entering the desired amount into the numeric display 115 via keyboard 34, and then operating the (+) or (−) switches. After recharging the meter, the authorities would then reseal the access door.

Within the SCAN routine, periodic checks of the logic power supplies are made to determine when to shut down the meter. When the voltage sensors (see FIGS. 12*a* and 12*b*) detect the voltage falling below a preset level, there is a certain minimal amount of time available (even with complete external power removed) in which to complete any routine in progress, since the low voltage condition, disable the printing mechanism, and transfer register contents from working memory to the nonvolatile memory. This sequence is entered in shut-down and low line voltage situations where there isn't sufficient voltage to guarantee proper operation. The main program can only be re-entered through a complete power-up cycle described previously.

Each RAM chip of this particular system (MCS-4) also provides an output port (for example, port 25 of FIG. 6) for providing the system with communication capability with peripheral devices. As aforementioned, these ports have four [8 4 2 1] output lines.

The RAM chip 16 shown in FIG. 6 allocates the first 6 locations (0 through 5) in the first bank (200) for the descending register 815. The six locations will provide for a maximum dollar allocation of $9,999.99 (six digits). In other words, the postage meter system can be funded to a maximum of $9,999.99.

The allocation for the piece counter 817 (201) provides 7 locations, which on a piece count basis will provide a total of 9,999,999 pieces. The capacity of the piece counter must necessarily be large, since it is the total running account of each and every piece of mail that is processed over the life of the machine.

Similarly, the control sum register 818 (202, locations 0 through 9) and the ascending register 816 (200, locations 6 through F) provide a very large capacity (a dollar total of $99,999,999.99) because these sums are continuously increasing for the life of the system.

Batch Sum 819 (201, location A through F) and Batch Counter 820 (202, location A through F) have capacities equal to the capacity funding of the descending register, since in any batch run one can never spend more in a pre-funded system than the available funds stored.

The locations 0 through 3 and C through F of bank 203 are reserved for registers which are used to control the setting of the printer mechanism from a previous meter setting ("number meter set to" (SETNG) register 211) to a new meter setting ("meter setting" register (MSR) 307).

These registers only require four word lines, since the printing mechanism of this invention as shown in FIGS. 3 through 5, has a maximum setting of $99.99. Naturally, if the printer had only a three bank setting ($9.99), only three word spaces would be needed in these particular registers.

Status flag 821 is used in the programming to monitor stepper motor 50 (FIG. 3). Status flags 822, 823, and 824, respectively are used in the programming to monitor the setting of the printer banks (FIG. 3).

FIG. 7 shows the memory allocation provided by RAM chip 17. Bank (204) contains storage for an addition register 210 in locations 7 through F. The addition register is for the purpose of temporary storage and for adding to the regular postage to be printed, an increment of additional or special charges, i.e., insurance, certification, special delivery, etc. For example, suppose it was desired to add 50 cents additional postage to the regular postage amount of 10 cents. First, the numbers one and zero (ten cents) would be entered into the numeric display 115 by means of keys 107 of the keyboard. Next, the ± button 117 is depressed, which transfers the 10 cents from the display to the additions register 210. A five and a zero (50 cents) are then keyed in, and appear in the display. The button 117 is again depressed to add the 50 cents to the additions register 210, and the display providing a total of 60 cents stored in the additions register. The set button 119 is then depressed to set the meter to sixty cents.

FIG. 8 depicts the memory allocation in RAM chip 18. Bank 205 (location B through F) contains the lamp output area 206 shown in more detail in FIG. 8*a*. Bank (207) has locations 7 through F allocated for the images of the display contents 208. The numeric words from this storage space appear in display section 115 (FIG. 5*a*). Lamp output register 206 (spaces B through F) in bank (205) applies to the display section 116.

Storage space 212 (space 6 of bank 207) is allocated for placement of a new digit word prior to its being entered into display contents 208. The purpose of this storage space is that it serves to provide a means to clear display contents 208, if the previous operation was not one which allowed for entering a number into display contents 208. In other words, the new digit space is an intermediary storage facility for storing a new display digit, until it is determined where in the sequence of events is the information being entered to the display.

The word spaces in banks (205) and (207) of FIG. 8, corresponding to "batch tag" 305 (bank 205, status location 0); "status flag" 311 (bank 207, status location 0); and "$ unlock flag" 309 (bank 207, status location 2) are used in the programming to indicate a particular operation condition. These indicators will be further discussed hereinafter.

RAM chip 19 is illustrated in FIG. 9. The status words 215 and 216, respectively, of bank 214 are used in the operational control of the setting and printing mechanism of FIG. 3.

FIG. 10 shows the various input ports of the ROM's.

FIG. 11 is an electrical schematic diagram of the non-volatile memory circuitry 37 shown in block diagram in FIG. 2. The non-volatile memory consists of two dual 128 bit static shift register 140 and 141, respectively, as shown. These shift registers are of the complementary MOS (CMOS) type. CMOS was chosen because of its very low power consumption in the quiescent state. This allows for powering the memory by means of a battery 143, which will maintain the integrity of the memory for extended periods of time, i.e., the memory will not be erased. The particular shift register components (SCL 5172) were manufactured by Solid State Scientific, Inc. of Montgomeryville, Pa. 18936. These components have been presently discontinued, but there are many other similar components currently on the market, e.g., RCA's CD 4031 AE and Motorola's MC 14157CL.

In their power off state, the shift registers 140 and 141, as well as the transmission gates 142 and 143, respectively, the NOR gates 144 and 145, respectively, and the flip flop 146 all operate from the power supplied by battery 143. Flip flop 146 is in the low logic state ($Q=0; \overline{Q}=1$) at this time, which disables gates 142, 143, 144 and 145. Transmission gates 142 and 143 effectively disconnect the battery operated circuitry outputs from the microprocessor system. This prevents excessive battery current required to supply the low impedance inputs of the ROM(2) 13 and load resistors 13*a* during the power off condition. Thus, battery life is extended considerably. The inputs to the shift registers 140 and 141 are of characteristically high impedance (CMOS) and therefore, do not require this form of isolation. Gates 144 and 145 are disabled by flip flop 146 in the "power-down" and transition states. This inhibits spurious signals on lines 147 (clock signal line) and the memory disable line 148. This is necessary, because during "power-up" and "power-down" sequences, there may be spurious signals on the output port 27 (FIG. 1*d*) supplying the control signals. This is so, because at this time the power signals are non-zero, but have not as yet reached their specified operating values. During "power-up" and "power-down" the microprocessor is not functioning predictably and memory must therefore be protected, which is accomplished by gates 144 and 145.

During the "power-up", transistor 149, which is initially off, remains off until line 150 is connected to ground. This occurs when optical switches 152 and 153 (FIGS. 12*a* and 12*b*, respectively) turn on. Optical switches 152 and 153 are part of the −10-volt and +5-volt power supply monitoring circuits, and turn on when the −10 volt and +5 volt supplies respectively reach their operating values. Both of these power supplies are necessary for the proper operation of the microprocessor system.

As power begins to come on, diode 155 through which battery current flows, turns off and diode 156 turns on. This switches the memory over the main power supply. The reverse procedure is experienced during shut-down. When line 150 becomes low, transistor 149 turns on, causing connection point 154 to go high. This in turn causes the Q output of the flip flop 146 to go high via line 157. This enables gates 142, 143, 144 and 145 resulting in making the memory fully operative with the microprocessor system.

During start-up, a reset signal to the microprocessor is generated by the circuit of FIG. 13. The reset signal initializes the central processor unit (CPU 10 of FIG. 1*d*), and starts the program of the system executing from location/φφφ in ROM. The beginning portion of the program contains initialization procedures which are only executed once during the start-up sequence. Included in this start-up sequence, is a subroutine INRAM described with reference to FIG. 22. This subroutine transfers the contents in the shift registers 140 and 141 to the working area (RAM) of the microprocessor system. Data from these non-volatile shift registers 140 and 141, comprising "postage meter register" data, is read into the microprocessor system through ROM input port (2) 31 as shown in FIGS. 1*d* and 10. Each sequential word of data in the shift register memory is accessed by writing out a clock pulse to shift registers 140 and 141 via bit 8 of output port 27 as shown in FIGS. 1*d* and 8. After all of the 128 words of the shift register memory are loaded into RAM, the non-volatile memory remains idle until a shutdown sequence (subroutine DOWN of FIG. 23) is initiated. The shutdown sequence will result if either or both of the power supplies (+5 volt and −10 volt) begin to turn off. The optical switches 152 and 153 (FIGS. 12*a* and 12*b*) then turn off, thereby turning off transistor 149. This in turn causes connection point 154 to go low. In addition, the voltage on line 158 goes low. The line 158 is connected to the test input on the CPU 10. This test input is read periodically during program execution, and when it is read as a logical low, the program branches to the DOWN subroutine (FIG. 23). The "postage meter register" data in RAM is now read, and then written out to the shift register memory via output port 26 of FIG. 7. This "postage meter register" data may have changed in the hiatus between initialization and shutdown due to the entering of new postage. After the data word information is written out to CMOS shift register memory, a clock pulse is written out via bit 8 output work 27 of FIG. 7. This enters the data word into the non-volatile memory, and then the next sequential word is accessed in RAM memory. The sequence of accessing and writing of the sequential data words continues until the entire contents of RAM memory has been transferred back into the shift registers (non-volatile memory). After the transfer has been completed, a memory disable signal is written out to the flip flop 146 via bit 4 of output port 27 and line 148. This causes the "Q" of the flip flop to go to zero, which disables the memory. To reinitiate the memory system, both optical sensors 152 and 153 must turn on to start the sequence again.

It should be noted, that the above scheme of transferring the contents of memory need not be required, where the "working" memory areas are themselves indistructable. For example, the RAM memory may be furnished with a hold-up battery, thus eliminating the need for the CMOS shift register memory. "Working" storage may also comprise a core memory or other similar non-volatile storage components, such as a plated wire memory, a magnetic domain memory, a MNOS memory, etc.

FIG. 12*a* shows the electrical schematic for the −10 volt supply monitoring circuit. The −10 volt supply is monitored by a voltage regulator IC 159, connected to form a voltage sensing circuit. The input voltage applied to line 160 powers this circuit. The circuit contains an internal zener reference diode. The input voltage is compared against the reference, and when it exceeds a predetermined value set by the potentiometer 161, the output switches on. This causes the LED 162 of the optical switch 152 to energize. This turns on the phototransistor 163 of the optical switch 152, which provides the part of aforementioned input to the memory circuit of FIG. 11, and also provides an input to the reset circuitry of FIG. 13. The optical switch 152 is made by the Monsanto Company, and has a part No. MCT-2. The IC regulator 159 is a standard part No. 723, manufactured by Teledyne, Signetics, Motorola, etc.

FIG. 12*b* depicts the electrical schematic for the +5 volt supply monitoring circuit. This circuit performs a similar function as that shown in FIG. 12*a*. The external zener diode 164 is used as a reference. A differential amplifier 165 (RCA, CA3046) compares the input voltage supplied on line 166, against the reference. When the input exceeds a predetermined value set by the potentiometer 167, the LED 168 of the optical switch 153 turns on. This causes the phototransistor 169 of the optical switch the supply an output to the memory circuit of FIG. 11, and also to the reset circuitry of FIG. 13. In the circuit of FIG. 12*b*, a 723 IC is not used because the voltages being monitored are not sufficiently large to properly bias the circuit.

The monitoring circuits shown, are respectively connected across the filter capacitors 170 and 171 of the power supplies. The monitoring circuits are set to switch at a threshold several volts greater than the output voltage on lines 174 and 175, respectively. If power is lost from the AC line supplying power to the rectifiers, and the load connected to the output voltage lines 174 and 175 remains constant, the filter capacitors 170 and 171, will respectively discharge in a nearly linear fashion until the respective regulators 172 and 173 start failing to regulate due to the insufficient supply voltage.

When the rectified voltage drops below the sensing voltage threshold set by the potentiometers 161 and 167, respectively, of FIGS. 12*a* and 12*b*, the optical switches 152 and 153 (FIGS. 12*a* and 12*b*) turn off. This in turn generates a signal sensed on the CPU test line, which initiates the aforementioned shutdown routine.

As long as the maximum time to detect the shutdown signal and the time to transfer the register contents from working RAM memory to the non-volatile memory, does not exceed 20 milliseconds, there will be sufficient time to preserve the memory, and operate the microprocessor in a defined mode. The time parameter is a function of the filter capacitors, load, sensing voltage, and output voltage. The 20 millisecond value has been obtained by choosing the worse load condition for the system.

The reset circuitry of FIG. 13, comprises a one shot 178 set to provide a guaranteed minimum width pulse. The input to the one-shot 178 is from the outputs of the power supply monitoring circuits of FIGS. 12*a* and 12*b*, respectively.

FIG. 14c illustrates the power supply circuitry (−24 volts) used to operate the stepping motor 50, the solenoids 60 and 70 of FIG. 3, and the message display lamps of section 116 of FIG. 5a. The zener diode 179 regulates the voltage outputted on the line 180.

FIG. 15 shows the circuitry associated with the multiplexing shift register (φ) 20 of FIG. 1d. This shift register is a 10 bit serial-in/parallel-out S/R, which is used in this postage system to multiplex both the display and the keyboard (see FIGS. 1d, 1b and 16). The multiplexing is accomplished by entering a logic "1" into the shift register, and shifting it through, thus enabling the outputs one at a time. Nine of the outputs as shown in FIG. 15, are connected to anode drivers 181, which operate the Panaplex display in a multiplexed mode. The Panaplex ® display of FIG. 16 is manufactured by the Burroughs Corp. The anode drivers 181 are of a common, well known type, similar to those described in the technical brochure (advance copy) put out by the Sperry Information Displays Division, Scottsdale, Arizona, entitled: "Multiplexing Sperry SP-700 Series Information Displays", Page 28.

FIG. 16 illustrates the electrical schematic for the keyboard and the display (sections 115 and 116) of FIG. 1c. Section 115 of the display is shown at the top of FIG. 16, and represents the aforementioned gas discharge Panaplex ® display. Below the gas discharge display, are shown the indicator lamps, (section 116) which are powered by the voltage supply of FIG. 14c, and are controlled by the shift register and switching circuitry shown in FIG. 17. The 300 ohm resistors in the lamp circuit are used to limit the current to the lamps (the lamps are 12 volt lamps). The electrical schematic for the keyboard 34 is shown below the lamp circuitry. The four horizontal (row word) lines, and ten vertical (column word) lines intersect to provide a select position. The "row word" lines are connected to the ROM input port 29 (FIG. 1d), and seven (all ten vertical lines are not used) "column word" lines are connected to the shift register 20 of FIGS. 1d, and 15. A discussion on multiplexing a keyboard using an Intel shift register (4003) and microprocessor (4001) can be found on pages 51–52 of the Intel Users Manual for the MCS-4 ® Micro-Computer Set, the February 1973 edition (Revision 4).

FIG. 17 depicts the electrical schematic for the shift register circuitry controlling the indicator lamps of FIG. 16. Shift register 21 and 22 (see FIG. 1d) are 10 bit serial-in/parallel-out S/R's which are utilized as port expanders. A bit pattern corresponding to the particular indicator lamps to be turned on, is transferred to the shift registers 21 and 22 in a serial manner from register 206, RAM(2) 18, (please refer to subroutine (LDLMP of FIG. 39). The shift registers 21 and 22 provide logic "1" outputs to respective transistors 182 (typical) which act as switches, which in turn light their associated lamp (FIG. 16).

FIG. 18 illustrates the decimal point circuitry which turns on the decimal point separating the "dollars" and "cents" in the numeric display 115. The decimal point is inhibited from appearing in the display, (lines 184 and 185, respectively) when the "piece count" or the "batch count" is being displayed. The digit to be displayed is written out in BCD form on RAM output port 26 (FIG. 1d) to the decoder driver 183 as shown. The output of the decoder driver 183 is decoded for the seven segment display shown in FIG. 16 (top). The decoder driver 183 (DD 700) is manufactured by Sperry Rand (SP-700 Technical Bulletin, October 1971).

The blanking feature incorporated into the decoder driver 183 is driven by RAM output port 25 (FIG. 1d) bit 8. Besides suppressing leading zeros, this blanking is also used in the multiplexing process. A discussion of blanking requirements for multiplexed gas discharged displays can be found on page 5 of the aforementioned brochure: "Multiplexing Sperry SP-700 Series Information Displays".

The resistor 186 is a current limiting resistor used in the power supply for the stepping motor. Resistors 187 and 188 are current limiting resistors used in the power supply to the LED's of the optical switches 190, 191, 192, 193 and 194, 195, 196, 197, respectively (FIG. 19).

FIG. 19 shows the electrical schematics for the meter monitoring photocells, the stepper motor coil drivers, and the print sensing photocell. The print sense photocell 189 of well 99 in FIG. 3 is shown in electrical schematic at the bottom of FIG. 19. This photocell detects the completed rotation of the printing drum 42 (FIG. 3). When this photocell senses that postage has been printed, the program branches to a routine that updates all the "postage meter" registers by the amount of postage to which the meter was set. This photocell is multiplexed into the "meter" along with keys of the keyboard 34 (FIGS. 1b and 1c).

The optical switches 190 through 197, which monitor the mechanical functions of the "meter" are multiplexed into the input port 32 by shift register (3) 23 (FIG. 1d).

RAM output port 28 (FIG. 1d) is used to drive the stepping motor 50 (FIG. 3). This output port is connected to an RCA CD4050 buffer, which in turn drives darlington transistor switches 250, 251, 252, and 253, respectively via lines 254, 255, 256 and 257, respectively. The motor 50 is powered by the −24 volt supply of FIG. 14c. The stepping motor 50 (FIG. 3) is a RAPID-SYN, Model 23D-6102A, manufactured by Computer Devices Corporation, Santa Fe Springs, Calif. The characteristics of the motor (specifications, switching, sequence, schematic, etc.) are given in bulletin C and D, Pages 6–73.

The respective darlington transistor switches 258 and 259 are used to energize the bank select solenoids 60 and 70 of FIG. 3. These switches receive their inputs from shift register (4) 24 of FIG. 1d, via lines 262 and 263, respectively.

The darlington transistor switch 260 is used to energize the "meter enable" solenoid (not shown), which is used to free shaft 57 (FIG. 3) for rotation. The switch is inputted on line 264 (FIGS. 17, 19), by the signal used to power the "meter enabled" lamp of the display (FIG. 16).

All the connections not specifically mentioned, and which are relevant to the circuitry depicted in FIGS. 11 through 19, are shown by pin connection numbers as illustrated.

Operation of the System

The operation of this computerized postage meter system will be explained with reference to the flow charts shown in FIGS. 20 to 51, and the associated program appended to this specification.

While the above program has been of necessity written about the particular meter setting mechanism shown in FIGS, 3, 4a, 4b and 5, it should be understood that the essence, spirit, scope, and limits of this invention are considered to be of a broader character. In other words, the present computerized postage meter system could have been easily programmed about a jet printing postage apparatus of the type shown and described in co-pending application, Ser. No. 433,805, filed Jan 16, 1974. Also, it is to be understood that many other high speed printing apparatuses can be made compatible with the present computerized system. Other such apparatuses include matrix and line printers.

With all such printing devices, the basic safeguards regarding postal security must of necessity be maintained, such as securing the printer against physical and electronic tampering.

Referring to FIG. 20, a generalized overall representation of the operation of this postage meter system is shown in flow chart form. The system is first given power as shown per block 300. When the system is powered, a general system reset pulse initializes the microprocessor system. This causes the CPU registers, RAM memory, and I/O ports to be cleared, and starts the postage meter program executing from address ϕϕϕ.

The postage meter system operation is set in motion by recalling postage meter register data from the non-volatile memory and placing this data in the working area of RAM. Also, when the postage meter system starts its operation, the printer banks of the printing and setting mechanism of FIGS. 3, 4*a*, 4*b* and 5 are all set to zero. These are some of the major procedures represented by "initialization" block 301. In addition to these procedures. other functions are also performed, as will be explained hereinafter with reference to FIGS. 21 and 21*a*.

After "initialization", the system enters a SCAN routine shown in the general sense by blocks 302, 303 and 308 and in more detail hereinafter, by the flow chart of FIG. 25. The SCAN routine consumes the greatest portion of postage meter operation time. The principle function of the SCAN routine is to search for a depressed key on the keyboard 34 and multiplex the numeric display 115 of FIGS. 1*b* and 1*c* (block 302). Once having found a validly depressed key (block 308), the SCAN routine will branch to the appropriate subroutine corresponding to the function called for by that particular key. The SCAN routine will generate an address to a "look-up" table where the particular address of the subroutine corresponding to the key is stored. This stored address is transferred to register pair 6 in the CPU. The subroutine FCTN (which is a jump to the address in register pair 6) is then executed.

After a particular key is serviced (block 310), the SCAN routine is re-entered to re-inspect the keyboard for new and subsequent inputs.

During the course of the SCAN routine, a periodic check is made as to the power condition of the system (block 303). In case of a power failure, the postage meter system must be able to complete any on-going operations, and to retransfer the contents of working memory (RAM contents) back into non-volatile storage (block 304). The "powering down" and "save memory" sequences will be more fully explained hereinafter, with reference to the DOWN subroutine of FIG. 23). When there is a "power-down", a trap (block 306) is entered, and the program cannot re-enter the SCAN routine except by the initiation of a complete "power-up" sequence.

The meter initialization sequence block 301 is shown in more detail with reference to FIG. 21. The information in the non-volatile memory is transferred into working memory (RAM) via subroutine INRAM (block 312) which will be described in more detail with reference to FIG. 22. All four imprint wheels are then set to zero as per block 313 using the subroutine HOME of FIG. 24. Descending register contents are then loaded into the numeric display (block 314) and the check data reminder indicator lamp is lighted (block 316). The descending register contents are displayed at start-up to inform the operator how much funds are available for printing postage. The check remainder, reminds the operator to set the date on the postage printing mechanism. The system then goes into the SCAN routine as previously mentioned.

An important part of the initialization procedure is the subroutine CHCK (block 315) shown in more detail in FIG. 21*a* (see Program address/4A3). Subroutine CHCK is used to detect errors that cause noncorrespondence in the meter funding registers. If the sum of the descending and ascending registers minus the control sum register does not equal zero (block 801), the CHCK routine turns the "call PB service" indicator lamp on (block 804), and disables the meter from printing postage. If the registers properly correspond (block 802) the subroutine will branch back via line 803. this subroutine is very novel with regards to postage meter operation, since this is the first time a postage meter has had the capability of monitoring its own funding registers.

FIG. 22 depicts the flow chart for subroutine INRAM, which can be found in the appended program at the instruction address/142.

The subroutine INRAM transfers data from the non-volatile shift register memory into working area in RAM.

CPU index registers are initialized (block 317) to specify input and output ports operatively connected to the shift register memory, and to specify RAM memory locations where this data is to be stored. The output of the shift register memory is read through an input port (block 318), written into RAM (block 319) and written out on an output port to the shift register memory (block 320). The shift register is then clocked (block 321) to access the next memory word. The index register specifying RAM address is incremented (block 322) in preparation for storing the next word. A counter is checked to see if transfer of data is complete (block 373). If not, a branch is made back into the program (line 325) to pick up the next sequential word. When transfer of data is complete, the INRAM subroutine branches back via block 324.

FIG. 23 illustrates the flow chart for the subroutine DOWN, which can be found in the appended program at the instruction address/15A, As aforementioned, the DOWN subroutine is a procedure for saving the contents of the memory (transfer RAM contents to the non-volatile memory) in the event of a power failure and normal turn off.

This routine is entered from the SCAN routine only when an impending power failure has been detected.

CPU index registers are initialized (block 327) to specify location of working area in RAM, and to specify input and output ports connected with the shift register memory. A data word from RAM is read (block 28), then written out to the shift register memory (block 329). A clock pulse to the shift register (block 330) enters the data into memory. The RAM address is incremented (block 331) and a test made on a counter to determine if everything has been transferred (block 332). If not, the program loops back (line 333) to transfer another data word to the shift register. When the transfer of data has been completed, the loop is terminated via (line 334) and a "turn off" signal is written to the shift register memory (block 335). The program then loops in a trap (336). A complete "power-up" sequence is needed to get back into the program.

The subroutine HOME is flow charted as shown in FIG. 24, and has a program address/174.

The HOME routine is part of the aforementioned initialization procedure for the meter. It sets the print wheels to zero to establish a reference for subsequent setting operations. The only position of the print wheels that can be directly read by the system is the ϕ (zero) position. This position is determined by monitoring the wells 107*a, b, c, d,* respectively, by detecting the slot (zero position) in slotted wheels 105*a, b, c, d,* respectively (FIG. 4*a*).

An index register is initialized (block 337) to specify the location of the Meter Setting Register 307, FIG. 6. Subroutine CLR of FIG. 47 selects the first set of photocells (block 338). The Meter Setting Register 307 is cleared (block 339) and the every step photocell 110*a* of FIG. 4*a* is read (block 340). If on a print step, (block 341) the program proceeds (via line 342) to select the printer bank (block 343). Monitoring wells (102 and 103, respectively monitoring the solenoids 60 and 70, of FIG. 3) are read and checked against the selected bank (block 344). If no contradiction exists, the following operation (via line 345) is selecting the next photocell bank and reading the monitoring well (107*a, b, c, d,* respectively of FIG. 4) corresponding to that bank to determine if the respective slotted disc (105*a, b, c, d,* respectively of FIG. 4*a*) indicates the selected print wheel is at the zero position (block 346). The CLR routine (block 347) is again used to select the first photocell bank. If the print wheel corresponding to the selected printer bank is not at zero (block 348), the print wheel is given one full printer step (block 354) corresponding to changing the setting of the print wheel by one unit towards zero. If no error is flagged in the step routine, the loop is re-entered via line 355 to again check for the zero position of the print wheel. This procedure is used to determine if the wheel needs another print step to reach zero. The loop is terminated via line 349, when the selected print wheel is at zero. If all four printer banks have not yet been set to zero, block 351 is exited via line 352 to block 343 where the next printer bank is selected. Setting the next print wheel to zero is done in the aforementioned manner. When all printer banks have been set to zero, the fifth position photocell (110*b* of FIG. 4*a*) is read (block 354). It should indicate a fifth position slot. If this is so, the HOME subroutine is terminated via line 356 through a branch back (block 360). Should any error be flagged, such as a photocell not indicating a mechanical response to a given signal, the error routine (block 359) is called via lines 364, 368, and 358, respectively.

If reading the every step photocell (block 341) at the beginning of the routine does not show the printer to be at a full printer step, half a print step is generated (block 362) to align the main gear 51 with the tooth profiles 68, 68' on the yoke 63 of FIG. 4*b*. This procedure frees the yoke, so that it can move to select the printer banks.

FIG. 25 illustrates the SCAN routine having a program address of/01D. The primary purpose of the SCAN routine is to process keyboard inputs to the meter. The routine rejects multiple key depressions and debounces the key input. When a single key depression is read for four successive scans, the routine generates an address in a look-up table where the address of the routine corresponding to that particular key is stored. The routine contains operations preparatory to, and following, the servicing of the key via FCTN (FIG. 26). A secondary function of the SCAN routine is multiplexing the numeric display 115 of FIGS. 1*b* and 1*c*.

Index registers are initialized (block 369) to specify display address, length of various counting loops and I/O ports. Display blanking is determined (block 370) by examining the most significant digits of the display for leading zeros and storing an indicator. A bit is loaded into the multiplexer shift register 20 of FIG. 15 to start the multiplexer (block 371). A display character is read from the display register in RAM and written out to the decoder driver 183 (FIG. 18). The display is unblanked, if the character is not a leading zero. The keyboard input is then read and processed as per block 373 (see FIG. 38 for a detailed description). A delay routine (block 382) is entered to allow sufficient time for display. A check (block 384) is made to determine if the "power-down" sequence should be initiated. If not, the display is blanked and the multiplexer clocked to select the next display digit and set of keyboard inputs (block 388). A check (block 389) is made to see if the loop has been completed. If not, the loop is re-entered via line 390, the next display digit is written out, and the next set of keyboard inputs is read in. Upon completion of the loop, a check is made (line 391) to see if a valid key depression had been sensed (block 392). If so, a batch indicator 305 (FIG. 8) is stored (block 396) (this indicator shows if the last operation had been calling a batch register into the display—this indicator is used in the CLEAR routine of FIG. 34). An address of a location in a look-up table is generated from the "ROW" and "COLUMN" words.* The LDLMP register 206 of FIG. 8 is cleared (block 397), because a routine called by the selected key may require that different indicator lamps be selected. A branch to the keyboard function is made in block 398. Upon return to the SCAN routine, the accumulator contents are stored in the status flag 311 of FIG. 8 (block 399), which is used to identify the last performed operation. This is necessary, because some keyboard functions are dependent on the previous function performed. The descending register is compared to the meter setting register 307 of FIG. 6 (block 400) to generate the "low postage" and "no postage" indications on the indicator panel 116 of FIG. 1*c*.

*The "Row word" is the information read into the input port 29 from the keyboard 34. The "Column word" identifies active multiple output, i.e. the bank of keys selected by the multiplexer. (Also refer to discussion with respect to FIG. 16.)

The meter checks its funding registers (block 401) as per the CHCK routine of FIG. 21*a*. The selected lamps are then turned on (402) and the beginning of the SCAN routine re-entered via line 403. If a valid key had not been read after reading the last bank of keys, re-entry would have been made from decision block 392 via line 393. If a "power down" condition would have been sensed in block 384, a branch via line 385 would have been made to the DOWN routine of block 386.

FIG. 26 is a chart of the subroutines called for through FTCN (program address/2C1). FCTN is a generalized entry point into the subroutines called by the keys. When a valid key is detected, an address in a look-up table in ROM is generated from the "ROW" and "COLUMN" words. This location contains the address of the subroutine corresponding to the key. FCTN jumps to this address and executes the specified subroutine. The chart in FIG. 26 specifies all the keys and the labels of the subroutines called.

FIG. 27 illustrates a subroutine for entering numbers into the display register from the keyboard. Each of the multiple entry points correspond to a particular digit.

Upon entry to this routine, a number is generated corresponding to the entry point, and thus to the particular key calling the routine (block 427). This number is temporarily stored (block 428) while the status flag 311 (FIG. 8) is checked to determine if the previous keyboard operation was entering a digit (block 429). If not, the display is cleared (block 431) before continuing. The contents of the display are shifted left (block 432) and the new number entered on the right. The UNLOCK flag 309 (FIG. 8) is set to zero (block 434), and a branch back with ACC=1 is initiated (block 435). The 1 is used to flag this operation in the status flag 311.

FIG. 28 shows the subroutine SET having a program address /2C5. The SET routine has basically two modes of operation: (1) it sets the meter print wheels to the value entered into the display via the keyboard, and (2) if the display contents are not from the keyboard, the last setting value is recalled. This value is displayed and the meter enabled, if sufficient postage is available for printing the amount of the setting.

Index registers are initialized (block 513) to set up the CHECK routine (block 514). The CHECK routine examines the contents of the display for $1.00 or more. The status flag 311 (FIG. 8) is next examined to determine if numerical entry from the keyboard is in the display (block 515). If so, the CHECK routine then looks for a value of $100.00 in the display (block 518). If the value is both less than $100.00 (block 519) and less than $1.00 (block 525) the routine proceeds to set the meter (block 533), enable the meter (block 534), clear the ADD register 210 of FIG. 7 (block 539) and branch back (block 540). If $1.00 or more is in the display, the UNLOCK flag 309 of FIG. 8 is checked. If flagged, setting the meter would continue as before via line 532. If the $ UNLOCK has not been flagged, an indicator light showing "$ UNLCK" would go on (block 529) and a branch back would be (block 530) made without ever setting the meter. If the amount in the display is greater than $99.99 an error would be indicated (block 522), because the meter, being a four bank meter, cannot set to a value that is higher than $99.99.

The second mode of operation occurs where the contents of the display have not been entered by the keyboard (block 516). In that case, the display is cleared (block 536), the meter setting put into the display (block 537), and the meter is enabled if sufficient postage is available in the machine (block 534). The ADD register 210 is then cleared (block 539) as before, and the routine branches back (block 540).

FIG. 29 depicts the subroutine UNLCK having a program address/266. The UNLCK routine sets the $ UNLCK flag 309 of FIG. 8, (block 492), if the previous function executed was that of entering a number into the display (block 490). The $ UNLOCK flag is used to enable the printer, if the setting is $1.00 or more of postage. In such a case, there is a branch back with ACC=1 (block 493).

FIG. 30 illustrates the flow chart 30 for the subroutine POST having a program address/297. The POST routine updates the meter registers each time postage is printed. This occurs when the photocell 99 (FIG. 3) detects the slot 100 in the disc 98 mounted on the drum shaft 57. This signifies a drum rotation, and hence, the printing of postage.

The ascending register 816 200 of FIG. 6, and the batch amount register 819, are incremented by the amount in the meter setting register 307 (MSR) (see blocks 470 and 471). The piece count 817 and batch count 820 also of FIG. 6 are incremented by 1 (blocks 472 and 473), and the descending register 815 is decremented by the amount in the meter setting register (block 474). The ENBLE routine (block 475) determines if the printer may be enabled for a subsequent print of the same amount. The routine is then terminated (block 476).

FIG. 31 shows the flow chart for the subroutine ADP having a program address/400. The aroutien ADP is a means for entering funds into the meter. The amount to be metered is first inputted via the keyboard. The "+" switch 122 (FIG. **1*b***) is then depressed to call the ADP function.

Index registers are initialized (block 436) to specify pertinent meter registers. If the display contents had been entered via the keyboard (block 437), and were not larger than the total capacity of the descending register 815 (blocks 441 and 442), the display contents are added to the descending register and the results placed in the descending register (block 445). If no overflow occurs (block 446), then the display contents and control sum 818 are added together and placed in the control sum (block 451). A branch back is executed (block 450). If, however, an overflow had been generated (block 446), there would be a branching to block 448 via line 447. The display register would be subtracted from the descending register to restore the original amount, and an error would be flagged (block 439) before branching back. If an error had been detected earilier, (display not from keyboard block 437); or display contents too large (block 442) the error routine (block 439) would have been called via lines 438 and 443, respectively. The routine would then be terminated as before (block 450).

FIG. 32 depicts the flow chart for the subroutine SUBP having a program address/450. The routine SUBP is a means for taking funds out of the meter. The amount to be taken out is entered via the keyboard. Next, switch 123 (FIG. **1*b*) is depressed to call the SUBP routine. Its operation is analogous to that of the aforementioned ADP routine of FIG. 31**.

Index registers are initialized (block 453) to specify the pertinent meter registers. If the display contents are from the keyboard, (block 454) and not too large (blocks 459 and 460) the display contents are subtracted from the descending register and the result is placed in the descending register (block 463). If a borrow is not generated, then the control sum is decremented by the amount in the display (block 468) and a branch back is executed (block 469). Had a borrow been generated, the descending register would have been incremented by the display contents (block 466 via line 465) and an error message would have been flagged (block 456). The error message is also flagged, if the display contents had not been from the keyboard, or if these contents were too large (see lines 455 and 461).

FIG. 33 illustrates the flow chart for the PLUS subroutine having a program address/27B. The PLUS routine adds the contents of the display to the ADD register 210 (FIG. 7), and puts back the result in both the display and the register. This allows chain addition of a series of numbers entered via the keyboard. This routine is summoned when the "±" button 117 is depressed on the keyboard (FIGS. 5 and 5*a*). This routine provides the capability of adding ancillary charges to the main postage, such as insurance, special delivery postage, etc.

Index registers are initialized to specify the registers concerned (block 496). The status flag 311 of FIG. 8 (block 497) is fetched to determine if the contents of the display are from the numerical entry of the keyboard (block 498). If so, block 500 is entered. The ADD register 210 (FIG. 7) and display (DISP) register 208 (FIG. 8) are added together and the result placed back in both registers. If no overflow occurs (block 505), a branch back is made (block 510). If an overflow has been detected, an error message via line 506 is flagged (block 507) before branching back (block 508). If the PLUS routine had been called without the previous operation having been from the numerical entry of the keyboard, a branch back (block 508) would have been made via line 511 without performing any operation.

FIG. 34 shows the flow chart for the subroutine CLEAR having a program address/23D. The CLEAR routine performs the following functions: (1) clears the display; (2) recalls contents of the "ADD" register 210 (FIG. 7) into the display; (3) clears the "ADD" register 210 on the second successive clear; and (4) clears batch registers 819 and 820 (FIG. 6) if either register is displayed at the time the CLEAR routine is called.

The display register 208 (FIG. 8) and the $ UNLOCK flag 309 (FIG. 8) are cleared (block 477 and 478). The status word 311 (FIG. 8) is checked (block 479) to see if the previous operation had been the CLEAR routine. If not, block 482 is entered. Contents of the "ADD" register 210 are transferred to the display (DISP) register 208 (contents of the "ADD" register are nonzero only when in the process of adding up a series of numbers) using the ± key 117 of FIG. 1*b*. The effect of the clear key 118 in this case, is to clear a keyboard entry and recall into the numeric display 115, the subtotal up to that point. The addition process may be continued upon entry of the next number. The "LDLMP" area 206 (FIGS. 8 and 8*a*) is cleared (block 484). The batch flag 305 is checked (block 485) to see if the previous keyboard operation was calling either of the two batch registers into the display (batch sum or batch count). If not, a branch to the main program is made (block 488). If so, line 486 is taken to block 487. The batch registers are cleared before returning to the main program (block 488).

If the previous keyboard operation had been CLEAR as per decision block 479, the "ADD" register 210 would have been cleared via line 480 to block 481, before entering block 482.

FIG. 35 shows a subroutine for calling register contents into the numeric display 115 of FIGS. 1*b* and 1*c*. This routine has six entry points corresponding to six meter registers which can be called into the display. Its purpose is to load the display with the contents of the specified meter register, and to turn on the indicator lamp corresponding to the selected register.

The meter register being called is specified by the entry point into the routine (block 420). Both the display (DISP) and addition (ADD) registers 208 and 210, respectively (FIGS. 8 and 7) are cleared (blocks 421and 422). Then the FETCH routine of FIG. 41 is called. This initializes index registers to specify the meter register being called. The indicator lamp corresponding to the specified meter register is selected by writing a bit in the appropriate word in the LDLMP area 206 of RAM(2)18 (block 424). The contents of the specified register are then written into the display register 208 (block 425), and a branch back initiated via block 426.

FIG. 36 illustrates the flow chart for the subroutine ENBLE having a program address/100. The subroutine ENBLE generates the signal for the printer enabling solenoid. The ENBLE routine first calls CMPAR (block 736) which compares the meter setting register 307 of FIG. 6 against the descending register 815 (block 737). If the descending register is greater than or equal to the meter setting, an enabling bit is put into the LDLMP area 206 (block 739) (see FIG. 8*a*, word 8D, bit 4) before branching back (block 740). Otherwise, a branch back is made directly from block 737 via line 741.

FIG. 37 relates to a flow chart for the ERROR subroutine having a program address/133. The ERROR routine is used to flag certain errors. The error message is contained in the accumulator at the time the ERROR routine is called. The most significant (leftmost) place in the display register 208 (block 716) is selected and the contents of the accumulator (block 717) is written into the display register before branching back (block 718) to the main program.

FIG. 38 shows a flow chart for the portion of the SCAN routine of FIG. 25 which is referred to as SCANX (see block 373 of FIG. 25). The SCANX procedure is used to debounce the keys and check for a valid key depression. The four input lines from the keyboard matrix (FIG. 16) generate that will be hereinafter referred to as the "ROW" word. A number corresponding to the active output of the multiplexer (FIGS. 15, 16) will be hereinafter referred to as the "COLUMN" word. A nonzero "ROW" word and "COLUMN" word identify a particular activated key in the keyboard matrix. The term "count" word as used herein is defined as the number of times the same key depression has been successively read.

The detailed operation of reading the keyboard follows: If the multiplexer (MPX) has selected an output connected to the keyboard (block 374), the "ROW" word is read (block 376). If not zero (block 377), the keyboard process instruction is used to detect multiple keyboard depressions in the group of four input lines being read. If the "COLUMN" word is the same as that of a previous scan (blocks 406 and 407), and only one key is pressed, (blocks 409 and 410), the last "ROW" word is compared with the present one (block 395). If both are the same, the "COUNT" word is incremented (block 416). Block 392 in the SCAN routine of FIG. 25 uses this number to decide when to branch to a selected routine. If the "COLUMN" (block 407) and "ROW" (block 409) words are not the same as in the previous scan, or more than one key is pressed (block 410), the "COUNT" word is reset to zero (block 381) starting a new count sequence, before a new key will be recognized. If the multiplexer (MPX) is not selecting a group of keys, or if the "ROW" word is zero but the "COLUMN" word is different from that stored from the previous pass, the keyboard processing is bypassed via line 387.

FIG. 39 depicts the flow chart for the LDLMP subroutine having a program address/10A. The LDLMP routine transfers data in the LDLMP register 206 of FIGS. 8 and 8*a* to the shift registers 21 and 22 of FIG. 1*d*. These shift registers drive the lamp display (section 116 of FIG. 1*c*).

Index registers are initialized (block 663) to specify the LDLMP register 206. The first word of the register is read (block 664) and temporarily stored (block 665). The OUTPT routine (block 666) enters the 4 bit word into the shift register in a serial manner. If the last word had not been serviced by the OUTPT routine, the routine jumps back via line 668 and gets the next sequential word in the LDLMP register 206. The routine branches back (block 670) after the last word has been outputted.

FIG. 40 illustrates the flow chart for the subroutine OUTPT having a program address/114. The OUTPT routine is called by the LDLMP routine. Its purpose is to output a 4 bit word in serial manner into a shift register.

First, index registers (for counting and for specifying ports) are initialized (block 671). The output word is loaded into the accumulator (block 672), and then rotated right to store a bit in the carry (block 673). The remaining bits are stored (block 674). A clock pulse bit is loaded into the accumulator (block 675) and rotated left to bring in the bit stored in the carry and to bring the clock pulse bit into position (block 676). The data is then written out to the shift register (block 677). If not at the end of the sequence (block 678) a jump back to block 672 is made via line 679 so as to output the next bit. If the sequence is finished, a branch back is made per block 681.

FIG. 41 shows a flow chart for the subroutine FETCH having a program address/OBE. The FETCH routine is used to initialize CPU index registers with data from a look-up table specifying a particular meter register (block 730). The FETCH routine affords some economy in instruction count.

The accumulator is loaded with a number corresponding to the desired meter register before the call to "FETCH" is made. The FETCh routine first generates from the contents of the accumulator, an address specifying the location of the desired data. Then, the starting address of the selected meter register is loaded into an index register pair (block 731). The lamp display word address is loaded into another index register pair (block 732), and the lamp display word itself is loaded into an index register (block 733). The starting address of SETNG ("number meter set to" register 211 of FIG. 6) is put into yet another index register pair (block 734) before branching back as per block 735.

FIG. 42 depicts a flow chart for the subroutine CMPAR having a program address/09B. Subroutine CMPAR compares the meter setting register 307 (FIG. 6) with the descending register 815 of FIG. 6. There are three conditions which are considered:

(1) descending register ≧$100.00 (block 747—unconditionally larger than meter setting)

(2) $100.00 ≧descending register meter setting (blocks 747 and 749)

(3) meter setting≧descending register (block 749)

These conditions are respectively flagged by the contents of the accumulator upon branch back to the main program, i.e. branch back is made with ACC=0, 2, 3, depending upon which one of the aforementioned conditions is observed (see blocks 754, 755 and 751, respectively). The overall objective of this routine is to check the funding available (descending register) as against the called for postage (meter setting register) to be printed. If not enough funds are available to print postage, the printer will not be enabled.

FIG. 43 illustrates the flow chart for the subroutine CHECK having a program address/138. The CHECK routine is used to determine if the contents of a meter register exceeds a specified amount by testing high order digits to see if they are nonzero.

An index register is initialized with an address in the meter register corresponding to the higher order digits being checked, before the CHECK routine is called. The carry is cleared (block 719) and the location specified by the address is read (block 720). If zero (block 721), the address is incremented (block 723), and the next higher order digit is read (block 720 via line 727). Any non-zero digit causes the carry to be set (block 725). Branch back occurs (block 729) at the end of the sequence (block 726). A carry equal to zero indicates that all specified higher order digits were zero. A carry equal to 1 indicates at least one of these digits was nonzero.

FIG. 44 shows a flow chart for the subroutine ADDD having a program address/129. The ADDD routine adds the SETNG register 211 of FIG. 6 to a specified meter register, and writes the result back in the specified meter register. The meter register is specified by the contents of an index register initialized prior to calling the ADDD routine.

The carry (CPU) is cleared (block 705) before calling subroutine ADD1 which adds a SETNG register digit to a meter register digit (block 706). Then, the SETNG address is incremented (block 707), and a test made for the end of the loop (block 708). If the loop has not been completed, the next digits in each register are added together via line 709. At the end of the sequence, ADD2 is entered (block 711). ADD2 propagates the carry through the longer meter register. After completing this (block 712) a branch back to the main routine is made via block 715.

FIG. 45 depicts a flow chart for the subroutine ADD1; ADD2 having program address/120;/123. The ADD1 routine adds a digit from the SETNG register 211 of FIG. 6 to a digit from a meter register, decimal adjusts the result (binary to BCD conversion), and writes it back into the meter register.

A second entry point (ADD2) allows propagation of a carry through a meter register by adding a zero to the digit, decimal adjusting, and writing back in.

This routine adds one pair of digits at a time and is called repeatedly to add two registers together (see subroutine ADDD).

FIG. 46 relates to subroutine CLDSP; CLEER having a program address/25E;/260. CLDSP writes zeros into the display area. CLEER writes zeros into an area specified by a preset index register.

An index register is initialized to specify the display register (block 698). A zero is written into this location (block 693), the address incremented (block 696) and the next sequential location is cleared (block 694) until the clear operation is complete (loop 695). A branch back (block 699) to the calling routine is made upon completion thereof.

FIG. 47 shows a flow chart for the subroutine CLR having a program address/1B9. Subroutine CLR clears the photocell multiplexer 23 of FIG. **1*d* (block 742) and then selects the first set of photocells (every step, fifth step, solenoid monitoring photocells) as per block 743. Branch back is per block 744**.

FIG. 48 shows a flow chart for the subroutine STPB having a program address/300. The STPB routine is called by the SET routine of FIG. 28 to operate setting mechanism solenoids 60 and 70 of FIG. 3. This routine controls the solenoids so as to select a particular printer bank by bringing the master gear drive 51 (FIG. 3) into engagement with one of the respective spur gears 53*a*, 53*b*, 53*c*, 53*d*, (FIG. 3).

An index register used in the SET routine conveys information as to which printing bank is to be selected (block 627). A series of tests (blocks 628, 629, 630, respectively) determine which one of the four printer banks a, b, c, d, is selected. If, for example, bank b were selected, block 631 would be entered which requires both solenoids to be actuated. This is done by loading the appropriate bits (two 1's in this case) into the shift register (element 24 of FIG. 1*d*). After the solenoids are selected, a delay routine (block 635) provides time for the mechanism of the printer to respond to the electrical signals. Photocells (102 and 103 of FIG. 3) monitoring the position of the solenoids are then read (block 636) and compared with what they are expected to read (block 637). If the reading is in correspondence, a branch back with a zero in the accumulator (block 640) is made. Otherwise, an error is flagged (line 641) by branching back as per block 642 with the accumulator =/B.

A bank "c" selection (decision block 628) will require that both solenoids be deactuated (block 644). Banks d or a will require one or the other of the solenoids to be actuated (blocks 646 or 648).

FIG. 49 illustrates a flow chart for the subroutine ZEROB having a program address/353. Subroutine ZEROB reads photocells 107*a, b, c, d,* of FIG. 4*a*, which detects the zero positions of the print wheels of the printer. The reading from a selected bank is placed into the carry bit of the accumulator.

The second photocell set is selected by clocking the photocell multiplexer (block 649). A slight delay (block 650) allows time for the photocells to respond. A series chain of decision blocks (651, 652 and 653) is entered to determine from preset status characters, which of the photocell readings (banks a, b, c or d) is to be selected. If for example, bank a were selected, the photocells would be read (block 654*a*) and the data shifted in the CPU accumulator until the photocell bit corresponding to bank a is in the carry bit (block 655*a*). A branch back (block 656) then follows.

FIG. 50 relates to the flow chart for subroutine SETX having a program address/37E. The SETX routine is that portion of the SET subroutine of FIG. 28, that performs the detailed setting of the print wheels to the value shown in the display.

Index registers are initialized (block 546) to specify the display register 208 (FIG. 8) address and the meter setting register (MSR) 307 (FIG. 6) address. The contents of the display are transferred to the meter setting register (block 541). The number to be set (MSR) is compared with the previous number i.e., with "number meter set to" register 211 of FIG. 6 (SETNG). This is accomplished digit by digit (block 547). If not the same, the motor direction flag 215 (FIG. 9) is initialized as per block 556 (direction determined by which number is greater [MSR digit or SETNG digit]) and the difference between the numbers is stored. The new number (MSR) is then written into the previous number area (SETNG) as per block 553. The printer is set to the appropriate bank for the digit being considered (block 558). If the bank selection mechanism does not respond, photocells detect an error. If no error, line 562 is taken to block 563. One step in the appropriate directior is taken, and a check is made to ascertain if there is a stepping error (block 564). If no error has been flagged, the fifth position flag 216 (FIG. 9) is updated (block 567). If the flag indicates that the photocell (110*b* of FIG. 4*a*) should be seeing the fifth position slot, (block 572) the photocell is read (block 574). If it verifies that the motor is on a fifth step (block 575), a check is made to see if the proper number of steps has been counted off (line 577 to block 580). If not, a return via line 587 is taken to block 563 (STEP). The above procedure is then repeated. When the selected print wheel has been fully stepped to its new position, and if the position is zero (block 584), the ZEROB subroutine is called (block 586) to read the zero position photocells. This is to verify if in fact, the selected print wheel is at zero (decision block 587). If so, the photocell multiplexer is restored to selecting the first bank (block 589). The flags used in the STPB routine are cleared via line 590 to block 592. If not the last bank to be set (block 594), a branch back via line 595 is made to compare the next new number digit with the previous number digit. The setting process is then repeated. If any bank does not have to be altered (decision block 549) the setting process for that particular bank is bypassed via line 604. If the last bank had been selected in block 594, the setting mechanism is returned to the (first bank) rest position (block 597). If no error is detected (block 598) in returning to the rest position, the ENBLE routine is called (block 600) which enables the meter if a sufficient amount of postage is available in the descending register. The "ADD" register 210 (FIG. 7) is cleared (block 601), before branching back (block 602). Any error in stepping the motor 50 (FIG. 3) or bank selection causes a branch to the error routine (block 561) which causes an error message to be placed in the display.

FIG. 51 relates to the flow chart for the STEP routine, having a program address/1C7. The STEP subroutine changes the setting of a selected print wheel of the printer of FIG. 3 by one unit. The flag for motor direction is set up before calling the STEP routine. Normally, the motor starts from a STEP reference position. On start-up, the motor word* (1001) is written out which turns the motor and puts the monitoring wheel 109 (FIG. 3) of the motor in either a "STEP" or "HALF-STEP" reference position. The "every step" photocell 110*a* of FIGS. 3 and 4*a* sensing the wheel 109 position is read. If it indicates that the motor wheel 109 is on a "HALF-STEP" reference position, the motor is advanced half a step. From that point on, the STEP routine pulses the motor in increments of eight motor words, i.e. from one "STEP" reference position to a succeeding "STEP" reference position.

*The bit pattern corresponding to energizing or deenergizing stepper motor coils is referred to as the "motor word". There are eight "motor words" for each step, and four "motor words" for each half-step of the motor. (See APPENDIUM B for a discussion of motor operation.).

Index registers are initialized (block 605) to specify look-up table addresses when the motor word pattern for "STEP-UP" and "STEP-DOWN" is stored. The output port to the motor drivers is selected (block 606). A status character 215 of FIG. 9 is read to determine the direction the motor is to be stepped (block 607). The appropriate motor word is loaded (blocks 611 or 612) then written out (block 613). A delay loop is entered (block 614) to give the motor time to respond. If not at the end of the loop (block 548), a return via line 550 is made to block 607 to get the next bit pattern. (There are four different bit patterns per half-step.) After the fourth word is written out, the "every step" photocell 110*a* of FIG. 4) is read (block 615). On the first pass through this routine, the monitoring wheel should have gone from "STEP" to "HALF-STEP" reference positions. The photocell (block 618) is read to verify that it is on a "HALF-STEP" (photocell should be blocked by a tooth on slotted monitoring wheel 109 [FIG. 3]). If on a half-step, re-entry to block 605 is made via line 621 to re-enter the routine to write out four more words. The monitor wheel should now be on a full "STEP" again. Photocell 110*a* is read (block 620) to verify the full step position. Then there is a branch back (block 626). If at any place the photocell doesn't agree with what it should be, there is a branch back with an error message (1*c*) as per block 623.

APPENDIUM A

Comments on The Postage Meter Program Printout

The representation of some of the instructions has been slightly altered from those representations Intel uses in their Users Manual (copyright March 1972, Rev. 2). Double instructions are printed on two lines, rather than one. The second line contains data or an address associated with the double word instruction. Data, numbers, and addresses are generally given in hexadecimal notation, rather than the decimal and octal notation found in the Users Manual. The following list indicates the format of instructions which differ from the format in the Users Manual. "D" indicates data in hexadecimal notation. "R" represents an index register number in hexadecimal. Reference should be made to the Users Manual for a complete description of the instructions.

| MNEMONIC | PROGRAM REPRESENTATION | COMMENTS |
|---|---|---|
| LDM | LDM + D | |
| LD | LD + R | |
| XCH | XCH + R | |
| ADD | ADD + R | |
| SUB | SUB + R | |
| INC | INC + R | |
| BBL | BBL + D | |
| ISZ | ISZ + R | |
| JCN | JCN + TZ | where condition is TEST = 0 |
| | JCN + AZ | where condition is ACCUMULATOR = 0 |
| | JCN + AN | where condition is ACCUMULATOR ≠ 0 |
| | JCN + CZ | where condition is CARRY = 0 |
| | JCN + CN | where condition is CARRY ≠ 0 |
| JIN | JIN + R | |
| SRC | SRC + R | R is even, refers to register pair R, R + 1 |
| FIN | FIN + R | (R is even, refers to register pair R, R + 1) |
| FIM | FIM + R | (R is even, refers to register pair R, R + 1) |

INTERPRETATION OF THE COMPUTER PRINTOUT

STATEMENT NUMBER — COMMENTS

```
01116  *SUBROUTINE ADP        30 JAN 74
01117  *ROUTINE TO ADD POSTAGE TO METER (BOTH
01118  *DESCENDING REGISTER AND CONTROL SUM)
```

HEXADECIMAL REPRESENTATION OF INSTRUCTION ADDRESS — MACHINE INSTRUCTION IN HEXADECIMAL — STATEMENT NUMBER — LABEL OF INSTRUCTION — INSTRUCTION IN MNEMONIC FORM — COMMENTS

```
1400 0 8020 01119 ADP  DC FIM + /C
1401 0 00B7 01120      DC /B7
1402 0 802D 01121      DC SRC + /C
1403 0 80EC 01122      DC RDC         (B) READ STATUS CHARACTER
1404 0 80F6 01123      DC RAR         CHECK FOR XXX1
1405 0 801A 01124      DC JCN + CZ
1406 0 143B 01125      DC ERRR
1407 0 802E 01126      DC FIM + /E
1408 0 0000 01127      DC /00
1409 0 806F 01128 RTN1 DC INC + /F    DETERMINE NUMBER OF CHARACTERS
140A 0 802D 01129      DC SRC + /C    IN DISPLAY
140B 0 80E9 01130      DC RDM
140C 0 8014 01131      DC JCN + AZ
140D 0 1410 01132      DC END
```

APPENDIUM B

Description of the Stepping Motor Operation

The stepping motor 50 (FIG. 3, 4*a*) has four driving coils, two of which are energized at a time. The motor rotates one increment (motor step) when the pattern of energized coils changes. The schematic of the motor driving circuitry is shown in FIG. 19.

In the following table, "1" will represent an energized coil, "φ" will represent a de-energized coil. The stepping sequences are as follows: The "STEP-UP" sequence turns the motor in such a direction as to increase the meter setting, the "STEP-DOWN" sequence decreases the meter setting. The bit pattern corresponding to energized and de-energized coils will be referred to as the "MOTOR WORD".

TABLE

| TIME PERIODS | | | MOTOR WORD (STEP-UP) Coil 1 | Coil 2 | Coil 3 | Coil 4 | MOTOR WORD (STEP-DOWN) Coil 1 | Coil 2 | Coil 3 | Coil 4 |
|---|---|---|---|---|---|---|---|---|---|---|
| One Full Step | $T_0$ | One-Half Step | 1 | 0 | 0 | 1 | 1 | 0 | 0 | 1 |
| | $T_1$ | | 0 | 0 | 1 | 1 | 1 | 1 | 0 | 0 |
| | $T_2$ | | 0 | 1 | 1 | 0 | 0 | 1 | 1 | 0 |
| | $T_3$ | | 1 | 1 | 0 | 0 | 0 | 0 | 1 | 1 |
| | $T_4$ | | 1 | 0 | 0 | 1 | 1 | 0 | 0 | 1 |
| | $T_5$ | | 0 | 0 | 1 | 1 | 1 | 1 | 0 | 0 |
| | $T_6$ | | 0 | 1 | 1 | 0 | 0 | 1 | 1 | 0 |
| | $T_7$ | | 1 | 1 | 0 | 0 | 0 | 0 | 1 | 1 |
| | $T_{0'}$ | | 1 | 0 | 0 | 1 | 1 | 0 | 0 | 1 |

($T_O$; $T_O'$) is the "rest" state where the motor remains when it is not being stepped. When stepping, $T_n - T_{n-1} \approx$ delay in the stepping routine (STEP, FIG. 51). The gears coupling the motor to the print wheels are such that a sequence of motor steps as above (from $T_O$ to $T_O'$) will change the meter setting by a single unit in the selected bank. A slotted wheel 109 (FIG. 3) is coupled to the motor such that when the motor is at $T_O$ (or $T_O'$) the photocell 110*a* (FIG. 3) sees a slot, and at the $T_4$ time period the photocell sees a tooth. Thus, in changing the print mechanism by one digit the photocell should see a slot-tooth-slot sequence. This provides a means of monitoring the stepping sequence to verify motor operation.

It will be appreciated by those skilled in the postage meter art, that a new postage meter system has been disclosed herein. As a result of the many new concepts and novelties thereby introduced, it is probable that many modifications of an obvious nature will occur to the skilled practitioner in this art. All such obvious changes are intended to be within the spirit and scope of this invention as presented by the appended claims.

```
PAGE   1      11/21/74

// JOB      0001 0002                    0001 0002                 1

LOG DRIVE    CART SPEC    CART AVAIL    PHY DRIVE
  0000          0001         0001         0000
  0001          0002         0002         0001

V2 M09    ACTUAL 16K   CONFIG 16K

*EQUAT(PAPTX,PAPTY)

// ASM
*MACLIB INTAS
*XREF
                                  ABS
                                  CLEAR
                       *PROGRAM AS OF 30 JAN 1974       EPM-2
                       ***************************************************************
                       * ROM =0 ******************************************************
                       ***************************************************************
                       *** INITIALIZATION                         ********************
1000 0   8000                     DC       NOP
1001 0   802E                     DC       FIM+/E      SET MOTOR TO FIRST STEP
1002 0   00C0                     DC       /C0         RAM 3 PORT USED
1003 0   802F                     DC       SRC+/E
1004 0   8009                     DC       LDM+9
1005 0   80E1                     DC       WMP         RAM3
1006 0   8050                     DC       JMS         LOAD MEMORY
1007 0   1142                     DC       INRAM
1008 0   802A                     DC       FIM+/A      CLEAR METER SETTING REGISTER
1009 0   0030                     DC       /30
100A 0   8050                     DC       JMS
100B 0   1260                     DC       CLEER
100C 0   8050                     DC       JMS         SET METER TO 0000
100D 0   1174                     DC       HOME
100E 0   8004             WW      DC       LDM+4       LOAD DESCENDING REGISTER
100F 0   80FA                     DC       STC
1010 0   8026                     DC       FIM+6
1011 0   1224                     DC       DESC
```

```
1012 0  8050   00026          DC      JMS
1013 0  12C1   00027          DC      FCTN
1014 0  802C   00028          DC      FIM+/C     WRITE  SET DATE  REMINDER INTO
1015 0  008D   00029          DC      /8D        DISPLAY WORD
1016 0  802D   00030          DC      SRC+/C
1017 0  80D1   00031          DC      LDM+1
1018 0  80E0   00032          DC      WRM
1019 0  8050   00033          DC      JMS
101A 0  14A3   00034          DC      CHCK
101B 0  8050   00035          DC      JMS
101C 0  110A   00036          DC      LDLMP
               00037   *SUBROUTINE SCAN                              08 JUNE 1973
               00038   *REGISTERS 0X,6X,8X,AX,CX,EX ARE USED TEMPORARILY BY ROUT.
               00039   *REGISTER 2 'COUNT' WORD      SAVE
               00040   *REGISTER 4 'ROW' WORD        SAVE
               00041   *REGISTER 5 'COLUMN' WORD     SAVE
101D 0  802E   00042   SCAN   DC      FIM+/E     SET UP CNTR TO CHECK BLANKING
101E 0  0089   00043          DC      /89
101F 0  802A   00044          DC      FIM+/A     SELECT S R PORT LOCATION
1020 0  0000   00045          DC      /00
1021 0  8028   00046          DC      FIM+8      OUTPUT PORT DISPLAY LOCATION
1022 0  0049   00047          DC      /49        R9 NUMBER OF DISPLAY DIGITS
1023 0  802F   00048   CONT3  DC      SRC+/E     ROUTINE TO DETERMINE BLANKING
1024 0  80E9   00049          DC      RDM
1025 0  8014   00050          DC      JCN+AZ     CHECK FOR NON-ZERO DIGIT
1026 0  1029   00051          DC      CONT4
1027 0  80AF   00052          DC      LD+/F
1028 0  8089   00053          DC      XCH+9      UPDATE COUNT REGISTER FOR DIGITS
1029 0  807F   00054   CONT4  DC      ISZ+/F
102A 0  1023   00055          DC      CONT3
               00056   *S/R PORT RAM 0, DISPLAY PORT RAM 1
               00057   * FIRST PART OF PROGRAM DETERMINES BLANKING
               00058   *
102B 0  802E   00059          DC      FIM+/E     INITIAL DISPLAY BUFFER LOCATION
102C 0  00B6   00060          DC      /B6
102D 0  80D3   00061          DC      LDM+3      GET MPX STARTED
102E 0  8050   00062          DC      JMS
102F 0  149E   00063          DC      CP
1030 0  802F   00064   STRT   DC      SRC+/E     SELECT LOCATION IN DISPLAY BUFFER
1031 0  80E9   00065          DC      RDM        READ DISPLAY CHARACTER
1032 0  8029   00066          DC      SRC+8
1033 0  80E1   00067          DC      WMP        RAM1
1034 0  80F1   00068          DC      CLC
1035 0  80A9   00069          DC      LD+9       INDICATES DIGITS TO BE DISPLAYED
1036 0  809F   00070          DC      SUB+/F     CHECK TO SEE IF NUM. TO BE DISPLAYED
1037 0  8000   00071          DC      LDM+0
1038 0  80F6   00072          DC      RAR
1039 0  802B   00073          DC      SRC+/A     RAM0  8 BIT
103A 0  80E1   00074          DC      WMP        RAM0  0 BLANKS, 1 UNBLANKS
               00075   * GOES TO DECODER DRIVER
103B 0  80F1   00076          DC      CLC
103C 0  80D7   00077          DC      LDM+7
103D 0  808F   00078          DC      ADD+/F
103E 0  801A   00079          DC      JCN+CZ
103F 0  1060   00080          DC      T4
               00081   * SKIP OVER FIRST FEW BANKS OF KEYS
1040 0  80EA   00082          DC      RDR        ROM0  READ 'ROW' WORD
1041 0  8014   00083          DC      JCN+AZ     TEST FOR INPUT
1042 0  1059   00084          DC      T1
1043 0  80FC   00085          DC      KBP        KEYBOARD 1-4 IF KEY ON
1044 0  8083   00086          DC      XCH+3      STORE
1045 0  80AF   00087          DC      LD+/F
1046 0  8085   00088          DC      XCH+5      UPDATE 'COLUMN' WORD
1047 0  80F1   00089          DC      CLC
1048 0  8095   00090          DC      SUB+5      COMPARE WITH PREVIOUS 'COLUMN' WORD
1049 0  801C   00091          DC      JCN+AN     WORD NOT EQUAL, JUMP 'COUNT' WORD =0
104A 0  105E   00092          DC      T2
104B 0  8063   00093          DC      INC+3      CONTINUE IF SAME R3 = 2-5
104C 0  80A3   00094          DC      LD+3       CHECK TO SEE IF MORE THAN ONE KEY
104D 0  8014   00095          DC      JCN+AZ     MORE THAN ONE KEY, JUMP,
104E 0  105E   00096          DC      T2         SET 'COUNT' WORD = 0
104F 0  8084   00097          DC      XCH+4      COMPARE WITH PREVIOUS 'ROW' WORD
1050 0  80F1   00098          DC      CLC
1051 0  8094   00099          DC      SUB+4      COMPARE
1052 0  801C   00100          DC      JCN+AN     NOT SAME, JUMP, SET 'COUNT' = 0
1053 0  105E   00101          DC      T2
```

```
1054 0  80A2            DC    LD+2       INCREMENT 'COUNT' WORD IF WORD SAME
1055 0  80FA            DC    STC
1056 0  80F5            DC    RAL
1057 0  8040            DC    JUN
1058 0  105F            DC    T3
1059 0  80AF      T1    DC    LD+/F      COMPARE 'COLUMN' WORD
105A 0  80F1            DC    CLC        F NOT 5, 'COUNT' WORD SAME
105B 0  8095            DC    SUB+5      F = 5 'COUNT' WORD SET TO ZERO
105C 0  801C            DC    JCN+AN
105D 0  1060            DC    T4
105E 0  8000      T2    DC    LDM+0      SET 'COUNT' WORD TO ZERO
105F 0  8082      T3    DC    XCH+2      UPDATE 'COUNT' WORD
1060 0  802C      T4    DC    FIM+/C     INITIALIZE REGISTER
1061 0  00F0            DC    /F0
1062 0  8070      CIRC  DC    ISZ+/0     DELAY LOOP
1063 0  1062            DC    CIRC
1064 0  8011            DC    JCN+TZ     TEST FOR SHUTDOWN
1065 0  10E7            DC    DWN3
1066 0  807C            DC    ISZ+/C
1067 0  1062            DC    CIRC
1068 0  8002            DC    LDM+2      GENERATE CP TO ADVANCE SCAN
1069 0  8050            DC    JMS        TO NEXT DIGIT
106A 0  149E            DC    CP
106B 0  807F            DC    ISZ+/F     LOOK FOR END OF SCAN
106C 0  1030            DC    STRT
106D 0  80F1            DC    CLC
106E 0  80D7            DC    LDM+7      PROCESS KEY ON 'COUNT' WORD = 0111
106F 0  8092            DC    SUB+2
1070 0  801C            DC    JCN+AN     CHECK TO SEE IF PROPER 'COUNT' WORD
1071 0  1099            DC    T5         IF NOT 0111, GO BACK TO SCAN
1072 0  80F1            DC    CLC
1073 0  80DA            DC    LDM+/A     PLACE TABLE
1074 0  8084            DC    ADD+4      SET UP FIN
                  *ADD CONTENTS OF R4 (2-5)
1075 0  8080            DC    XCH+0
1076 0  80A5            DC    LD+5       6-F
1077 0  8081            DC    XCH+1      0X SET UP WITH ADDRESS
                  *
1078 0  8036            DC    FIN+6
1079 0  802A            DC    FIM+/A     ADDRESS CONTAINING BATCH
107A 0  008E            DC    /8E        INDICATORS
107B 0  802B            DC    SRC+/A
107C 0  80E9            DC    RDM
107D 0  80F1            DC    CLC        ISOLATE BATCH INDICATORS
107E 0  80F6            DC    RAR
107F 0  80F1            DC    CLC
1080 0  80F6            DC    RAR
                  *READ TO SEE IF BATCH DISPLAYED
                  *
1081 0  80E4            DC    WRO        (8) STORE
1082 0  802A            DC    FIM+/A     CLLMP CLEAR LAMP DISPLAY AREA
1083 0  0088            DC    /88
1084 0  8050            DC    JMS
1085 0  1260            DC    CLEER
1086 0  80FA            DC    STC        TEMPORARY CARD CHANGE SUBROUTINES
1087 0  8050            DC    JMS        JUMP TO FUNCTION REPRESENTED BY KEY
1088 0  12C1            DC    FCTN
1089 0  802A            DC    FIM+/A     SELECT STATUS CHARACTER
108A 0  0080            DC    /80
108B 0  802B            DC    SRC+/A
108C 0  80E4            DC    WRO        (B) ACCUMULATOR CONTENTS UPON RETURN
                  *                      FROM FCTN STORED HERE
108D 0  8050            DC    JMS        COMPARE METER SETTING REGISTER WITH
108E 0  109B            DC    CMPAR      DESCENDING REGISTER
108F 0  802A            DC    FIM+/A     SELECT OUTPUT WORD
1090 0  008C            DC    /8C        LOW POSTAGE, NO POSTAGE
1091 0  802B            DC    SRC+/A
1092 0  80F1            DC    CLC
1093 0  80EB            DC    ACM        WRITE LOW POSTAGE, NO POSTAGE IN
1094 0  80E0            DC    WRM        DISPLAY LAMP REGISTER
1095 0  8050            DC    JMS
1096 0  14A3            DC    CMCK
1097 0  8050            DC    JMS
1098 0  110A            DC    LDLMP
1099 0  8040      T5    DC    JUN        RETURN TO SCAN
109A 0  1010            DC    SCAN
```

```
                     *SUBROUTINE COMPARE  METER SETTING VS DESC. REG 08 JUNE 1973
                     *REGISTERS BX,AX,EX USED BY ROUTINE
109B 0   8028        CMPAR DC      FIM+8      METER SETTING REGISTER
109C 0   003C              DC      /3C
109D 0   802A              DC      FIM+/A     INITIAL LOCATION OF DESCENDING REG.
109E 0   0000              DC      /00
109F 0   802E              DC      FIM+/E     COUNTING LOOPS
10A0 0   000E              DC      /0E
10A1 0   80FA              DC      STC
                     *
10A2 0   80F9        C1    DC      TCS        SUBTRACTION LOOP TO COMPARE MSR WITH
10A3 0   8029              DC      SRC+8      DESCENDING REGISTER
10A4 0   80E8              DC      SBM
10A5 0   80F1              DC      CLC
10A6 0   802B              DC      SRC+/A
10A7 0   80EB              DC      ADM
10A8 0   80FB              DC      DAA
10A9 0   806B              DC      INC+/B
10AA 0   8079              DC      ISZ+9
10AB 0   10A2              DC      C1
                     *BASIC SUBTRACTION LOOP
                     *
10AC 0   80F9        C2    DC      TCS
10AD 0   802B              DC      SRC+/A
10AE 0   80EB              DC      ADM
10AF 0   80FB              DC      DAA        PROCESS CARRY
10B0 0   80E9              DC      RDM
10B1 0   8014              DC      JCN+AZ
10B2 0   10B4              DC      C3
10B3 0   806E              DC      INC+/E     CHECK FOR MORE THAN $100
                     *E NOT ZERO, DESC. REG. GREATER THAN OR = $100.00
10B4 0   806B        C3    DC      INC+/B
10B5 0   807F              DC      ISZ+/F
10B6 0   10AC              DC      C2
10B7 0   80AE              DC      LD+/E
10B8 0   8014              DC      JCN+AZ
10B9 0   10BB              DC      C4
10BA 0   80C0              DC      BBL+0      GREATER THAN $100
10BB 0   801A        C4    DC      JCN+CZ
10BC 0   10F8              DC      C5         C5    BBL+3
10BD 0   80C2              DC      BBL+2      LESS THAN $100
                     *SUBROUTINE FETCH                                   08 JUNE 1973
                     *REGISTERS 0X,8X,AX,CX,EX ARE USED
                     *ROUTINE INITIALIZES REGISTERS 8X,AX,CX,EX
                     *8X  INITIAL ADDRESS OF 'NUMBER METER SET TO' REGISTER
                     *AX  INITIAL ADDRESSES OF VARIOUS REGISTERS
                     *CX  WORD ADDRESS FOR LOAD LAMP
                     *E WORD FOR LOAD LAMP, F COUNTER FOR LOOP IN ADD SUBROUTINE
10BE 0   8081        FETCH DC      XCH+1      ACCUMULATOR CARRIES ADDRESS (0-6)
10BF 0   800D              DC      LDM+/D
10C0 0   8080              DC      XCH+0      0X TO DX
10C1 0   803A              DC      FIN+/A     AX INITIALIZED
10C2 0   8060              DC      INC+0      0X TO EX
10C3 0   803C              DC      FIN+/C     CX INITIALIZED
10C4 0   8060              DC      INC+0      0X TO FX
10C5 0   803E              DC      FIN+/E     EX INITIALIZED
10C6 0   8028              DC      FIM+8      8X INITIALIZED
10C7 0   003C              DC      /3C
10C8 0   80C0              DC      BBL+0
                     *SUBROUTINE LOOK-UP TABLE                           08 JUNE 1973
10C9                       ORG     /10C9
10C9 0   1276              DC      TT1        T1   ADP                        C9
10CA 0   1223              DC      COUNT      PIECE COUNT                     CA
10CB 0   1201              DC      ONE        NUMBER 1                        CB
10CC 0   1202              DC      TWO        NUMBER 2                        CC
10CD 0   1203              DC      THREE      NUMBER 3                        CD
10CE 0   1226              DC      CNTRL      CONTROL SUM                     CE
10CF 0   0000              DC      /00                                        CF
                     *
10D0 0   0000              DC      /00                                        D0
10D1 0   002A              DC      /2A        BATCH COUNT                     D1
10D2 0   001A              DC      /1A        BATCH SUM                       D2
10D3 0   0010              DC      /10        PIECE COUNT                     D3
10D4 0   0000              DC      /00        DESCENDING REGISTER             D4
10D5 0   0006              DC      /06        ASCENDING REGISTER              D5
10D6 0   0020              DC      /20        CONTROL SUM                     D6
```

```
                 *INITIAL ADDRESSES OF REGISTERS     AX
                 *
100D7 0   0000          DC      /00                                     D7
100B 0    0000          DC      /00                                     D8
10D9 0    1273          DC      TT2       T2   SUBP                     D9
10DA 0    1222          DC      BSUM      BATCH SUM                     DA
10DB 0    1204          DC      FOUR      NUMBER 4                      DB
10DC 0    1205          DC      FIVE      NUMBER 5                      DC
10DD 0    1206          DC      SIX       NUMBER 6                      DD
10DE 0    1225          DC      ASC       ASCENDING REGISTER            DE
10DF 0    0000          DC      /00                                     DF
                 *
10E0 0    0000          DC      /00                                     E0
10E1 0    008E          DC      /8E       BATCH COUNT                   E1
10E2 0    008E          DC      /8E       BATCH SUM                     E2
10E3 0    008F          DC      /8F       PIECE COUNT                   E3
10E4 0    008F          DC      /8F       DESCENDING REGISTER           E4
10E5 0    008F          DC      /8F       ASCENDING REGISTER            E5
10E6 0    008E          DC      /8E       CONTROL SUM                   E6
                 *SELECT WORD FOR LOAD LAMP AREA   CX
                 *
10E7 0    8040   DWN3   DC      JUN                                     E7
10E8 0    115A          DC      DOWN                                    E8
10E9 0    1297          DC      POST      PHOTOCELL                     E9
10EA 0    1221          DC      BCNT      BATCH COUNT                   EA
10EB 0    1207          DC      SEVEN     NUMBER 7                      EB
10EC 0    1208          DC      EIGHT     NUMBER 8                      EC
10ED 0    1209          DC      NINE      NUMBER 9                      ED
10EE 0    1224          DC      DESC      DESCENDING REGISTER           EE
10EF 0    0000          DC      /00                                     EF
                 *
10F0 0    0000          DC      /00                                     F0
10F1 0    004C          DC      /4C       BATCH COUNT                   F1
10F2 0    008A          DC      /8A       BATCH SUM                     F2
10F3 0    0029          DC      /29       PIECE COUNT                   F3
10F4 0    004A          DC      /4A       DESCENDING REGISTER           F4
10F5 0    0086          DC      /86       ASCENDING REGISTER            F5
10F6 0    0026          DC      /26       CONTROL SUM                   F6
                 *WORD FOR LDLAMP, COUNTER   E,F
                 *
10F7 0    0000          DC      /00                                     F7
10F8 0    80C3   C5     DC      BBL+3                                   F8
10F9 0    0000          DC      /00                                     F9
10FA 0    1230          DC      CLEAR     CLEAR                         FA
10FB 0    1266          DC      UNLCK     $UNLOCK                       FB
10FC 0    1200          DC      ZERO      NUMBER 0                      FC
10FD 0    0000          DC      /00                                     FD
10FE 0    1278          DC      PLUS      +=                            FE
10FF 0    12C5          DC      SET       SET                           FF
                 *SUBROUTINE                                 08 JUNE 1973
1100                    ORG     /1100
                 **************************************************************
                 * ROM =1 ******************************************************
                 **************************************************************
                 *SUBROUTINE METER ENABLE                    08 JUNE 1973
                 *REGISTERS AX USED
1100 0    8050   ENBLE  DC      JMS       COMPARE WITH REGISTER CONTENTS
1101 0    109B          DC      CMPAR     METER SETTING VS DESC. REG.
1102 0    801A          DC      JCN+CZ
1103 0    1109          DC      Z11       JUMP OUT IF TOO LARGE C=0
1104 0    8004          DC      LDM+4
1105 0    802A          DC      FIM+/A    IF YES, LOAD BIT TO ENABLE METER
1106 0    008D          DC      /8D       LOCATION IN OUTPUT WORD
1107 0    802B          DC      SRC+/A
1108 0    80E0          DC      WRM
1109 0    80C0   Z11    DC      BBL+0
                 *SUBROUTINE LOAD LAMPS                      08 JUNE 1973
                 *REGISTERS AX,CX,F USED
110A 0    802C   LDLMP  DC      FIM+/C    FIRST ADDRESS IN LAMP STORAGE
110B 0    008B          DC      /8B       LOCATION
110C 0    802D   RTN    DC      SRC+/C    SET UP INITIAL ADDRESS
110D 0    80E9          DC      RDM       READ WORD
110E 0    808F          DC      XCH+/F    TEMP. STORE
110F 0    8050          DC      JMS
1110 0    1114          DC      OUTPT
1111 0    807D          DC      ISZ+/D
```

```
1112 0  110C    00330          DC     RTN
1113 0  80C0    00331          DC     BBL+0
1114 0  802A    00332   OUTPT  DC     FIM+/A     SET UP COUNTING LOOP
1115 0  000C    00333          DC     /0C
1116 0  808F    00334   OUT    DC     XCH+/F     RECALL WORD
1117 0  80F6    00335          DC     RAR        PUT RIGHT BIT IN CARRY
1118 0  808F    00336          DC     XCH+/F     STORE REST OF WORD
1119 0  80D2    00337          DC     LDM+2      WRITE IN CP
111A 0  80F5    00338          DC     RAL
111B 0  8050    00339          DC     JMS        JUMP TO CLOCK PULSE
111C 0  149E    00340          DC     CP
111D 0  807B    00341          DC     ISZ+/B
111E 0  1116    00342          DC     OUT
111F 0  80C0    00343          DC     BBL+0
                00344   *SUBROUTINE ADD SUBROUTINES                       08 JUNE 1973
                00345   *REGISTERS 8X,AX,F USED
1120 0  8029    00346   ADD1   DC     SRC+8      INITIAL ADDRESS OF METER REGISTER
1121 0  80E9    00347          DC     RDM
1122 0  806F    00348   ADD1X  DC     INC+/F     INCREMENT COUNTER
1123 0  802B    00349   ADD2   DC     SRC+/A     SELECT REGISTER ADDRESS
1124 0  80E8    00350          DC     ADM        ADD
1125 0  80FB    00351          DC     DAA
1126 0  80E0    00352          DC     WRM        WRITE
1127 0  806B    00353          DC     INC+/B     INCREMENT REGISTER ADDRESS
1128 0  80C0    00354          DC     BBL+0
1129 0  80F1    00355   ADDO   DC     CLC
112A 0  8050    00356   ADDY   DC     JMS
112B 0  1120    00357          DC     ADD1
112C 0  8079    00358          DC     ISZ+9      INCREMENT ADDRESS OF METER REGISTER
112D 0  112A    00359          DC     ADDY       TERMINATE LOOP WHEN COMPLETED
112E 0  8050    00360   ADDX   DC     JMS
112F 0  1123    00361          DC     ADD2
1130 0  807F    00362          DC     ISZ+/F     INCREMENT COUNTER, TERMINATE LOOP
1131 0  112E    00363          DC     ADDX       WHEN FINISHED
1132 0  80C0    00364          DC     BBL+0
                00365   *SUBROUTINE ERROR                                 08 JUNE 1973
                00366   *REGISTERS AX USED
1133 0  802A    00367   ERROR  DC     FIM+/A     SELECT LOCATION IN DISPLAY BUFFER
1134 0  008F    00368          DC     /8F
1135 0  802B    00369          DC     SRC+/A
1136 0  80E0    00370          DC     WRM        WRITE IN ERROR MESSAGE
1137 0  80C0    00371          DC     BBL+0
                00372   *SUBROUTINE CHECK (USED IN SET)                   08 JUNE 1973
                00373   *REGISTERS AX,C USED
                00374   *CHECKS TO SEE IF CERTAIN LOCATIONS ARE NON-ZERO.  IF
                00375   *NON-ZERO, CARRY IS SET
                00376   *REGISTERS SET UP BEFORE SUBROUTINE CALLED
1138 0  80F1    00377   CHECK  DC     CLC
1139 0  802B    00378   CK1    DC     SRC+/A
113A 0  80E9    00379          DC     RDM
113B 0  8014    00380          DC     JCN+AZ
113C 0  113E    00381          DC     CK2
113D 0  80FA    00382          DC     STC
113E 0  806B    00383   CK2    DC     INC+/B
113F 0  807C    00384          DC     ISZ+/C
1140 0  1139    00385          DC     CK1
1141 0  80C0    00386          DC     BBL+0
                00387   *SUBROUTINE INITIALIZE                            08 JUNE 1973
                00388   *REGISTERS 0X,2X,4X,6X ARE USED
1142 0  8020    00389   INRAM  DC     FIM+0      SELECT PORT  RAM1
1143 0  0040    00390          DC     /40        BCD OUTPUT
1144 0  8022    00391          DC     FIM+2      SELECT PORT   RAM 2
1145 0  0080    00392          DC     /80        CP
1146 0  8024    00393          DC     FIM+4      INTEL RAM WHERE CONTENTS DUMPED
1147 0  0000    00394          DC     /00        ADDRESSING
1148 0  8026    00395          DC     FIM+6      SELECT PORT   ROM2
1149 0  0020    00396          DC     /20        BCD INPUT
114A 0  8027    00397   LD1    DC     SRC+6
114B 0  80EA    00398          DC     RDR        ROM2  OUTPUT OF SHIFT REGISTER
114C 0  8025    00399          DC     SRC+4      MEMORY
114D 0  80E0    00400          DC     WRM        PUT IN MEMORY
114E 0  8021    00401          DC     SRC+0
114F 0  80E1    00402          DC     WMP        RAM1  WRITE BACK IN S/R
1150 0  8023    00403          DC     SRC+2
1151 0  80D8    00404          DC     LDM+8      GENERATE CLOCK PULSE
1152 0  80E1    00405          DC     WMP        RAM2
```

```
1153 0  80D0   00406            DC    LDM+0
1154 0  80E1   00407            DC    WMP        RAM2
1155 0  8075   00408            DC    ISZ+5      INCREMENT RAM ADDRESS
1156 0  114A   00409            DC    LD1
1157 0  8074   00410            DC    ISZ+4      INCREMENT RAM ADDRESS
1158 0  114A   00411            DC    LD1
1159 0  80C0   00412            DC    BBL+0
               00413   *SUBROUTINE SHUTDOWN                            08 JUNE 1973
               00414   *REGISTERS 0X,2X,4X USED
115A 0  8020   00415   DOWN     DC    FIM+0      SELECT S/R INPUT
115B 0  0040   00416            DC    /40        BCD INPUT
115C 0  8022   00417            DC    FIM+2      SELECT PORT
115D 0  0088   00418            DC    /88        CP
115E 0  8024   00419            DC    FIM+4
115F 0  0000   00420            DC    /00        ADDRESSING, RAM
1160 0  8025   00421   DWN1     DC    SRC+4
1161 0  80E9   00422            DC    RDM        READ RAM
1162 0  8021   00423            DC    SRC+0
1163 0  80E1   00424            DC    WMP        RAM1  WRITE OUT TO S/R
1164 0  8023   00425            DC    SRC+2
1165 0  8008   00426            DC    LDM+8      GENERATE CLOCK PULSE
1166 0  80E1   00427            DC    WMP        RAM2
1167 0  80D0   00428            DC    LDM+0
1168 0  80E1   00429            DC    WMP        RAM2
1169 0  8075   00430            DC    ISZ+5      INCREMENT RAM ADDRESS
116A 0  1160   00431            DC    DWN1
116B 0  8064   00432            DC    INC+4
116C 0  8073   00433            DC    ISZ+3
116D 0  1160   00434            DC    DWN1
116E 0  80D4   00435   DWN2     DC    LDM+4      TURN OFF MEMORY
116F 0  80E1   00436            DC    WMP        RAM2
1170 0  80D0   00437            DC    LDM+0
1171 0  80E1   00438            DC    WMP        RAM2
1172 0  8040   00439            DC    JUN        STAY IN LOOP UNTIL RESET OCCURS
1173 0  116E   00440            DC    DWN2
               00441   *SUBROUTINE HOME                                08 JUNE 1973
               00442   *REGISTERS 0X,CX,EX USED
1174 0  802C   00443   HOME     DC    FIM+/C     SET UP ADDRESS OF OLD
1175 0  0030   00444            DC    /30        NUMBER LOCATON RAM ADDRESS
1176 0  80DC   00445            DC    LDM+/C     COUNT OF 4
1177 0  8080   00446            DC    XCH+0
1178 0  8050   00447            DC    JMS        CLEAR PHOTOCELL S/R
1179 0  1189   00448            DC    CLR        FIRST BANK OF PHOTOCELLS ENABLED
117A 0  802D   00449   BLANK    DC    SRC+/C     WRITE ZEROS IN ALL OLD
117B 0  80E0   00450            DC    WRM        NUMBER LOCATIONS
117C 0  806D   00451            DC    INC+/D
117D 0  8070   00452            DC    ISZ+0      LOCATIONS 30-33
117E 0  117A   00453            DC    BLANK
117F 0  802E   00454            DC    FIM+/E     WRITE ZEROS IN ALL STATUS
1180 0  00C0   00455            DC    /C0        CHARACTERS USED
1181 0  802F   00456            DC    SRC+/E
1182 0  80E4   00457            DC    WR0        (C)
1183 0  80E5   00458            DC    WR1        (C)
1184 0  8020   00459            DC    FIM+0
1185 0  0030   00460            DC    /30
1186 0  8021   00461            DC    SRC+0
1187 0  80E4   00462            DC    WR0        (3)
1188 0  80E5   00463            DC    WR1        (3)
1189 0  80E6   00464            DC    WR2        (3)
118A 0  80E7   00465            DC    WR3        (3)
118B 0  80EA   00466            DC    RDR        ROM3  CHECK EVERY STEP PHOTOCELL
118C 0  80F5   00467            DC    RAL        USING CARRY BIT
118D 0  8012   00468            DC    JCN+CN     IF CARRY IS ONE CONTINUE
118E 0  1198   00469            DC    HOME1      WITH PROGRAM
118F 0  80DF   00470            DC    LDM+/F     IF CARRY IS ZERO INSTRUCT
1190 0  80E4   00471            DC    WR0        (3) MOTOR TO TAKE ONE
1191 0  8050   00472            DC    JMS        HALF STEP
1192 0  11C7   00473            DC    STEP
1193 0  8014   00474            DC    JCN+AZ     IF NO ERROR FLAGGED CONT.
1194 0  1198   00475            DC    HOME1      WITH PROGRAM
1195 0  8050   00476   ERR1     DC    JMS        IF ERROR FLAGGED JUMP TO
1196 0  1133   00477            DC    ERROR      DISPLAY IT
1197 0  80C0   00478            DC    BBL+0
1198 0  80DC   00479   HOME1    DC    LDM+/C     FLAG BANK IN REGISTER D
1199 0  808D   00480            DC    XCH+/D
119A 0  8050   00481   HOME4    DC    JMS        JUMP TO SET ROUTINE
```

```
119B 0  1300          DC  STP8     SET TO PROPER BANK
119C 0  8014          DC  JCN+AZ   IF NO ERROR FLAGGED CONT.
119D 0  11A0          DC  HOME3    WITH PROGRAM
119E 0  8040          DC  JUN      IF NO ERROR FLAGGED, JUMP TO
119F 0  1195          DC  ERR1     DISPLAY IT
11A0 0  8050    HOME3 DC  JMS      CHECK FOR BANK AT ZERO
11A1 0  1353          DC  ZERO8
11A2 0  8050          DC  JMS      CLEAR PHOTOCELL S/R
11A3 0  1189          DC  CLR
11A4 0  8012          DC  JCN+CN   IF BANK IS ZERO CONT. WITH
11A5 0  11AC          DC  HOME2    PROGRAM
11A6 0  8050          DC  JMS      IF BANK IS NOT ZERO STEP
11A7 0  11C7          DC  STEP     TO ZERO
11A8 0  8014          DC  JCN+AZ   IF NO ERROR FLAGGED CONT.
11A9 0  11A0          DC  HOME3    WITH PROGRAM
11AA 0  8040          DC  JUN      IF ERROR FLAGGED, JUMP TO
11AB 0  1195          DC  ERR1     DISPLAY IT
11AC 0  8021    HOME2 DC  SRC+0    CLEAR STATUS CHARACTERS
11AD 0  80E5          DC  WR1      (3)
11AE 0  80E6          DC  WR2      (3)
11AF 0  80E7          DC  WR3      (3)
11B0 0  807D          DC  ISZ+/D   LOOP TO ZERO ALL FOUR
11B1 0  119A          DC  HOME4    BANKS
11B2 0  80EA          DC  RDR      ROM3  CHECK FIFTH POSITION
11B3 0  80F5          DC  RAL      PHOTOCELL
11B4 0  80F5          DC  RAL
11B5 0  80DE          DC  LDM+/E
11B6 0  801A          DC  JCN+CZ   IF CARRY IS ZERO FLAG
11B7 0  1195          DC  ERR1     ERROR
11B8 0  80C0          DC  BBL+0    BRANCH BACK WITH NO ERROR
                *SUBROUTINE CLEAR S/R                      08 JUNE 1973
                *REGISTERS 6X USED
                *RAM 2 S/R OUTPUT
11B9 0  8026    CLR   DC  FIM+6    CLOCK IN TEN ZEROS
11BA 0  0086          DC  /86      PHOTOCELL S/R TO
11BB 0  8027          DC  SRC+6    CLEAR ALL OUTPUTS
11BC 0  80D1    CL1   DC  LDM+1    GENERATE CLOCK PULSE
11BD 0  80E1          DC  WMP      RAM2
11BE 0  80D0          DC  LDM+0
11BF 0  80E1          DC  WMP      RAM2
11C0 0  8077          DC  ISZ+7
11C1 0  11BC          DC  CL1
11C2 0  80D3          DC  LDM+3    CLOCK ONE TO FIRST OUTPUT
11C3 0  80E1          DC  WMP      RAM2   OF PHOTOCELL S/R
11C4 0  80D0          DC  LDM+0
11C5 0  80E1          DC  WMP      RAM2
11C6 0  80C0          DC  BBL+0
                *SUBROUTINE STEP                           08 JUNE 1973
                *REGISTERS 0X,8X,EX USED
11C7 0  8020    STEP  DC  FIM+0    SET UP ADDRESS FOR STEP          *E
11C8 0  00FC          DC  /FC      SEQUENCE
11C9 0  802F          DC  SRC+/E   SELECT MOTOR OUTPUT PORT
11CA 0  8038    STEP6 DC  FIN+8
11CB 0  80EC          DC  RDO      (C) CHECK DIRECTION
11CC 0  801C          DC  JCN+AN   LOAD APPROPRIATE PATTERN
11CD 0  11D1          DC  STEP5    FOR DIRECTION
11CE 0  80A8          DC  LD+8
11CF 0  8040          DC  JUN
11D0 0  11D2          DC  STEP2
11D1 0  80A9    STEP5 DC  LD+9
11D2 0  80E1    STEP2 DC  WMP      RAM3  WRITE PATTERN TO MOTOR
11D3 0  8028          DC  FIM+8    WAIT FOR MOTOR TO RESPOND
11D4 0  0008          DC  /08
11D5 0  8078    STEP3 DC  ISZ+8
11D6 0  11D5          DC  STEP3
                *INSERT TEST FOR SHUTDOWN HERE
11D7 0  8079          DC  ISZ+9
11D8 0  11D5          DC  STEP3
11D9 0  8071          DC  ISZ+1    LOOP TO STEP 4 TIMES
11DA 0  11CA          DC  STEP6
11DB 0  8020          DC  FIM+0
11DC 0  0030          DC  /30      RAM 0
11DD 0  8021          DC  SRC+0
11DE 0  80EA          DC  RDR      ROM3  READ EVERY STEP PHOTOCELL
11DF 0  80F5          DC  RAL
11E0 0  80EC          DC  RDO      (3) CHECK FOR HALF STEP OR
```

```
11E1 0  80F4    00558          DC      CMA       FULL STEP
11E2 0  80E4    00559          DC      WRO       (3)
11E3 0  8014    00560          DC      JCN+AZ
11E4 0  11E8    00561          DC      STEP4
11E5 0  801A    00562          DC      JCN+CZ
11E6 0  11C7    00563          DC      STEP      HALF STEP
11E7 0  80CC    00564    ERR4  DC      BBL+/C    IF MOTOR DID NOT STEP FLAG
11E8 0  801A    00565    STEP4 DC      JCN+CZ    ERROR
11E9 0  11E7    00566          DC      ERR4
11EA 0  80C0    00567          DC      BBL+0
                00568    *** TABLE   ********************
11EB            00569          ORG     /11FC
11FC 0  00C3    00570          DC      /C3
11FD 0  0066    00571          DC      /66       BIT PATTERNS FOR MOTOR STEPS
11FE 0  003C    00572          DC      /3C
11FF 0  0099    00573          DC      /99
                00574    *SUBROUTINE                                 08 JUNE 1973
1200            00575          ORG     /1200
                00576    ***********************************************************
                00577    * ROM *2 **************************************************
                00578    ***********************************************************
                00579    *** SUBROUTINES TO PERFORM KYBD FNCTNS ********************
                00580    *SUBROUTINE NUMERICAL KEYS                  08 JUNE 1973
                00581    *REGISTERS 7,AX,C USED
                00582    *ROUTINE MUST BE PROPERLY LOCATED
                00583    *INITIAL ADDRESS OF FORM XO
1200 0  8000    00584    ZERO  DC      NOP       0
1201 0  8000    00585    ONE   DC      NOP       1
1202 0  8000    00586    TWO   DC      NOP       2
1203 0  8000    00587    THREE DC      NOP       3
1204 0  8000    00588    FOUR  DC      NOP       4
1205 0  8000    00589    FIVE  DC      NOP       5
1206 0  8000    00590    SIX   DC      NOP       6
1207 0  8000    00591    SEVEN DC      NOP       7
1208 0  8000    00592    EIGHT DC      NOP       8
1209 0  802A    00593    NINE  DC      FIM+/A    9  MEMORY LOCATION FOR NEW DIGIT
120A 0  0086    00594          DC      /86
120B 0  8028    00595          DC      SRC+/A
120C 0  80A7    00596          DC      LD+7
120D 0  80E0    00597          DC      WRM       WRITE DIGIT VALUE
120E 0  80EC    00598          DC      RDO       (B)
120F 0  80F6    00599          DC      RAR       CHECK TO SEE IF NUMBER ENTERED
1210 0  8012    00600          DC      JCN+CN    PREVIOUSLY
1211 0  1214    00601          DC      Z16
1212 0  8050    00602          DC      JMS
1213 0  125E    00603          DC      CLDSP
1214 0  802A    00604    Z16   DC      FIM+/A    ADVAN ROUTINE
1215 0  0086    00605          DC      /86       MOVES DIGITS THROUGH DISPLAY
1216 0  8028    00606    AD1   DC      SRC+/A
1217 0  80E9    00607          DC      RDM
1218 0  808C    00608          DC      XCH+/C
1219 0  80E0    00609          DC      WRM
121A 0  8078    00610          DC      ISZ+/8
121B 0  1216    00611          DC      AD1
121C 0  80F0    00612          DC      CLB       SET SUMLOCK TO ZERO
121D 0  80E6    00613          DC      WR2       (B)
121E 0  80C1    00614          DC      BBL+1
                00615    *SUBROUTINE                                 08 JUNE 1973
                00616    *** RETURN FOR ADDITION                ********************
121F 0  80C2    00617    PLS   DC      BBL+2
                00618    *SUBROUTINE DISPLAY REGISTER                08 JUNE 1973
                00619    *REGISTERS 7,AX,CX,EX USED
                00620    *ROUTINE MUST BE PROPERLY LOCATED
                00621    *INITIAL ADDRESS MUST BE OF FORM XO
1220 0  8000    00622          DC      NOP
1221 0  8000    00623    BCNT  DC      NOP       BATCH COUNT
1222 0  8000    00624    BSUM  DC      NOP       BATCH SUM
1223 0  8000    00625    COUNT DC      NOP       PIECE COUNT
1224 0  8000    00626    DESC  DC      NOP       DESCENDING REGISTER
1225 0  8000    00627    ASC   DC      NOP       ASCENDING REGISTER
1226 0  8050    00628    CNTRL DC      JMS       CONTROL SUM
1227 0  125E    00629    ZZZ   DC      CLDSP     CLEAR DISPLAY
1228 0  802A    00630          DC      FIM+/A    CLRRR
1229 0  0077    00631          DC      /77       CLEAR ADD REGISTER
122A 0  8050    00632          DC      JMS
122B 0  1260    00633          DC      CLEER
```

```
122C 0  80A7          DC      LD+7
122D 0  8050          DC      JMS      INITIALIZE REGISTERS
122E 0  106E          DC      FETCH
122F 0  802D          DC      SRC+/C   SELECT WORD FOR LDLMP
1230 0  80AE          DC      LD+/E
1231 0  80E0          DC      WRM
              *LOAD UP DISPLAY AREA
1232 0  802C    TRANS DC      FIM+/C   INITIALIZE DISPLAY ADDRESS
1233 0  00B7          DC      /B7
1234 0  802B    TRANZ DC      SRC+/A   SELECT RAM MEMORY
1235 0  80E9          DC      RDM      READ
1236 0  802D          DC      SRC+/C   DISPLAY
1237 0  80E0          DC      WRM      WRITE
1238 0  806B          DC      INC+/B
1239 0  806D          DC      INC+/D
123A 0  807F          DC      ISZ+/F
123B 0  1234          DC      TRANZ
123C 0  80C0          DC      BBL+0
              *SUBROUTINE CLEAR                               08 JUNE 1973
              *REGISTERS AX,EX USED
123D 0  8050    CLEAR DC      JMS
123E 0  125E          DC      CLDSP
123F 0  80E6          DC      WR2      (B) SET SUNLOCK TO ZERO
1240 0  80EC          DC      RD0      (B) CHECK FOR PREVIOUS CLEAR
1241 0  80F5          DC      RAL      CLEAR IS BIT 8
1242 0  801A          DC      JCN+CZ
1243 0  1248          DC      ZZ3
1244 0  802A    ZZC1  DC      FIM+/A   CLRRR
1245 0  0077          DC      /77      CLEAR ADD REGISTER
1246 0  8050          DC      JMS
1247 0  1260          DC      CLEER
1248 0  802A    ZZ3   DC      FIM+/A   RECALL CONTENTS OF ADDITION REGISTER
1249 0  0077          DC      /77
124A 0  802E          DC      FIM+/E
124B 0  0007          DC      /07
124C 0  8050          DC      JMS
124D 0  1232          DC      TRANS
124E 0  802A          DC      FIM+/A   CLLMP
124F 0  0088          DC      /88      CLEAR LAMP AREA
1250 0  8050          DC      JMS
1251 0  1260          DC      CLEER
1252 0  80EC          DC      RD0      (B) READ BATCH INDICATOR
1253 0  8014          DC      JCN+AZ
1254 0  125D          DC      ZZC2
1255 0  802A          DC      FIM+/A   CLEAR BATCH
1256 0  001A          DC      /1A
1257 0  8050          DC      JMS
1258 0  1260          DC      CLEER
1259 0  802A          DC      FIM+/A   CLEAR BATCH
125A 0  002A          DC      /2A
125B 0  8050          DC      JMS
125C 0  1260          DC      CLEER
125D 0  80C8    ZZC2  DC      BBL+8
125E 0  802A    CLDSP DC      FIM+/A   CLEAR DISPLAY
125F 0  00B7          DC      /B7
1260 0  80D0    CLEER DC      LDM+0
1261 0  802B    Y     DC      SRC+/A
1262 0  80E0          DC      WRM
1263 0  807B          DC      ISZ+/B
1264 0  1261          DC      Y
1265 0  80C0          DC      BBL+0
              *SUBROUTINE SUNLOCK                             08 JUNE 1973
              *REGISTERS AX USED
1266 0  802A    UNLCK DC      FIM+/A   SUNLOCK
1267 0  0080          DC      /80
1268 0  802B          DC      SRC+/A
1269 0  80EC          DC      RD0      (B) CHECK TO SEE IF NUMBER ENTERED
126A 0  80F1          DC      CLC
126B 0  80F5          DC      RAL
126C 0  80F1          DC      CLC
126D 0  80F5          DC      RAL
126E 0  8014          DC      JCN+AZ   BIT 4
126F 0  1296          DC      ZZB1     IF NOT,EXIT WITH ZERO IN ACCUMULATOR
1270 0  80DF          DC      LDM+/F   OTHERWISE, SET SUNLOCK
1271 0  80E6          DC      WR2      (B) EXIT WITH 1 IN ACCUMULATOR
1272 0  80C1          DC      BBL+1
```

```
                    *SUBROUTINE NOT YET IMPLEMENTED                08 JUNE 1973
1273 0  8040        TT2    DC      JUN
1274 0  1450               DC      SUBP
1275 0  8000        KEY1   DC      NOP
1276 0  8000        TT1    DC      NOP
1277 0  8040               DC      JUN
1278 0  1400               DC      ADP
1279 0  8000        KEY2   DC      NOP
127A 0  80C0        KEY3   DC      BBL+0
                    *SUBROUTINE ADDITION AND RECALL                08 JUNE 1973
                    *REGISTERS AX,CX USED
127B 0  802A        PLUS   DC      FIM+/A     DISPLAY ADDRESS
127C 0  0087               DC      /87
127D 0  802C               DC      FIM+/C     ADD REGISTER ADDRESS
127E 0  0077               DC      /77
127F 0  802B               DC      SRC+/A
1280 0  80F1               DC      CLC
1281 0  80EC               DC      RDO        (8) OOK AT STATUS CHARACTER
1282 0  80F6               DC      RAR
1283 0  801A               DC      JCN+CZ     GO TO RECALL IF BIT 1 IS 0
1284 0  1296               DC      ZZ81
1285 0  80F1               DC      CLC
1286 0  802B        Z200   DC      SRC+/A     ADD DISPLAY AND REGISTER
1287 0  80E9               DC      RDM        AND WRITE BACK IN BOTH
1288 0  802D               DC      SRC+/C
1289 0  80EB               DC      ADM
128A 0  80FB               DC      DAA
128B 0  80E0               DC      WRM
128C 0  802B               DC      SRC+/A
128D 0  80E0               DC      WRM
128E 0  606B               DC      INC+/B
128F 0  807D               DC      ISZ+/D
1290 0  1286               DC      Z200
1291 0  801A               DC      JCN+CZ     CHECK FOR OVERFLOW
1292 0  121F               DC      PLS        OVERFLOW EXIT WITH 2
1293 0  80DE               DC      LDM+/E
1294 0  6050               DC      JMS
1295 0  1133               DC      ERROR
1296 0  80C0        ZZ81   DC      BBL+0
                    *SUBROUTINE UPDATE METER REGISTERS             08 JUNE 1973
                    *REGISTERS 8X,F USED
1297 0  80D5        POST   DC      LDM+5      UPDTR  ASCENDING
1298 0  8050               DC      JMS
1299 0  108E               DC      FETCH
129A 0  8050               DC      JMS
129B 0  1129               DC      ADDD
129C 0  80D2               DC      LDM+2      BATCH SUM
129D 0  8050               DC      JMS
129E 0  108E               DC      FETCH
129F 0  8050               DC      JMS
12A0 0  1129               DC      ADDD
12A1 0  80D3               DC      LDM+3      PIECE COUNTER
12A2 0  8050               DC      JMS
12A3 0  108E               DC      FETCH
12A4 0  80FA               DC      STC
12A5 0  8050               DC      JMS
12A6 0  112E               DC      ADDX
12A7 0  80D1               DC      LDM+1      BATCH COUNTER
12A8 0  8050               DC      JMS
12A9 0  108E               DC      FETCH
12AA 0  80FA               DC      STC
12AB 0  8050               DC      JMS
12AC 0  112E               DC      ADDX
12AD 0  80D4               DC      LDM+4      DESCENDING REGISTER
12AE 0  8050               DC      JMS
12AF 0  108E               DC      FETCH
12B0 0  80FA               DC      STC
12B1 0  80F9        RTN00  DC      TCS
12B2 0  8029               DC      SRC+8
12B3 0  80E8               DC      SBM
12B4 0  80F1               DC      CLC
12B5 0  8050               DC      JMS
12B6 0  1122               DC      ADD1X
12B7 0  8079               DC      ISZ+9
12B8 0  12B1               DC      RTN00
12B9 0  80F9        RTN01  DC      TCS
```

```
126A 0  8050         DC     JMS
12BB 0  1123         DC     ADD2
12BC 0  807F         DC     ISZ+/F
12BD 0  12B9         DC     RTN01
12BE 0  8050         DC     JMS
12BF 0  1100         DC     ENBLE
12C0 0  80C0         DC     BBL+0
                *SUBROUTINE TO HANDLE KYBD INPUTS                      08 JUNE 1973
                *REGISTERS 6X USED
12C1 0  801A    FCTN   DC     JCN+CZ
12C2 0  12C4         DC     FCTN1
12C3 0  8037         DC     JIN+6
12C4 0  80C0    FCTN1  DC     BBL+0
                *SUBROUTINE SET                                        08 JUNE 1973
                *REGISTERS AX,CX,EX USED
12C5 0  802A    SET    DC     FIM+/A     SET METER
12C6 0  0089         DC     /89        INITIAL ADDRESS IN DISPLAY  TO
12C7 0  80DE         DC     LDM+/E     CHECK FOR SUNLOCK ETC.
12C8 0  80BC         DC     XCH+/C     INITIALIZE REGISTERS FOR 'CHECK'
12C9 0  8050         DC     JMS        PUTS CARRY BIT ON IF AMOUNT IS
12CA 0  1138         DC     CHECK      GREATER THAN OR EQUAL TO $1.00
12CB 0  80F5         DC     RAL
12CC 0  80BD         DC     XCH+/D     STORE CARRY $10 - $99
12CD 0  80EC         DC     RD0        (B) CHECK TO SEE IF NUMBER FROM KYBD
12CE 0  80F1         DC     CLC        OR FROM PLUS  LOOK AT BITS 1 AND 2
12CF 0  80F5         DC     RAL
12D0 0  80F1         DC     CLC
12D1 0  80F5         DC     RAL
12D2 0  8014         DC     JCN+AZ
12D3 0  12DF         DC     ZZE3
12D4 0  80DB         DC     LDM+/B     INITIALIZE REGISTER
12D5 0  80BC         DC     XCH+/C
12D6 0  8050         DC     JMS        TURNS CARRY BIT ON IF MORE THAN
12D7 0  1138         DC     CHECK      $100.00
12D8 0  80AD         DC     LD+/D      RECOVER PREVIOUS CARRY
12D9 0  801A         DC     JCN+CZ     CHECK FOR MORE THAN $100
12DA 0  12E9         DC     ZZE1
12DB 0  80DE         DC     LDM+/E     ERROR MESSAGE IF GREATER THAN OR
12DC 0  8050         DC     JMS        EQUAL TO 100.00
12DD 0  1133         DC     ERROR
12DE 0  80C0         DC     BBL+0
12DF 0  8050    ZZE3   DC     JMS        CLEAR DISPLAY
12E0 0  125E         DC     CLDSP
12E1 0  802A         DC     FIM+/A     METER SETTING REGISTER ADDRESS
12E2 0  003C         DC     /3C
12E3 0  802E         DC     FIM+/E     INITIALIZING COUNTER
12E4 0  000C         DC     /0C
12E5 0  8050         DC     JMS        TRANSFER METER SETTING REGISTER TO
12E6 0  1232         DC     TRANS      DISPLAY
12E7 0  8040         DC     JUN
12E8 0  12F0         DC     ZZE5
12E9 0  8014    ZZE1   DC     JCN+AZ     CHECK FOR MORE THAN $10
12EA 0  12EE         DC     ZZE4
12EB 0  80EE         DC     RD2        (B) SUNLOCK
12EC 0  8014         DC     JCN+AZ
12ED 0  12F7         DC     ZZE2
12EE 0  8040    ZZE4   DC     JUN
12EF 0  137E         DC     SETX
12F0 0  8050    ZZE5   DC     JMS
12F1 0  1100         DC     ENBLE
12F2 0  802A         DC     FIM+/A     CLEAR ADD REGISTER
12F3 0  0077         DC     /77
12F4 0  8050         DC     JMS
12F5 0  1260         DC     CLEER
12F6 0  80C0         DC     BBL+0
12F7 0  80D4    ZZE2   DC     LDM+4      SET UP ERROR LIGHT
12F8 0  802A         DC     FIM+/A     SUNLOCK WARNING LAMP
12F9 0  008C         DC     /8C
12FA 0  802B         DC     SRC+/A
12FB 0  80E0         DC     WRM
12FC 0  80C1         DC     BBL+1
                *SUBROUTINE                                            08 JUNE 1973
12FD                  ORG    /1300
                *SUBROUTINE SET TO PROPER BANK                         08 JUNE 1973
                *REGISTERS 0X,6X,AX,D,EX USED
1300 0  80DF    STPB   DC     LDM+/F     CHECK REGISTER D TO SEE
```

```
1301 0  80F1  00862         DC  CLC      WHICH BANK IS SET
1302 0  8090  00863         DC  SUB+/D
1303 0  8014  00864         DC  JCN+AZ
1304 0  1318  00865         DC  CNTR1
1305 0  80F8  00866         DC  DAC
1306 0  8014  00867         DC  JCN+AZ
1307 0  1329  00868         DC  CNTR2
1308 0  80F8  00869         DC  DAC
1309 0  8014  00870         DC  JCN+AZ
130A 0  1339  00871         DC  CNTR3
130B 0  8050  00872         DC  JMS      SET TO BANK 4
130C 0  1377  00873         DC  CLK6     ENERGIZE BOTH SOLENOIDS
130D 0  8050  00874         DC  JMS
130E 0  1377  00875         DC  CLK6
130F 0  8050  00876         DC  JMS      WAIT FOR SOLENOIDS TO
1310 0  134A  00877         DC  WAIT     RESPOND
1311 0  80EA  00878         DC  RDR      ROM3  CHECK FOR CORRECT POSITION
1312 0  80F6  00879         DC  RAR      OF SOLENOIDS
1313 0  801A  00880         DC  JCN+CZ
1314 0  1349  00881         DC  ERR5
1315 0  80F6  00882         DC  RAR
1316 0  801A  00883         DC  JCN+CZ
1317 0  1349  00884         DC  ERR5
1318 0  80D1  00885         DC  LDM+1    FLAG BANK 4 IN STATUS
1319 0  80E5  00886         DC  WR1      (3)  CHARACTER
131A 0  80C0  00887         DC  BBL+0
131B 0  8050  00888  CNTR1  DC  JMS      SET TO BANK 1
131C 0  1374  00889         DC  CLK4
131D 0  8050  00890         DC  JMS
131E 0  1374  00891         DC  CLK4
131F 0  8050  00892         DC  JMS      WAIT FOR SOLENOIDS TO
1320 0  134A  00893         DC  WAIT     RESPOND
1321 0  80EA  00894         DC  RDR      ROM3  CHECK FOR CORRECT POSITION
1322 0  80F6  00895         DC  RAR      OF SOLENOIDS
1323 0  8012  00896         DC  JCN+CN
1324 0  1349  00897         DC  ERR5
1325 0  80F6  00898         DC  RAR
1326 0  8012  00899         DC  JCN+CN
1327 0  1349  00900         DC  ERR5
1328 0  80C0  00901         DC  BBL+0
1329 0  8050  00902  CNTR2  DC  JMS      SET TO BANK 2
132A 0  1374  00903         DC  CLK4
132B 0  8050  00904         DC  JMS
132C 0  1377  00905         DC  CLK6
132D 0  8050  00906         DC  JMS      WAIT FOR SOLENOIDS TO
132E 0  134A  00907         DC  WAIT     RESPOND
132F 0  80EA  00908         DC  RDR      ROM3  CHECK FOR CORRECT POSITION
1330 0  80F6  00909         DC  RAR      OF SOLENOIDS
1331 0  801A  00910         DC  JCN+CZ
1332 0  1349  00911         DC  ERR5
1333 0  80F6  00912         DC  RAR
1334 0  8012  00913         DC  JCN+CN
1335 0  1349  00914         DC  ERR5
1336 0  80D1  00915         DC  LDM+1    FLAG BANK 2 IN STATUS
1337 0  80E7  00916         DC  WR3      (3)  CHARACTER
1338 0  80C0  00917         DC  BBL+0
1339 0  8050  00918  CNTR3  DC  JMS      SET TO BANK 3
133A 0  1377  00919         DC  CLK6
133B 0  8050  00920         DC  JMS
133C 0  1374  00921         DC  CLK4
133D 0  8050  00922         DC  JMS      WAIT FOR SOLENOIDS TO
133E 0  134A  00923         DC  WAIT     RESPOND
133F 0  80EA  00924         DC  RDR      ROM3  CHECK FOR CORRECT POSITION
1340 0  80F6  00925         DC  RAR      OF SOLENOIDS
1341 0  8012  00926         DC  JCN+CN
1342 0  1349  00927         DC  ERR5
1343 0  80F6  00928         DC  RAR
1344 0  801A  00929         DC  JCN+CZ
1345 0  1349  00930         DC  ERR5
1346 0  80D1  00931         DC  LDM+1    FLAG BANK 3 IN STATUS
1347 0  80E6  00932         DC  WR2      (3)  CHARACTER
1348 0  80C0  00933         DC  BBL+0
1349 0  80C8  00934  ERR5   DC  BBL+/8   FLAG SOLENOID ERROR
134A 0  80D6  00935  WAIT   DC  LDM+6    50 MSEC WAIT FOR SOLENOIDS
134B 0  8077  00936  WAIT1  DC  ISZ+7    TO RESPOND
134C 0  134B  00937         DC  WAIT1
```

```
1340 0  8071   00938         DC     ISZ+1
134E 0  134B   00939         DC     WAIT1
134F 0  80F2   00940         DC     IAC
1350 0  801C   00941         DC     JCN+AN
1351 0  134B   00942         DC     WAIT1
1352 0  80C0   00943         DC     BBL+0
1353 0  80D1   00944  ZEROB  DC     LDM+1     CLOCK ONE TO SECOND OUTPUT
1354 0  8027   00945         DC     SRC+6     OF PHOTOCELL S/R
1355 0  80E1   00946         DC     WMP       RAM2
1356 0  80D0   00947         DC     LDM+0
1357 0  80E1   00948         DC     WMP       RAM2
1358 0  8077   00949  WFPC2  DC     ISZ+7     WAIT FOR PHOTOCELL TO
1359 0  1358   C0950         DC     WFPC2     RESPOND
135A 0  8077   00951  WFPC3  DC     ISZ+7
135B 0  135A   00952         DC     WFPC3
135C 0  8021   00953         DC     SRC+0     CHECK FOR BANK 4 FLAG
135D 0  80ED   00954         DC     RD1       (3)
135E 0  8014   00955         DC     JCN+AZ
135F 0  1363   00956         DC     Z1
1360 0  80EA   00957         DC     RDR       ROM3  LOAD BANK 4 PHOTOCELL TO
1361 0  80F6   00958         DC     RAR       CARRY
1362 0  80C0   00959         DC     BBL+0
1363 0  80EE   00960  Z1     DC     RD2       (3)  CHECK FOR BANK 3 FLAG
1364 0  8014   00961         DC     JCN+AZ
1365 0  136A   00962         DC     Z2
1366 0  80EA   00963         DC     RDR       ROM3  LOAD BANK 3 PHOTOCELL TO
1367 0  80F6   00964         DC     RAR       CARRY
1368 0  80F6   00965         DC     RAR
1369 0  80C0   00966         DC     BBL+0
136A 0  80EF   00967  Z2     DC     RD3       (3)
136B 0  8014   00968         DC     JCN+AZ    CHECK FOR BANK 2 FLAG
136C 0  1371   00969         DC     Z3
136D 0  80EA   00970         DC     RDR       ROM3  LOAD BANK 2 PHOTOCELL TO
136E 0  80F5   00971         DC     RAL       CARRY
136F 0  80F5   00972         DC     RAL
1370 0  80C0   00973         DC     BBL+0
1371 0  80EA   00974  Z3     DC     RDR       ROM3  LOAD BANK 1 PHOTOCELL TO
1372 0  80F5   00975         DC     RAL       CARRY
1373 0  80C0   00976         DC     BBL+0
1374 0  80D4   00977  CLK4   DC     LDM+4     CLOCK ZERO TO SOLENOID S/R
1375 0  8040   00978         DC     JUN
1376 0  1378   00979         DC     CLK2
1377 0  80D6   00980  CLK6   DC     LDM+6     CLOCK ONE TO SOLENOID S/R
1378 0  8027   00981  CLK2   DC     SRC+6
1379 0  80E1   00982         DC     WMP       RAM2
137A 0  80D0   00983         DC     LDM+0
137B 0  80E1   00984         DC     WMP       RAM2
137C 0  8021   00985         DC     SRC+0
137D 0  80C0   00986         DC     BBL+0
137E 0  802A   00987  SETX   DC     FIM+/A    DISPLAY ADDRESS
137F 0  00B7   00988         DC     /B7
1380 0  802E   00989         DC     FIM+/E    METER SETTING AREA
1381 0  003C   00990         DC     /3C
1382 0  802B   00991  SET1   DC     SRC+/A
1383 0  80E9   00992         DC     RDM       READ DISPLAY
1384 0  802F   00993         DC     SRC+/E
1385 0  80E0   00994         DC     WRM       PUT IN MSA
1386 0  806B   00995         DC     INC+/B    INCREMENT ADDRESSES AND COUNTER
1387 0  807F   00996         DC     ISZ+/F
1388 0  1382   00997         DC     SET1
               00998  *SUBROUTINE MAIN                          08 JUNE 1973
               00999  *REGISTERS 0X,6X,AX,CX,EX USED
1389 0  802E   01000  MAIN   DC     FIM+/E
138A 0  00C0   01001         DC     /C0       SELECT OUTPUT PORT FOR MOTOR
138B 0  8026   01002         DC     FIM+6     SELECT OUTPUT PORT FOR
138C 0  0080   01003         DC     /80       SHIFT REGISTERS
138D 0  8020   01004         DC     FIM+0     SELECT INPUT PORT FOR
138E 0  0030   01005         DC     /30       PHOTOCELLS
138F 0  802A   01006         DC     FIM+/A    SELECT ADDRESS FOR OLD
1390 0  003F   01007         DC     /3F       AND NEW NUMBER
1391 0  802C   01008         DC     FIM+/C
1392 0  003C   01009         DC     /3C
1393 0  80BD   01010  MAINB  DC     XCH+/D
1394 0  80F4   01011         DC     CMA
1395 0  80BD   01012         DC     XCH+/D
1396 0  802D   01013         DC     SRC+/C    COMPARE NEW NUMBER WITH
```

```
1397 0  80E9  01014          DC  RDM      OLD
1398 0  8028  01015          DC  SRC+/A
1399 0  80F1  01016          DC  CLC
139A 0  80E8  01017          DC  SBM
139B 0  801A  01018          DC  JCN+CZ   LOAD NUMBER OF STEPS TO
139C 0  13A5  01019          DC  MAIN3    REGISTER F AND
139D 0  8014  01020          DC  JCN+AZ   FLAG DIRECTION IN
139E 0  13EC  01021          DC  MAIN6    STATUS CHARACTER
139F 0  80F4  01022          DC  CMA
13A0 0  80F2  01023          DC  IAC
13A1 0  808F  01024          DC  XCH+/F
13A2 0  80D0  01025          DC  LDM+0
13A3 0  8040  01026          DC  JUN
13A4 0  13A7  01027          DC  MAIN4
13A5 0  808F  01028  MAIN3   DC  XCH+/F
13A6 0  80DF  01029          DC  LDM+/F
13A7 0  802F  01030  MAIN4   DC  SRC+/E
13A8 0  80E4  01031          DC  WR0      (C)
13A9 0  8028  01032          DC  SRC+/A   WRITE NEW NUMBER IN OLD
13AA 0  80E9  01033          DC  RDM      LOCATION
13AB 0  802D  01034          DC  SRC+/C
13AC 0  80E0  01035          DC  WRM
13AD 0  808D  01036          DC  XCH+/D
13AE 0  80F4  01037          DC  CMA
13AF 0  808D  01038          DC  XCH+/D
13B0 0  8050  01039          DC  JMS      SET TO PROPER BANK
13B1 0  1300  01040          DC  STPB
13B2 0  808D  01041          DC  XCH+/D
13B3 0  80F4  01042          DC  CMA
13B4 0  808D  01043          DC  XCH+/D
13B5 0  8014  01044          DC  JCN+AZ   IF NO ERROR FLAGGED CONT
13B6 0  13BB  01045          DC  MAIN2    WITH PROGRAM
13B7 0  8040  01046  ERR6    DC  JUN      IF ERROR FLAGGED JUMP TO
13B8 0  1133  01047          DC  ERROR    DISPLAY IT
13B9 0  8000  01048          DC  NOP
13BA 0  8000  01049          DC  NOP
13BB 0  8050  01050  MAIN2   DC  JMS      STEP MOTOR TO NEW NUMBER
13BC 0  11C7  01051          DC  STEP
13BD 0  801C  01052          DC  JCN+AN   IF ERROR FLAGGED JUMP TP
13BE 0  13B7  01053          DC  ERR6     DISPLAY IT
13BF 0  802F  01054          DC  SRC+/E   CHECK DIRECTION AND KEEP
13C0 0  80EC  01055          DC  RD0      (C) TRACK AND CHECK FIRST
13C1 0  8014  01056          DC  JCN+AZ   POSITION PHOTOCELL
13C2 0  13D5  01057          DC  POS56    ACCORDINGLY
13C3 0  80ED  01058          DC  RD1      (C) ROTATE LEFT THROUGH CARRY
13C4 0  80F1  01059          DC  CLC
13C5 0  801C  01060          DC  JCN+AN
13C6 0  13C8  01061          DC  POS55
13C7 0  80FA  01062          DC  STC
13C8 0  80F5  01063  POS55   DC  RAL
13C9 0  801C  01064          DC  JCN+AN
13CA 0  13DD  01065          DC  POS53
13CB 0  8021  01066  POS51   DC  SRC+0
13CC 0  80EA  01067          DC  RDR      ROM3
13CD 0  80F5  01068          DC  RAL
13CE 0  80F5  01069          DC  RAL
13CF 0  80DE  01070          DC  LDM+/E
13D0 0  801A  01071          DC  JCN+CZ   IF ERROR FLAGGED JUMP TO
13D1 0  13B7  01072          DC  ERR6     DISPLAY IT
13D2 0  80F0  01073          DC  CLB
13D3 0  8040  01074          DC  JUN
13D4 0  13DD  01075          DC  POS53
13D5 0  80ED  01076  POS56   DC  RD1      (C) READ 5TH PHOTOCELL
13D6 0  80F1  01077          DC  CLC       ROTATE RIGHT THROUGH CARRY
13D7 0  801C  01078          DC  JCN+AN
13D8 0  13DA  01079          DC  POS58
13D9 0  80FA  01080          DC  STC
13DA 0  80F6  01081  POS58   DC  RAR
13DB 0  8014  01082          DC  JCN+AZ
13DC 0  13CB  01083          DC  POS51
13DD 0  802F  01084  POS53   DC  SRC+/E
13DE 0  80E5  01085          DC  WR1      (C)
13CF 0  807F  01086          DC  ISZ+/F   COUNT TO NEW NUMBER
13E0 0  13BB  01087          DC  MAIN2
13E1 0  802D  01088          DC  SRC+/C   IF NEW NUMBER IS ZERO
13E2 0  80E9  01089          DC  RDM      CHECK THAT BANK IS
```

```
13E3 0   801C   01090          DC      JCN+AN    AT ZERO
13E4 0   13EC   01091          DC      MAIN6
13E5 0   8050   01092          DC      JMS
13E6 0   1353   01093          DC      ZEROB
13E7 0   80DD   01094          DC      LDM+/D
13E8 0   801A   01095          DC      JCN+CZ    IF ERROR FLAGGED JUMP TO
13E9 0   13B7   01096          DC      ERR6      DISPLAY IT
13EA 0   8050   01097          DC      JMS       CLEAR PHOTOCELL S/R
13EB 0   1189   01098          DC      CLR
13EC 0   80D0   01099   MAIN6  DC      LDM+0     CLEAR FLAGS FROM STATUS
13ED 0   8021   01100          DC      SRC+0     CHARACTERS
13EE 0   80E5   01101          DC      WR1       (3)
13EF 0   80E6   01102          DC      WR2       (3)
13F0 0   80E7   01103          DC      WR3       (3)
13F1 0   80BB   01104          DC      XCH+/B
13F2 0   80F8   01105          DC      DAC       DECREMENT MEMORY ADDRESS
13F3 0   80BB   01106          DC      XCH+/B
13F4 0   80BD   01107          DC      XCH+/D
13F5 0   80F4   01108          DC      CMA
13F6 0   80BD   01109          DC      XCH+/D
13F7 0   807D   01110          DC      ISZ+/D    COUNT FOR 4 BANKS
13F8 0   1393   01111          DC      MAIN8
13F9 0   8050   01112          DC      JMS       ALWAYS LEAVE METER AT
13FA 0   1318   01113          DC      CNTR1     BANK1
13FB 0   801C   01114          DC      JCN+AN    IF ERROR FLAGGED, JUMP TO
13FC 0   13B7   01115          DC      ERR6      DISPLAY IT
13FD 0   8040   01116          DC      JUN
13FE 0   12F0   01117          DC      ZZE5
                01118   *SUBROUTINE                                  08 JUNE 1973
13FF            01119          ORG     /1400
                01120   *SUBROUTINE ADP                                30 JAN 74
                01121   *ROUTINE TO ADD POSTAGE TO METER (BOTH DESCENDING REGISTER
                01122   *AND CONTROL SUM)
1400 0   802C   01123   ADP    DC      FIM+/C
1401 0   00B7   01124          DC      /B7
1402 0   802D   01125          DC      SRC+/C
1403 0   80EC   01126          DC      RD0       (B)  READ STATUS CHARACTER
1404 0   80F6   01127          DC      RAR       CHECK FOR XXX1
1405 0   801A   01128          DC      JCN+CZ
1406 0   143B   01129          DC      ERRR
1407 0   802E   01130          DC      FIM+/E
1408 0   0000   01131          DC      /00
1409 0   806F   01132   RTN1   DC      INC+/F    DETERMINE NUMBER OF CHARACTERS
140A 0   802D   01133          DC      SRC+/C    IN DISPLAY
140B 0   80E9   01134          DC      RDM
140C 0   8014   01135          DC      JCN+AZ
140D 0   1410   01136          DC      END
140E 0   80AF   01137          DC      LD+/F
140F 0   80BE   01138          DC      XCH+/E    AT END, CONTAINS NUMBER OF CHARACTER
1410 0   807D   01139   END    DC      ISZ+/D    IN DISPLAY
1411 0   1409   01140          DC      RTN1
1412 0   80F1   01141          DC      CLC
1413 0   80D6   01142          DC      LDM+6
1414 0   809E   01143          DC      SUB+/E    GO TO ERROR IF TOO MANY
1415 0   801A   01144          DC      JCN+CZ
1416 0   143B   01145          DC      ERRR
1417 0   802A   01146          DC      FIM+/A    DESCENDING REGISTER
1418 0   0000   01147          DC      /00
1419 0   802C   01148          DC      FIM+/C    DISPLAY
141A 0   00B7   01149          DC      /B7
141B 0   802E   01150          DC      FIM+/E
141C 0   00AA   01151          DC      /AA
141D 0   80F1   01152          DC      CLC
141E 0   802D   01153   RTN2   DC      SRC+/C    ADD TO DESCENDING REGISTER
141F 0   80E9   01154          DC      RDM
1420 0   802B   01155          DC      SRC+/A
1421 0   80EB   01156          DC      ADM
1422 0   80FB   01157          DC      DAA
1423 0   80E0   01158          DC      WRM
1424 0   806B   01159          DC      INC+/B
1425 0   806D   01160          DC      INC+/D
1426 0   807E   01161          DC      ISZ+/E
1427 0   141E   01162          DC      RTN2
1428 0   801A   01163          DC      JCN+CZ
1429 0   1441   01164          DC      END1
142A 0   802A   01165          DC      FIM+/A    UNDO ADDITION IF OVERFLOW
```

```
142B 0  0000          DC    /00
142C 0  802C          DC    FIM+/C
142D 0  00B7          DC    /B7
142E 0  80FA          DC    STC
142F 0  80F9   RTN3   DC    TCS
1430 0  802D          DC    SRC+/C
1431 0  80E8          DC    SBM
1432 0  80F1          DC    CLC
1433 0  802B          DC    SRC+/A
1434 0  80EB          DC    ADM
1435 0  80FB          DC    DAA
1436 0  80E0          DC    WRM
1437 0  806B          DC    INC+/B
1438 0  806D          DC    INC+/D
1439 0  807F          DC    ISZ+/F
143A 0  142F          DC    RTN3
143B 0  802C   ERRR   DC    FIM+/C     ERROR ROUTINE, LOADS MESSAGE INTO
143C 0  00BF          DC    /BF        DISPLAY
143D 0  802D          DC    SRC+/C
143E 0  80DE          DC    LDM+/E
143F 0  80E0          DC    WRM
1440 0  80C0          DC    BBL+0
1441 0  802A   END1   DC    FIM+/A     ADD CONTENTS OF DISPLAY TO CONTROL
1442 0  00B7          DC    /B7        SUM
1443 0  802C          DC    FIM+/C
1444 0  0020          DC    /20
1445 0  80F1          DC    CLC
1446 0  802B   RTN4   DC    SRC+/A
1447 0  80E9          DC    RDM
1448 0  802D          DC    SRC+/C
1449 0  80EB          DC    ADM
144A 0  80FB          DC    DAA
144B 0  80E0          DC    WRM
144C 0  806D          DC    INC+/D
144D 0  807B          DC    ISZ+/B
144E 0  1446          DC    RTN4
144F 0  80C0          DC    BBL+0
               *SUBROUTINE SUBP                          30 JAN 74
               *ROUTINE TO SUBTRACT POSTAGE FROM METER (DESCENDING REGISTER
               *AND CONTROL SUM OPERATED UPON)
1450 0  802C   SUBP   DC    FIM+/C
1451 0  00B7          DC    /B7
1452 0  802D          DC    SRC+/C
1453 0  80EC          DC    RDO        (B) READ STATUS CHARACTER  CHECK
1454 0  80F6          DC    RAR        FOR XXX1
1455 0  801A          DC    JCN+CZ
1456 0  143B          DC    ERRR
1457 0  802E          DC    FIM+/E
1458 0  0000          DC    /00
1459 0  806F   RTN11  DC    INC+/F     DETERMINE NUMBER OF CHARACTERS IN
145A 0  802D          DC    SRC+/C     DISPLAY
145B 0  80E9          DC    RDM
145C 0  8014          DC    JCN+AZ
145D 0  1460          DC    END11
145E 0  80AF          DC    LD+/F
145F 0  80BE          DC    XCH+/E
1460 0  807D   END11  DC    ISZ+/D
1461 0  1459          DC    RTN11
1462 0  80F1          DC    CLC
1463 0  80D6          DC    LDM+6
1464 0  809E          DC    SUB+/E
1465 0  801A          DC    JCN+CZ     GO TO ERROR ROUTINE IF NUMBER TOO
1466 0  143B          DC    ERRR       LARGE
1467 0  802A          DC    FIM+/A     INITIALIZE REGISTERS
1468 0  0000          DC    /00
1469 0  802C          DC    FIM+/C
146A 0  00B7          DC    /B7
146B 0  802E          DC    FIM+/E
146C 0  00AA          DC    /AA
146D 0  80FA          DC    STC
146E 0  80F9   RTN33  DC    TCS        SUBTRACT DISPLAY FROM DESCENDING
146F 0  802D          DC    SRC+/C     REGISTER
1470 0  80E8          DC    SBM
1471 0  80F1          DC    CLC
1472 0  802B          DC    SRC+/A
1473 0  80EB          DC    ADM
```

```
1474 0  80FB   01242              DC     DAA
1475 0  80E0   01243              DC     WRM
1476 0  806B   01244              DC     INC+/B
1477 0  806D   01245              DC     INC+/D
1478 0  807F   01246              DC     ISZ+/F
1479 0  146E   01247              DC     RTN33
147A 0  8012   01248              DC     JCN+CN    CHECK TO SEE IF BORROW OCCURRED
147B 0  1480   01249              DC     END12
147C 0  802A   01250              DC     FIM+/A    IF BORROW OCCURRED, ADD DISPLAY
147D 0  0000   01251              DC     /00       CONTENTS BACK TO DESCENDING
147E 0  802C   01252              DC     FIM+/C    REGISTER
147F 0  00B7   01253              DC     /B7
1480 0  80F1   01254              DC     CLC
1481 0  802D   01255        RTN22 DC     SRC+/C
1482 0  80E9   01256              DC     RDM
1483 0  802B   01257              DC     SRC+/A
1484 0  80EB   01258              DC     ADM
1485 0  80FB   01259              DC     DAA
1486 0  80E0   01260              DC     WRM
1487 0  806B   01261              DC     INC+/B
1488 0  806D   01262              DC     INC+/D
1489 0  807E   01263              DC     ISZ+/E
148A 0  1481   01264              DC     RTN22
148B 0  8040   01265              DC     JUN
148C 0  143B   01266              DC     ERRR
148D 0  802A   01267        END12 DC     FIM+/A    SUBTRACT DISPLAY CONTENTS FROM
148E 0  00B7   01268              DC     /B7       CONTROL SUM
148F 0  802C   01269              DC     FIM+/C
1490 0  0020   01270              DC     /20
1491 0  80FA   01271              DC     STC
1492 0  80F9   01272        RTN44 DC     TCS
1493 0  802B   01273              DC     SRC+/A
1494 0  80E8   01274              DC     SBM
1495 0  80F1   01275              DC     CLC
1496 0  802D   01276              DC     SRC+/C
1497 0  80EB   01277              DC     ADM
1498 0  80FB   01278              DC     DAA
1499 0  80E0   01279              DC     WRM
149A 0  806D   01280              DC     INC+/D
149B 0  807B   01281              DC     ISZ+/B
149C 0  1492   01282              DC     RTN44
149D 0  80C0   01283              DC     BBL+0
               01284        *SUBROUTINE CLOCK PULSE                         08 JUNE 1973
               01285        *REGISTER AX  SPECIFIES PORT ADDRESS
149E 0  802B   01286        CP    DC     SRC+/A
149F 0  80E1   01287              DC     WMP       RAMO  WRITE SET-UP WORD
14A0 0  80D0   01288              DC     LDM+0     CLEAR ACCUMULATOR
14A1 0  80E1   01289              DC     WMP       RAMO  END CP
14A2 0  80C0   01290              DC     BBL+0
               01291        *SUBROUTINE CHCK
14A3 0  80DA   01292        CHCK  DC     LDM+/A
14A4 0  80B0   01293              DC     XCH+0     INITIALIZE LOOP COUNTER
14A5 0  8028   01294              DC     FIM+8     DESC ADDRESS
14A6 0  0000   01295              DC     /00
14A7 0  802C   01296              DC     FIM+/C    ASC ADDRESS
14A8 0  0006   01297              DC     /06
14A9 0  802E   01298              DC     FIM+/E    CNTRL ADDRESS
14AA 0  0020   01299              DC     /20
14AB 0  80F1   01300              DC     CLC
14AC 0  8029   01301        CHCK1 DC     SRC+8     READ DESCENDING REGISTER
14AD 0  80E9   01302              DC     RDM
14AE 0  802D   01303              DC     SRC+/C
14AF 0  80EB   01304              DC     ADM       ADD ASCENDING REGISTER
14B0 0  80FB   01305              DC     DAA
14B1 0  80F5   01306              DC     RAL
14B2 0  80BB   01307              DC     XCH+/B    STORE CARRY
14B3 0  80AB   01308              DC     LD+/B
14B4 0  80F6   01309              DC     RAR       RESTORE WORD
14B5 0  80FA   01310              DC     STC
14B6 0  80F4   01311              DC     CMA
14B7 0  802F   01312              DC     SRC+/E
14B8 0  80EB   01313              DC     ADM       COMPARE CNTRL
14B9 0  801C   01314              DC     JCN+AN
14BA 0  14D6   01315              DC     CHCK9     GO TO ERROR MESSAGE
14BB 0  80AB   01316              DC     LD+/B
14BC 0  80F6   01317              DC     RAR       RESTORE CARRY
```

```
14BD 0   8069     01318            DC       INC+9
14BE 0   806D     01319            DC       INC+/D
14BF 0   806F     01320            DC       INC+/F
14C0 0   8070     01321            DC       ISZ+0
14C1 0   14AC     01322            DC       CHCK1
14C2 0   80D0     01323     CHCK2  DC       LDM+0     PROPAGATE CARRY THROUGH SUM
14C3 0   802D     01324            DC       SRC+/C    ADD CARRY
14C4 0   80EB     01325            DC       ADM
14C5 0   80FB     01326            DC       DAA
14C6 0   80F5     01327            DC       RAL
14C7 0   808B     01328            DC       XCH+/B    STORE CARRY
14C8 0   80AB     01329            DC       LD+/B
14C9 0   80F6     01330            DC       RAR       RESTORE WORD
14CA 0   80FA     01331            DC       STC
14CB 0   80F4     01332            DC       CMA
14CC 0   802F     01333            DC       SRC+/E
14CD 0   80EB     01334            DC       ADM       COMPARE CNTRL
14CE 0   801C     01335            DC       JCN+AN
14CF 0   14D6     01336            DC       CHCK9     GO TO ERROR MESSAGE
14D0 0   80AB     01337            DC       LD+/B
14D1 0   80F6     01338            DC       RAR       RESTORE CARRY
14D2 0   806F     01339            DC       INC+/F
14D3 0   807D     01340            DC       ISZ+/D
14D4 0   14C2     01341            DC       CHCK2
14D5 0   80C0     01342            DC       BBL+0
14D6 0   8028     01343     CHCK9  DC       FIM+8
14D7 0   008C     01344            DC       /8C
14D8 0   802A     01345            DC       FIM+/A
14D9 0   008B     01346            DC       /8B
14DA 0   8050     01347            DC       JMS
14DB 0   1260     01348            DC       CLEER
14DC 0   8029     01349            DC       SRC+8
14DD 0   80D8     01350            DC       LDM+8
14DE 0   80E0     01351            DC       WRM
14DF 0   80C0     01352            DC       BBL+0
                  01353            END -
03C0 0   1000     01354     START  NOP
                  01355            WUISK
03C8     03C0     01356            END      START
```

```
PAGE  38    11/21/74 CROSS-REFERENCE

SYMBOL      VALUE  REL  DEFN     REFERENCES

ADD         8080   0    00003    00078,R 00134,R
ADDD        1129   0    00355    00755,R 00760,R
ADDX        112E   0    00360    00363,R 00766,R 00772,R
ADDY        112A   0    00356    00359,R
ADD1        1120   0    00346    00357,R
ADD1X       1122   0    00348    00782,R
ADD2        1123   0    00349    00361,R 00787,R
ADM         80E8   0    00003    00170,R 00193,R 00202,R 00350,R 00735,R 01156,R 01175,R 01196,R 01241,R 01258,R 01277,R
                                 01304,R 01313,R 01325,R 01334,R
ADP         1400   0    01123    00716,R
ADI         1216   0    00606    00611,R
AN          000C   0    00003    00091,R 00100,R 00110,R 00130,R 00536,R 00941,R 01052,R 01060,R 01064,R 01078,R 01090,R
                                 01114,R 01314,R 01335,R
ASC         1225   0    00627    00263,R
AZ          0004   0    00003    00050,R 00083,R 00095,R 00205,R 00213,R 00330,R 00474,R 00483,R 00495,R 00560,R 00676,R
                                 00705,R 00814,R 00837,R 00840,R 00864,R 00867,R 00870,R 00955,R 00961,R 00968,R 01020,R
                                 01044,R 01056,R 01082,R 01135,R 01218,R
BEL         90C0   0    00003    00215,R 00218,R 00236,R 00295,R 00319,R 00331,R 00343,R 00354,R 00364,R 00371,R 00386,R
                                 00412,R 00478,R 00511,R 00528,R 00564,R 00567,R 00614,R 00617,R 00651,R 00686,R 00694,R
                                 00709,R 00718,R 00748,R 00792,R 00798,R 00826,R 00850,R 00856,R 00887,R 00901,R 00917,R
                                 00933,R 00934,R 00943,R 00959,R 00966,R 00973,R 00976,R 00986,R 01187,R 01202,R 01283,R
                                 01290,R 01342,R 01352,R
BCNT        1221   0    00623    00278,R
BLANK       117A   0    00449    00453,R
BSUM        1222   0    00624    00259,R
CHCK        1443   0    01292    00034,R 00173,R
CHCK1       14AC   0    01301    01322,R
CHCK2       14C2   0    01323    01341,R
CHCK9       14D6   0    01343    01315,R 01336,R
CHECK       1138   0    00377    00806,R 00819,R
CIRC        1062   0    00116    00117,R 00121,R
CK1         1139   0    00378    00385,R
CK2         113E   0    00383    00381,R
CLH         80F0   0    00003    00612,R 01073,R
CLC         80F1   0    00003    00068,R 00076,R 00089,R 00098,R 00108,R 00127,R 00132,R 00145,R 00147,R 00169,R 00191,R
                                 00355,R 00377,R 00701,R 00703,R 00726,R 00731,R 00780,R 00810,R 00812,R 00862,R 01016,R
                                 01059,R 01077,R 01141,R 01152,R 01173,R 01192,R 01224,R 01239,R 01254,R 01275,R 01300,R
CLDSP       125E   0    00687    00603,R 00629,R 00655,R 00828,R
CLEAR       1230   0    00654    00297,R
CLEER       1260   0    00689    00019,R 00155,R 00633,R 00664,R 00674,R 00681,R 00685,R 00849,R 01348,R
CLK2        1378   0    00981    00979,R
CLK4        1374   0    00977    00889,R 00891,R 00903,R 00921,R
CLK6        1377   0    00980    00873,R 00875,R 00905,R 00919,R
```

| SYMBOL | VALUE | REL | DEFN | REFERENCES |
|---|---|---|---|---|
| CLR | 11B9 | 0 | 00515 | 00448,R 00490,R 01098,R |
| CL1 | 11BC | 0 | 00518 | 00523,R |
| CPA | 80F4 | 0 | 00003 | 00558,R 01011,R 01022,R 01037,R 01042,R 01108,R 01311,R 01332,R |
| CPC | 80F3 | 0 | 00003 | |
| CMPAR | 1098 | 0 | 00180 | 00165,R 00311,R |
| CN | 0002 | 0 | 00003 | 00468,R 00491,R 00600,R 00896,R 00899,R 00913,R 00926,R 01248,R |
| CNTRL | 1226 | 0 | 00628 | 00244,R |
| CNTR1 | 1316 | 0 | 00888 | 00865,R 01113,R |
| CNTR2 | 1329 | 0 | 00902 | 00868,R |
| CNTR3 | 1339 | 0 | 00918 | 00871,R |
| CONT3 | 1023 | 0 | 00048 | 00055,R |
| CONT4 | 1029 | 0 | 00054 | 00051,R |
| COUNT | 1223 | 0 | 00625 | 00240,R |
| CP | 149E | 0 | 01286 | 00063,R 00124,R 00340,R |
| CZ | 000A | 0 | 00003 | 00079,R 00216,R 00312,R 00509,R 00562,R 00565,R 00659,R 00729,R 00743,R 00795,R 00821,R 00880,R 00883,R 00910,R 00929,R 01018,R 01071,R 01095,R 01128,R 01144,R 01163,R 01211,R 01227,R |
| C1 | 10A2 | 0 | 00188 | 00197,R |
| C2 | 10AC | 0 | 00200 | 00211,R |
| C3 | 10B4 | 0 | 00209 | 00206,R |
| C4 | 10B8 | 0 | 00216 | 00214,R |
| C5 | 10F8 | 0 | 00295 | 00217,R |
| DAA | 80FB | 0 | 00003 | 00194,R 00203,R 00351,R 00736,R 01157,R 01176,R 01197,R 01242,R 01269,R 01278,R 01305,R 01326,R |
| DAC | 80F8 | 0 | 00003 | 00866,R 00869,R 01105,R |
| DCL | 80F0 | 0 | 00003 | |
| DESC | 1224 | 0 | 00626 | 00025,R 00282,R |
| DOWN | 115A | 0 | 00415 | 00276,R |
| DWN1 | 1160 | 0 | 00421 | 00431,R 00434,R |
| DWN2 | 116E | 0 | 00435 | 00440,R |
| DWN3 | 10E7 | 0 | 00275 | 00119,R |
| EIGHT | 1208 | 0 | 00592 | 00280,R |
| ENBLE | 1100 | 0 | 00310 | 00791,R 00845,R |
| END | 1410 | 0 | 01139 | 01136,R |
| END1 | 1441 | 0 | 01188 | 01164,R |
| END11 | 1460 | 0 | 01222 | 01219,R |
| END12 | 148D | 0 | 01267 | 01249,R |
| ERROR | 1133 | 0 | 00367 | 00477,R 00747,R 00825,R 01047,R |
| ERRR | 1438 | 0 | 01182 | 01129,R 01145,R 01212,R 01228,R 01266,R |
| ERR1 | 1195 | 0 | 00476 | 00486,R 00498,R 00510,R |
| ERR4 | 11E7 | 0 | 00564 | 00566,R |
| ERR5 | 1349 | 0 | 00934 | 00881,R 00884,R 00897,R 00900,R 00911,R 00914,R 00927,R 00930,R |
| ERR6 | 1387 | 0 | 01046 | 01053,R 01072,R 01096,R 01115,R |
| FCTN | 12C1 | 0 | 00795 | 00027,R 00158,R |
| FCTN1 | 12C4 | 0 | 00798 | 00796,R |
| FETCH | 10BE | 0 | 00226 | 00636,R 00753,R 00758,R 00763,R 00769,R 00775,R |

| SYMBOL | VALUE | REL | DEFN | REFERENCES |
|---|---|---|---|---|
| FIM | 8020 | 0 | 00003 | 00009,R 00016,R 00024,R 00028,R 00042,R 00044,R 00046,R 00059,R 00114,R 00141,R 00152,R 00159,R 00166,R 00180,R 00182,R 00184,R 00234,R 00315,R 00322,R 00332,R 00367,R 00389,R 00391,R 00393,R 00395,R 00415,R 00417,R 00419,R 00443,R 00454,R 00459,R 00515,R 00531,R 00543,R 00552,R 00593,R 00604,R 00630,R 00641,R 00661,R 00665,R 00667,R 00671,R 00678,R 00682,R 00687,R 00697,R 00721,R 00723,R 00801,R 00829,R 00831,R 00846,R 00852,R 00987,R 00989,R 01000,R 01002,R 01004,R 01006,R 01008,R 01123,R 01130,R 01146,R 01148,R 01150,R 01165,R 01167,R 01182,R 01188,R 01190,R 01206,R 01213,R 01229,R 01231,R 01233,R 01250,R 01252,R 01267,R 01269,R 01294,R 01296,R 01298,R 01343,R 01345,R |
| FIN | 8030 | 0 | 00003 | 00140,R 00229,R 00231,R 00233,R 00534,R |
| FIVE | 1205 | 0 | 00589 | 00261,R |
| FOUR | 1204 | 0 | 00588 | 00260,R |
| HOME | 1174 | 0 | 00443 | 00021,R |
| HOME1 | 1198 | 0 | 00479 | 00469,R 00475,R |
| HOME2 | 11AC | 0 | 00499 | 00492,R |
| HOME3 | 11A0 | 0 | 00487 | 00484,R 00496,R |
| HOME4 | 119A | 0 | 00481 | 00504,R |
| IAC | 80F2 | 0 | 00003 | 00940,R 01023,R |
| INC | 8060 | 0 | 00003 | 00093,R 00195,R 00207,R 00209,R 00230,R 00232,R 00348,R 00353,R 00383,R 00432,R 00451,R 00647,R 00648,R 00740,R 00995,R 01132,R 01159,R 01160,R 01178,R 01179,R 01199,R 01215,R 01244,R 01245,R 01261,R 01262,R 01280,R 01318,R 01319,R 01320,R 01339,R |
| INRAM | 1142 | 0 | 00389 | 00015,R |
| ISZ | 8070 | 0 | 00003 | 00054,R 00116,R 00120,R 00125,R 00196,R 00210,R 00329,R 00341,R 00358,R 00362,R 00384,R 00408,R 00410,R 00430,R 00433,R 00452,R 00503,R 00522,R 00545,R 00548,R 00550,R 00610,R 00649,R 00692,R 00741,R 00783,R 00788,R 00936,R 00938,R 00949,R 00951,R 00996,R 01086,R 01110,R 01139,R 01161,R 01180,R 01200,R 01222,R 01246,R 01263,R 01281,R 01321,R 01340,R |
| JCN | 8010 | 0 | 00003 | 00050,R 00079,R 00083,R 00091,R 00095,R 00100,R 00110,R 00118,R 00130,R 00205,R 00213,R 00216,R 00312,R 00360,R 00468,R 00474,R 00483,R 00491,R 00495,R 00509,R 00536,R 00560,R 00562,R 00565,R 00600,R 00659,R 00676,R 00705,R 00729,R 00743,R 00795,R 00814,R 00821,R 00837,R 00840,R 00864,R 00867,R 00870,R 00880,R 00883,R 00896,R 00899,R 00910,R 00913,R 00926,R 00929,R 00941,R 00955,R 00961,R 00968,R 01018,R 01020,R 01044,R 01052,R 01056,R 01060,R 01064,R 01071,R 01078,R 01082,R 01090,R 01095,R 01114,R 01128,R 01135,R 01144,R 01163,R 01211,R 01218,R 01227,R 01248,R 01314,R 01335,R |
| JIN | 8031 | 0 | 00003 | 00797,R |
| JMS | 8050 | 0 | 00003 | 00014,R 00018,R 00020,R 00026,R 00033,R 00035,R 00062,R 00123,R 00154,R 00157,R 00164,R 00172,R 00174,R 00310,R 00327,R 00339,R 00356,R 00360,R 00447,R 00472,R 00476,R 00481,R 00487,R 00489,R 00493,R 00602,R 00628,R 00632,R 00635,R 00654,R 00663,R 00669,R 00673,R 00680,R 00684,R 00746,R 00752,R 00754,R 00757,R 00759,R 00762,R 00765,R 00768,R 00771,R 00774,R 00781,R 00786,R 00790,R 00805,R 00818,R 00824,R 00827,R 00833,R 00844,R 00848,R 00872,R 00874,R 00876,R 00888,R 00890,R 00892,R 00902,R 00904,R 00906,R 00918,R 00920,R 00922,R 01039,R 01050,R 01092,R 01097,R 01112,R 01347,R |
| JUN | 8040 | 0 | 00003 | 00105,R 00176,R 00275,R 00439,R 00485,R 00497,R 00539,R 00711,R 00715,R 00835,R 00842,R 00978,R 01026,R 01046,R 01074,R 01116,R 01265,R |
| KBP | 80FC | 0 | 00003 | 00085,R |
| KEY1 | 1275 | 0 | 00713 | |
| KEY2 | 1279 | 0 | 00717 | |
| KEY3 | 127A | 0 | 00718 | |

| SYMBOL | VALUE | REL | DEFN | REFERENCES |
|---|---|---|---|---|
| LD | 80A0 | 0 | 00003 | 00052,R 00069,R 00087,R 00094,R 00102,R 00107,R 00137,R 00212,R 00538,R 00541,R 00596,R |
| | | | | 00634,R 00638,R 00820,R 01137,R 01220,R 01308,R 01316,R 01329,R 01337,R |
| LDLMP | 110A | 0 | 00322 | 00036,R 00175,R |
| LDM | 80D0 | 0 | 00003 | 00012,R 00022,R 00031,R 00061,R 00071,R 00077,R 00112,R 00122,R 00128,R 00133,R 00227,R |
| | | | | 00314,R 00337,R 00404,R 00406,R 00426,R 00428,R 00435,R 00437,R 00445,R 00470,R 00473,R |
| | | | | 00508,R 00518,R 00520,R 00524,R 00526,R 00669,R 00707,R 00745,R 00751,R 00756,R 00761,R |
| | | | | 00767,R 00773,R 00803,R 00816,R 00823,R 00851,R 00861,R 00885,R 00915,R 00931,R 00935,R |
| | | | | 00944,R 00947,R 00977,R 00980,R 00983,R 01025,R 01029,R 01070,R 01094,R 01099,R 01142,R |
| | | | | 01185,R 01225,R 01288,R 01292,R 01323,R 01350,R |
| LD1 | 114A | 0 | 00397 | 00409,R 00411,R |
| MAIN | 1389 | 0 | 01000 | |
| MAIN2 | 13B8 | 0 | 01050 | 01045,R 01087,R |
| MAIN3 | 13A5 | 0 | 01028 | 01019,R |
| MAIN4 | 13A7 | 0 | 01030 | 01027,R |
| MAIN6 | 13EC | 0 | 01099 | 01021,R 01091,R |
| AIN8 | 1393 | 0 | 01010 | 01111,R |
| INE | 1209 | 0 | 00593 | 00281,R |
| NOP | 8000 | 0 | 00003 | 00008,R 00584,R 00585,R 00586,R 00587,R 00588,R 00589,R 00590,R 00591,R 00592,R 00622,R |
| | | | | 00623,R 00624,R 00625,R 00626,R 00627,R 00713,R 00714,R 00717,R 01048,R 01049,R |
| ONE | 1201 | 0 | 00585 | 00241,R |
| OUT | 1116 | 0 | 00334 | 00342,R |
| OUTPT | 1114 | 0 | 00332 | 00328,R |
| PLS | 121F | 0 | 00617 | 00744,R |
| PLUS | 1278 | 0 | 00721 | 00301,R |
| POST | 1297 | 0 | 00751 | 00277,R |
| POS51 | 13C8 | 0 | 01066 | 01083,R |
| POS53 | 13DD | 0 | 01084 | 01065,R 01075,R |
| POS55 | 13C8 | 0 | 01063 | 01061,R |
| POS56 | 13D5 | 0 | 01076 | 01057,R |
| POS58 | 13DA | 0 | 01081 | 01079,R |
| RAL | 80F5 | 0 | 00003 | 00104,R 00338,R 00467,R 00506,R 00507,R 00556,R 00658,R 00702,R 00704,R 00807,R 00811,R |
| | | | | 00813,R 00971,R 00972,R 00975,R 01063,R 01068,R 01069,R 01306,R 01327,R |
| RAR | 80F6 | 0 | 00003 | 00072,R 00146,R 00148,R 00335,R 00599,R 00728,R 00879,R 00882,R 00895,R 00898,R 00909,R |
| | | | | 00912,R 00925,R 00928,R 00958,R 00964,R 00965,R 01081,R 01127,R 01210,R 01309,R 01317,R |
| | | | | 01330,R 01338,R |
| ROM | 80E9 | 0 | 00003 | 00049,R 00065,R 00144,R 00204,R 00325,R 00347,R 00379,R 00422,R 00607,R 00644,R 00733,R |
| | | | | 00992,R 01014,R 01033,R 01089,R 01134,R 01154,R 01194,R 01217,R 01256,R 01302,R |
| ROR | 80EA | 0 | 00003 | 00082,R 00398,R 00466,R 00505,R 00555,R 00878,R 00894,R 00908,R 00924,R 00957,R 00963,R |
| | | | | 00970,R 00974,R 01067,R |
| RIO | 80EC | 0 | 00003 | 00535,R 00557,R 00598,R 00657,R 00675,R 00700,R 00727,R 00809,R 01055,R 01126,R 01209,R |
| RE1 | 80ED | 0 | 00003 | 00954,R 01058,R 01076,R |
| | | 0 | 00003 | 00839,R 00960,R |
| | | 0 | 00003 | 00967,R |
| | | 0 | 00324 | 00330,R |
| | | 0 | 00777 | 00784,R |
| | | 0 | 00785 | 00789,R |

```
SYMBOL    VALUE  REL  DEFN     REFERENCES

                  0   01132    01140,R
                  0   01215    01223,R
                  0   01153    01162,R
                  0   01255    01264,R
                  0   01170    01181,R
                  0   01236    01247,R
                  0   01193    01201,R
                  0   01272    01282,R
                  0   00003    00190,R 00779,R 01017,R 01172,R 01238,R 01274,R
                  0   00042    00177,R
                  0   00801    00302,R
                  0   00987    00843,R
                  0   00991    00997,R
                  0   00591    00279,R
                  0   00590    00262,R
                  0   00003    00011,R 00030,R 00048,R 00064,R 00066,R 00073,R 00143,R 00161,R 00168,R 00169,R 00192,R
                               00201,R 00317,R 00324,R 00346,R 00349,R 00369,R 00378,R 00397,R 00399,R 00401,R 00403,R
                               00421,R 00423,R 00425,R 00449,R 00456,R 00461,R 00499,R 00517,R 00533,R 00554,R 00595,R
                               00606,R 00637,R 00643,R 00645,R 00690,R 00699,R 00725,R 00732,R 00734,R 00738,R 00778,R
                               00854,R 00945,R 00953,R 00981,R 00985,R 00991,R 00993,R 01013,R 01015,R 01030,R 01032,R
                               01034,R 01054,R 01066,R 01084,R 01088,R 01100,R 01125,R 01133,R 01153,R 01155,R 01171,R
                               01174,R 01184,R 01193,R 01195,R 01208,R 01216,R 01237,R 01240,R 01255,R 01257,R 01273,R
                               01276,R 01286,R 01301,R 01303,R 01312,R 01324,R 01333,R 01349,R
                  0   01354    01356,R
                  0   00003    00023,R 00103,R 00156,R 00186,R 00382,R 00764,R 00770,R 00776,R 01062,R 01080,R 01169,R
                               01235,R 01271,R 01310,R 01331,R
                  0   00531    00473,R 00494,R 00563,R 01051,R
                  0   00542    00540,R
                  0   00545    00546,R 00549,R
                  0   00565    00561,R
STEP5     11D1    0   00541    00537,R
STEP6     11CA    0   00534    00551,R
STPB      1300    0   00861    00482,R 01040,R
STRT      1030    0   00064    00126,R
SUB       8090    0   00003    00070,R 00090,R 00099,R 00109,R 00129,R 00863,R 01143,R 01226,R
SUBP      1450    0   01206    00712,R
TCC       80F7    0   00003
TCS       80F9    0   00003    00188,R 00200,R 00777,R 00785,R 01170,R 01236,R 01272,R
THREE     1203    0   00587    00243,R
TN        0009    0   00003
TRANS     1232    0   00641    00670,R 00834,R
TRANZ     1234    0   00643    00650,R
TT1       1276    0   00714    00239,R
TT2       1273    0   00711    00258,R
TWO       1202    0   00586    00242,R
TZ        0001    0   00003    00118,R
```

| SYMBOL | VALUE | REL | DEFN | REFERENCES |
|---|---|---|---|---|
| T1 | 1059 | 0 | 00107 | 00084,R |
| T2 | 105E | 0 | 00112 | 00092,R 00096,R 00101,R |
| T3 | 105F | 0 | 00113 | 00106,R |
| T4 | 1060 | 0 | 00114 | 00080,R 00111,R |
| T5 | 1099 | 0 | 00176 | 00131,R |
| UNLCK | 1266 | 0 | 00697 | 00298,R |
| WAIT | 134A | 0 | 00935 | 00877,R 00893,R 00907,R 00923,R |
| WAIT1 | 134B | 0 | 00936 | 00937,R 00939,R 00942,R |
| WFPC2 | 1358 | 0 | 00949 | 00950,R |
| WFPC3 | 135A | 0 | 00951 | 00952,R |
| WPP | 80E1 | 0 | 00003 | 00013,R 00067,R 00074,R 00402,R 00405,R 00407,R 00424,R 00427,R 00429,R 00436,R 00438,R 00519,R 00521,R 00525,R 00527,R 00542,R 00946,R 00948,R 00982,R 00984,R 01287,R 01289,R |
| WRP | 80E0 | 0 | 00003 | 00032,R 00171,R 00318,R 00352,R 00370,R 00400,R 00450,R 00597,R 00609,R 00639,R 00646,R 00691,R 00737,R 00739,R 00855,R 00994,R 01035,R 01158,R 01177,R 01186,R 01198,R 01243,R 01260,R 01279,R 01351,R |
| WRR | 80E2 | 0 | 00003 | |
| WR0 | 80E4 | 0 | 00003 | 00151,R 00162,R 00457,R 00462,R 00471,R 00559,R 01031,R |
| WR1 | 80E5 | 0 | 00003 | 00458,R 00463,R 00500,R 00886,R 01085,R 01101,R |
| WR2 | 80E6 | 0 | 00003 | 00464,R 00501,R 00613,R 00656,R 00708,R 00932,R 01102,R |
| WR3 | 80E7 | 0 | 00003 | 00465,R 00502,R 00916,R 01103,R |
| WW | 100E | 0 | 00022 | |
| XCH | 8080 | 0 | 00003 | 00053,R 00086,R 00088,R 00097,R 00113,R 00136,R 00138,R 00226,R 00228,R 00326,R 00334,R 00336,R 00446,R 00480,R 00608,R 00804,R 00808,R 00817,R 01010,R 01012,R 01024,R 01028,R 01036,R 01038,R 01041,R 01043,R 01104,R 01106,R 01107,R 01109,R 01138,R 01221,R 01293,R 01307,R 01328,R |
| Y | 1261 | 0 | 00690 | 00693,R |
| ZERO | 1200 | 0 | 00584 | 00299,R |
| ZEROB | 1353 | 0 | 00944 | 00488,R 01093,R |
| ZZB1 | 1296 | 0 | 00748 | 00706,R 00730,R |
| ZZC1 | 1244 | 0 | 00661 | |
| ZZC2 | 125D | 0 | 00686 | 00677,R |
| ZZE1 | 12E9 | 0 | 00837 | 00822,R |
| ZZE2 | 12F7 | 0 | 00851 | 00841,R |
| ZZE3 | 12DF | 0 | 00827 | 00815,R |
| ZZE4 | 12EE | 0 | 00842 | 00838,R |
| ZZE5 | 12F0 | 0 | 00844 | 00836,R 01117,R |
| ZZZ | 1227 | 0 | 00629 | |
| Z1 | 1363 | 0 | 00960 | 00956,R |
| Z11 | 1109 | 0 | 00319 | 00313,R |
| Z16 | 1214 | 0 | 00604 | 00601,R |
| Z2 | 136A | 0 | 00967 | 00962,R |
| Z200 | 1286 | 0 | 00732 | 00742,R |

```
SYMBOL    VALUE    REL  DEFN     REFERENCES
Z23       1248     0    00665    00660,R
Z3        1371     0    00974    00969,R
000 OVERFLOW SECTORS SPECIFIED
000 OVERFLOW SECTORS REQUIRED
207 SYMBOLS DEFINED
 NO ERROR(S) AND  NO WARNING(S)   FLAGGED IN ABOVE ASSEMBLY

// XEQ RUBOU
```

What is claimed is:

1. A postage meter system, comprising: a source of operating voltage; means for printing postage; accounting means energized by said source of operating voltage and operatively coupled to said postage printing means for accounting for postage printed by said printing means, said accounting means including a working memory for accounting signal data information, said working memory receiving said operating voltage; a non-volatile memory connected to said accounting means; means for sensing variations of the voltage level of said source of operating voltage; and means coupled to said sensing means for causing said accounting signal data information to be transferred from said working memory to said non-volatile memory when said sensing means senses a voltage variation in the level of said source of operating voltage.

2. A postage meter system as defined in claim 1 wherein said sensing means includes a radiant energy device.

3. A postage meter system as defined in claim 1 wherein said sensing means includes a radiant energy device operably connected to normally emit radiant energy and to cease emitting radiant energy when a variation in the level of said source of operating voltage occurs.

4. A postage meter system as defined in claim 3 wherein said radiant energy device is a light emitting device.

5. A postage meter system as defined in claim 4 wherein said working memory for accounting signal data information is a volatile memory.

6. A system comprising: a volatile working memory for storing accounting data; a source of operating voltage for said working memory; means coupled to said source of operating voltage for detecting reduction of said operating voltage below a predetermined level and including a radiant energy device operable to emit radiant energy at a first level when said operating voltage is above said predetermined level and operable to reduce emitting radiant energy to below a second lower level when said operating voltage is below said predetermined level; a second memory having a storage capacity independent of said source of operating voltage; and means responsive to the emission of radiant energy for applying data stored in said working memory to said second memory when said radiant energy ceases.

7. A system as defined in claim 6 wherein said responsive means enables application of data stored in said second memory to said working memory when radiant energy is detected.

8. A postage meter system, comprising: a register for storing postage accounting information; gating means coupled to said register for transferring data from said register; power supply means coupled to supply operating voltage to said register; sensing means operatively connected to said power supply means for producing a control signal representative of a reduction of voltage of said operating voltage; and circuit means connected between said gating means and said signal sensing means for applying said control signal to said gating means, said circuit means including a radiant energy means having a radiant energy emitting member and a radiant energy sensitive receiving member, said radiant energy emitting member operative to provide radiant energy output when said voltage level is above a required operating level and operative to reduce said radiant energy output when said voltage level is below said required operating level.

9. A system as defined in claim 8 wherein said radiant energy means is a light emitting means.

10. A system as defined in claim 8 wherein said radiant energy emitting member is a light emitting diode and said radiant energy sensitive receiving member is a phototransistor.

11. A postage meter system, comprising: a microcomputer means containing a postage meter program for printing postage; register means connected to said microcomputer means to store data; input circuit means coupled to said register for transferring data to said register and output circuit means coupled to said register for transferring data from said register; a first power supply connected to supply operating voltage to said register; means coupled to said first power supply for detecting a reduction of said operating voltage provided by said first power supply below a predetermined level; means responsive to said sensing means for inhibiting transfer of data from said register to said output circuit; a second power supply; and means connected to said detecting means for connecting said second power supply to said register when said detecting means detects a reduction of voltage of said first power supply below said predetermined level.

12. In an electronic system including a register for storing data, an output circuit for transferring data from said register, and a first power supply connected to supply operating voltage to said register; the improvement comprising means inhibiting loss of data in the event of failure of said first power supply comprising sensing means coupled to said power supply for producing a control signal responsive to reduction of a voltage therein, said output circuit comprising gate means for transferring data from said register and responsive to said control signal for inhibiting transfer of data from said register, a second power supply, and means connecting said second power supply to said register in the event of reduction of voltage of said first power supply below a predetermined magnitude.

13. The system of claim 12, wherein said second power supply has a terminal voltage less than that of said first power supply, and said connecting means comprises diode means coupled between said register and said first and second power supplies whereby that supply having a higher voltage at any given time provides operating current for said register.

14. The system of claim 12, wherein said first power supply comprises a regulator, the output of said regulator being connected to supply operating current to said register, and a capacitive input to said first power supply, said sensing means being connected to sense voltages at said capacitive input.

15. The system of claim 14, wherein said sensing means comprises means for producing said control signal at voltage inputs to said regulator higher than the operating voltage output of said regulator.

16. The system of claim 12, further comprising data processing means coupled to receive said control signal, said data processing means comprising means for selectively directing input data to said register by way of said input circuit in response to receipt of said control signal.

17. The system of claim 12, further comprising a data processing system having a working storage, said data processing system comprising means responsive to said control signal for reading out said working storage to said register, and means operatively coupled to said sensing means and responsive to return of the voltage of said first power supply to a determined level for reading data out of said register to said working storage by way of said gate means and output circuit.

18. A system of claim 17, wherein said working storage comprises volatile storage means, said first power supply comprises storage capacitor means, and said sensing means comprises means for sensing reduction of voltage of said first power before voltages stored on said capacitor means drop to an extent that operation of said working memory is inhibited, whereby data may be transferred from said working memory to said register without loss upon loss of voltage of said first power supply.

19. In an electronic accounting system having a volatile working memory for storing accounting data, and a source of operating voltage for said working memory; the improvement comprising means coupled to said source for detecting reduction of said operating voltage below a predetermined level, a second memory having a storage capacity independent of said source, means responsive to said detecting means for applying data stored in said working memory to said second memory, gate means responsive to said detecting means connected to inhibit transfer of data output from said second memory, and means responsive to the detection of voltages above said predetermined level by said detecting means for enabling application of data stored in said second memory to said working memory.

20. The electronic accounting system of claim 19, wherein said second memory is nonvolatile.

21. In an electronic accounting system having a volatile working memory for storing accounting data, and a source of operating voltage for said working memory; the improvement comprising means coupled to said source for detecting reduction of said operating voltage below a predetermined level, a second nonvolatile memory having a storage capacity independent of said source, a second source of operating voltage connected to said nonvolatile memory, means responsive to said detecting means for applying data stored in said working memory to said second memory and inhibiting transfer of data output from said second memory, and means responsive to the detection of voltages above said predetermined level by said detecting means for enabling application of data stored in said second memory to said working memory.

22. In an electronic accounting system having a volatile working memory for storing accounting data, and a source of operating voltage for said working memory; the improvement comprising means coupled to said source for detecting reduction of said operating voltage below a predetermined level, a second nonvolatile memory including shift register means, said second memory having a storage capacity independent of said source, a second source of operating voltage connected to said nonvolatile memory, means responsive to said detecting means for applying data stored in said working memory to said second memory and inhibiting transfer of data output from said second memory, and means responsive to the detection of voltages above said predetermined level by said detecting means for enabling application of data stored in said second memory to said working memory.

23. In an electronic accounting system including a working register, input means connected to update data stored in said working register, said working register being subject to undesired variation of data under a determined condition; the improvement comprising a storage register having input and output circuit, means for sensing an onset of said determinable condition, means responsive to an output from said sensing means coupled to transfer data from said working register to said storage register and to inhibit transfer of data from said storage register to said output circuit, and means responsive to the detection of passage of said condition by said sensing means for disabling said inhibiting means for returning data to said working storage.

24. The electronic accounting system of claim 23, wherein said inhibiting means comprises gate means coupled to be controlled by an output of said sensing means.

25. The electronic accounting system of claim 23, including a data processing system coupled to said working register, and further comprising means for coupling the output of said sensing means to said data processing system, said data processing system having stored therein routines to effect the transfer of data between said working register and storage register, whereby any data stored in said working register may be transferred to said storage register prior to occurrence of said determinable condition.

26. The electronic accounting system of claim 25, further comprising a power supply operably connected to said working register to provide operating voltage, said determinable condition being the reduction of voltage of said power supply, said sensing means comprising means for sensing an onset of loss of voltage of said power supply.

* * * * *

UNITED STATES PATENT AND TRADEMARK OFFICE
CERTIFICATE OF CORRECTION

PATENT NO. : 4,306,299

DATED : December 15, 1981

INVENTOR(S) : Frank T. Check, Jr., Alton B. Eckert, Jr., Joseph R. Warren

It is certified that error appears in the above—identified patent and that said Letters Patent is hereby corrected as shown below:

In the drawing, sheet 5, figure 3, change "100" to --100A--; change "101" to --101A--; change "102" to --102A--; change "103" to --103A--; change "104" to --104A--; change "108" to --108A--; change "109" to --109A--; change "110" to --110A--. Sheet 6, figure 4a, change "108" to --108A--; change "109" to --109A--; change "110" to --110A--. Sheet 15, figure 16, connect the common line of the lamps of the lower left row to the -24 volt source via a 300 ohm resistor. Sheet 19, figure 20, change "305" to --305A--; change "307" to --307A--; change "309" to --309A--; change "311" to --311A--; figure 21, in block 316, change "FIG. 38" to --FIG. 39--. Sheet 23, figure 26, in the Subroutine Label column change "ADD" TO --ADP--; and change "SUBD" to --SUBP--. Sheet 25, figure 31, change the title of the figure to --ADP--. Sheet 27, figure 34, in block 478, change "0" to --Ø--. Sheet 27, figure 35, in blocks 421 and 422, change "O" to --Ø--. Sheet 28, figure 39, in block 665, change "Work" to --Word--. Sheet 31, figure 46, change the label "CLDSD" to --CLDSP-- (two occasions). Sheet 32, figure 48, and blocks 646 and 648 change "solenoids" to --solenoid--; in block 631, change "solenoid" to --solenoids--. In the specification: Column 3, line 31, change "data" to --date--. Column 7, line 32, change "PCU" to --CPU--. Column 8, line 66, change "120" to --100--; line 67,

UNITED STATES PATENT AND TRADEMARK OFFICE

CERTIFICATE OF CORRECTION

PATENT NO. : 4,306,299

DATED : December 15, 1981

INVENTOR(S) : Frank T. Check, Jr., Alton B. Eckert, Jr., Joseph R. Warren

It is certified that error appears in the above—identified patent and that said Letters Patent is hereby corrected as shown below:

change "16)" to --1b)--; line 68, change "120" to --100--. Column 11, line 5, change "and" (first occurrence) to --in--. Column 13, line 7, change "100" to --100A-; line 17, change "101" to --101A--, change "102" to --102A--; line 19, change "103" to --103A--; change "104" to --104A--; line 30, change "108" to --108A--; line 31, change "109" to --109A--; change "110" to --110A--; line 33, change "108" to --108A--; line 34, change "108" to --108A--; lines 35, 36, 37, 39, 40 and 44, change "109" to --109A--; line 41, change "110" to --110A-- (two occasions); line 63, change "page 66" to --columns 35 and 36--. Column 14, line 1, change "(FIGS. 25 and 25a)" to --(FIG. 25)--. Column 16, line 42, change "13a" to --139--. Column 17, line 66, change "indistructable" to --indestructible--. Column 18, line 62, change "worse" to --worst--. Column 23, line 23, change "via (line" to --(via line--. Column 25, line 64, omit the second "30". Column 26, line 3, change "200" to --(200)--; line 15, change "aroutien" to --routine--; line 35, change "(" to --i.e.--; line 36, before "block" insert --(-- and change ";" to --,--; line 37, before "the" insert --,--. Column 28, line 48, change "410" to --401--. Column 29, line 54, insert the symbol > between the words "register"and "meter". Column 30, line 1, change "contents" to --content--; line 66, change "SET routine

UNITED STATES PATENT AND TRADEMARK OFFICE
CERTIFICATE OF CORRECTION

PATENT NO. : 4,306,299

DATED : December 15, 1981

INVENTOR(S) : Frank T. Check, Jr., Alton B. Eckert, Jr., Joseph R. Warren

It is certified that error appears in the above—identified patent and that said Letters Patent is hereby corrected as shown below:

of FIG. 28" to --SETX routine of FIG.50--. Column 31, line 15, change "102 and 103" to --102A and 104A--. Column 32, line 7, change "587" to --581--. Column 33, line 62, change "(1c)" to --(/C)--. In columns 49 and 50, statement number 00536 of the program, change "PATTERM" to --PATTERN--. In columns 63 and 64, statement number 01052 of the program, change "TP" to --TO--. In columns 65 and 66, statement number 01138 of the program, change "CHARACTER" to --CHARACTERS--.

Signed and Sealed this

*Thirteenth* Day of *December 1983*

[SEAL]

*Attest:*

GERALD J. MOSSINGHOFF

*Attesting Officer* *Commissioner of Patents and Trademarks*